(12) United States Patent
Send et al.

(10) Patent No.: US 11,719,818 B2
(45) Date of Patent: *Aug. 8, 2023

(54) DETECTOR FOR OPTICALLY DETECTING AT LEAST ONE OBJECT

(71) Applicant: trinamiX GmbH, Ludwigshafen am Rhein (DE)

(72) Inventors: Robert Send, Ludwigshafen (DE); Celal Mohan Oeguen, Ludwigshafen (DE); Christopher Hahne, Ludwigshafen (DE); Michael Eberspach, Ludwigshafen (DE); Ingmar Bruder, Ludwigshafen (DE); Bernd Scherwath, Ludwigshafen (DE)

(73) Assignee: TRINAMIX GMBH, Ludwigshafen am Rhein (DE)

( * ) Notice: Subject to any disclaimer, the term of this patent is extended or adjusted under 35 U.S.C. 154(b) by 797 days.

This patent is subject to a terminal disclaimer.

(21) Appl. No.: 16/483,231

(22) PCT Filed: Mar. 15, 2018

(86) PCT No.: PCT/EP2018/056545
§ 371 (c)(1),
(2) Date: Aug. 2, 2019

(87) PCT Pub. No.: WO2018/167215
PCT Pub. Date: Sep. 20, 2018

(65) Prior Publication Data
US 2020/0011995 A1    Jan. 9, 2020

(30) Foreign Application Priority Data

Mar. 16, 2017  (EP) .................................... 17161335
Jan. 23, 2018  (EP) .................................... 18152973

(51) Int. Cl.
*G01S 17/46*     (2006.01)
*G01S 3/783*     (2006.01)
(Continued)

(52) U.S. Cl.
CPC ............. *G01S 17/46* (2013.01); *G01S 3/783* (2013.01); *G01S 7/4808* (2013.01);
(Continued)

(58) Field of Classification Search
CPC ........ G01S 17/46; G01S 3/783; G01S 7/4808; G01S 7/4814; G01S 7/4816; G01S 7/4817; G01S 7/4818
See application file for complete search history.

(56) References Cited

U.S. PATENT DOCUMENTS

| 4,023,033 A | 5/1977 | Bricot et al. |
| 4,469,945 A | 9/1984 | Hoeberechts et al. |

(Continued)

FOREIGN PATENT DOCUMENTS

| CA | 2119330 | 9/1905 |
| CN | 105637382 A | 6/2016 |

(Continued)

OTHER PUBLICATIONS

Petr Bartu et al, "Conformable Large-AreaPposition-Sensitive Photodetectors Based on Luminescence-Collecting Silicone Waveguides," *Journal of Applied Physics*, 107, 123101 (2010).

(Continued)

*Primary Examiner* — Jamil Ahmed
(74) *Attorney, Agent, or Firm* — Armstrong Teasdale LLP

(57) ABSTRACT

A detector (110) for determining a position of at least one object is proposed. The detector (110) comprises: —at least one angle dependent optical element (130) adapted to generate at least one light beam (131) having at least one beam (Continued)

profile depending on an angle of incidence of an incident light beam (116) propagating from the object (112) towards the detector (110) and illuminating the angle dependent optical element (130), wherein the angle dependent optical element (130) comprises at least one optical element selected from the group consisting of: at least one optical fiber, in particular at least one multifurcated optical fiber, in particular at least one bifurcated optical fiber; at least one diffractive optical element; at least one angle dependent reflective element, at least one diffractive grating element, in particular a blaze grating element; at least one aperture stop; at least one prism; at least one lens; at least one lens array, in particular at least one microlens array; at least one optical filter; at least one polarization filter; at least one bandpass filter; at least one liquid crystal filter, in particular a liquid crystal tunable filter; at least one short-pass filter; at least one long-pass filter; at least one notch filter; at least one interference filter; at least one transmission grating; at least one nonlinear optical element, in particular one birfringent optical element; —at least two optical sensors (113), wherein each optical sensor (113) has at least one light sensitive area (121), wherein each optical sensor (113) is designed to generate at least one sensor signal in response to an illumination of its respective light-sensitive area by the light beam (131) generated by the angle dependent optical element (130); at least one evaluation device (133) being configured for determining at least one longitudinal coordinate z of the object (112) by evaluating a combined signal Q from the sensor signals.

25 Claims, 19 Drawing Sheets

(51) Int. Cl.
  *G01S 7/481* (2006.01)
  *G01S 7/48* (2006.01)
(52) U.S. Cl.
  CPC .......... *G01S 7/4814* (2013.01); *G01S 7/4816* (2013.01); *G01S 7/4817* (2013.01); *G01S 7/4818* (2013.01)

(56) References Cited

U.S. PATENT DOCUMENTS

| | | | |
|---|---|---|---|
| 4,653,905 A * | 3/1987 | Farrar | G01C 3/00 396/106 |
| 4,675,517 A | 6/1987 | Shiomi | |
| 4,739,161 A | 4/1988 | Moriyama et al. | |
| 4,767,211 A | 8/1988 | Munakata et al. | |
| 5,235,377 A | 8/1993 | Ide et al. | |
| 5,323,222 A | 6/1994 | Kunishige | |
| 5,512,997 A | 4/1996 | Ogawa | |
| 6,118,119 A | 9/2000 | Ruschin | |
| 6,507,392 B1 | 1/2003 | Richards et al. | |
| 6,995,445 B2 | 2/2006 | Forrest et al. | |
| 7,855,778 B2 | 12/2010 | Yung et al. | |
| 9,665,182 B2 | 5/2017 | Send et al. | |
| 9,741,954 B2 | 8/2017 | Bruder et al. | |
| 9,919,999 B2 | 3/2018 | Koenemann et al. | |
| 10,094,927 B2 | 10/2018 | Send et al. | |
| 10,290,817 B2 | 5/2019 | Battagliarin et al. | |
| 2002/0075471 A1 | 6/2002 | Holec | |
| 2003/0010904 A1 * | 1/2003 | Luo | G02B 6/4214 250/227.11 |
| 2006/0044546 A1 | 3/2006 | Lewin et al. | |
| 2007/0176165 A1 | 8/2007 | Forrest et al. | |
| 2008/0013005 A1 | 1/2008 | Deane | |
| 2008/0106746 A1 | 5/2008 | Shpunt et al. | |
| 2008/0118143 A1 | 5/2008 | Gordon et al. | |
| 2008/0130005 A1 | 6/2008 | Waslowski et al. | |
| 2008/0240502 A1 | 10/2008 | Freedman et al. | |
| 2009/0066929 A1 | 3/2009 | Tropf | |
| 2010/0118123 A1 | 5/2010 | Freedman et al. | |
| 2010/0282309 A1 | 11/2010 | Pschirer et al. | |
| 2011/0248151 A1 | 10/2011 | Holcombe et al. | |
| 2015/0286340 A1 * | 10/2015 | Send | G01B 11/25 250/206.1 |
| 2016/0084650 A1 | 3/2016 | Hsu et al. | |
| 2016/0127664 A1 | 5/2016 | Bruder et al. | |
| 2016/0140786 A1 | 5/2016 | Bruder et al. | |
| 2016/0377417 A1 | 12/2016 | Jovanovski et al. | |
| 2017/0039793 A1 | 2/2017 | Send et al. | |
| 2017/0074652 A1 | 3/2017 | Send et al. | |
| 2017/0082486 A1 | 3/2017 | Send et al. | |
| 2017/0123593 A1 | 5/2017 | Send et al. | |
| 2017/0205230 A1 | 7/2017 | Send et al. | |
| 2017/0219709 A1 | 8/2017 | Send et al. | |
| 2017/0237926 A1 | 8/2017 | Bruder et al. | |
| 2017/0250334 A1 | 8/2017 | Hermes et al. | |
| 2017/0263868 A1 | 9/2017 | Tanabe et al. | |
| 2017/0309828 A1 | 10/2017 | Tanabe et al. | |
| 2017/0363465 A1 | 12/2017 | Send et al. | |
| 2017/0363741 A1 | 12/2017 | Send et al. | |
| 2018/0003993 A1 | 1/2018 | Send et al. | |
| 2018/0007343 A1 | 1/2018 | Send et al. | |
| 2018/0017679 A1 | 1/2018 | Valouch et al. | |
| 2018/0031672 A1 | 2/2018 | Bruder et al. | |
| 2018/0044357 A1 | 2/2018 | Spielmann et al. | |
| 2018/0067213 A1 | 3/2018 | Send et al. | |
| 2018/0136319 A1 | 5/2018 | Send et al. | |
| 2018/0182980 A1 | 6/2018 | Lennartz et al. | |
| 2018/0210064 A1 | 7/2018 | Send et al. | |
| 2018/0231376 A1 | 8/2018 | Send et al. | |
| 2018/0249051 A1 | 8/2018 | Send et al. | |
| 2018/0276843 A1 | 9/2018 | Send et al. | |
| 2018/0329024 A1 | 11/2018 | Send et al. | |
| 2018/0356501 A1 | 12/2018 | Send et al. | |
| 2019/0129035 A1 | 5/2019 | Valouch et al. | |
| 2019/0129036 A1 | 5/2019 | Valouch et al. | |
| 2019/0140129 A1 | 5/2019 | Valouch et al. | |
| 2019/0157470 A1 | 5/2019 | Send et al. | |
| 2019/0170849 A1 | 6/2019 | Hermes et al. | |
| 2019/0172964 A1 | 6/2019 | Hermes et al. | |
| 2019/0198206 A1 | 6/2019 | Ter Maat et al. | |
| 2019/0277703 A1 | 9/2019 | Valouch et al. | |
| 2019/0339356 A1 | 11/2019 | Schildknecht et al. | |
| 2019/0353767 A1 | 11/2019 | Eberspach et al. | |
| 2020/0011995 A1 | 1/2020 | Send et al. | |

FOREIGN PATENT DOCUMENTS

| | | |
|---|---|---|
| DE | 25 01 124 | 8/1975 |
| DE | 32 03 613 | 8/1982 |
| DE | 32 25 372 | 2/1983 |
| DE | 42 11 875 | 10/1993 |
| EP | 2 781 931 | 9/2014 |
| EP | 15 153 215 | 1/2015 |
| EP | 15 157 363 | 3/2015 |
| EP | 15 164 653 | 4/2015 |
| EP | 15 177 275 | 7/2015 |
| EP | 15 180 353 | 8/2015 |
| EP | 15 180 354 | 8/2015 |
| EP | 15 185 005 | 9/2015 |
| EP | 15 191 960 | 10/2015 |
| EP | 15 196 238 | 11/2015 |
| EP | 15 196 239 | 11/2015 |
| EP | 15 197 744 | 12/2015 |
| EP | 15 155 835 | 2/2016 |
| EP | 16 155 834 | 2/2016 |
| EP | 16 155 845 | 2/2016 |
| EP | 3 045 935 | 7/2016 |
| JP | S61286703 A | 12/1986 |
| JP | 2000097629 A | 4/2000 |
| WO | WO 2009/013282 A1 | 1/2009 |
| WO | WO 2010-063521 | 6/2010 |
| WO | WO 2012/110924 | 8/2012 |
| WO | WO 2014/097181 | 6/2014 |

(56) References Cited

FOREIGN PATENT DOCUMENTS

| | | |
|---|---|---|
| WO | WO 2012/168395 | 12/2014 |
| WO | WO 2014/198625 | 12/2014 |
| WO | WO 2014/198626 | 12/2014 |
| WO | WO 2014/198629 A1 | 12/2014 |
| WO | WO 2015/024871 A1 | 2/2015 |
| WO | WO 2015/150203 | 10/2015 |
| WO | WO 2015/150324 | 10/2015 |
| WO | WO 2015/150989 | 10/2015 |
| WO | WO 2015/159192 | 10/2015 |
| WO | WO 2015/161989 | 10/2015 |
| WO | WO 2015/176981 | 11/2015 |
| WO | WO 2016/012274 | 1/2016 |
| WO | WO 2016/046034 | 3/2016 |
| WO | WO 2016/046350 | 3/2016 |
| WO | 2016/051323 A1 | 4/2016 |
| WO | WO 2016/066494 | 5/2016 |
| WO | 2016/092449 A1 | 6/2016 |
| WO | WO 2016/120392 | 8/2016 |
| WO | WO 2016/146725 | 9/2016 |
| WO | WO 2017/089553 | 6/2017 |
| WO | WO 2017/144401 | 8/2017 |
| WO | WO 2018/077868 | 5/2018 |
| WO | WO 2018/091640 | 5/2018 |
| WO | WO 2018/096083 | 5/2018 |
| WO | WO 2018/115073 | 6/2018 |
| WO | WO 2018/146138 | 8/2018 |
| WO | WO 2018/146146 | 8/2018 |
| WO | WO 2018/167215 | 9/2018 |
| WO | WO 2018/193045 | 10/2018 |
| WO | WO 2019/002199 | 1/2019 |
| WO | WO 2019/011803 | 1/2019 |
| WO | WO 2019/038354 | 2/2019 |
| WO | WO 2019/042956 | 3/2019 |
| WO | WO 2019/042959 | 3/2019 |
| WO | WO 2019/072965 | 4/2019 |
| WO | WO 2019/096986 | 5/2019 |
| WO | WO 2019/115594 | 6/2019 |
| WO | WO 2019/115595 | 6/2019 |
| WO | WO 2019/115596 | 6/2019 |

OTHER PUBLICATIONS

Street (Ed.): Technology and Applications of Amorphous Silicon, Springer-Verlag Heidelberg, 2010, pp. 346-349.
Kurt Konolige et al., "A Low-Cost Laser Distance Sensor", *2008 IEEE International Conference on Robotics and Automation*, Pasadena, CA, May 19-23, 2008.
X. Jiang et al., Dreidimensionales Computersehen, Chapter 2, Springer, Berlin Heidelberg (1997).

\* cited by examiner

DETECTOR FOR OPTICALLY DETECTING AT LEAST ONE OBJECT

FIELD OF THE INVENTION

The invention relates to a detector, a detector system and a method for determining a position of at least one object. The invention further relates to a human-machine interface for exchanging at least one item of information between a user and a machine, an entertainment device, a tracking system, a camera, a scanning system and various uses of the detector device. The devices, systems, methods and uses according to the present invention specifically may be employed for example in various areas of daily life, gaming, traffic technology, production technology, security technology, photography such as digital photography or video photography for arts, documentation or technical purposes, medical technology or in the sciences. Further, the invention specifically may be used for scanning one or more objects and/or for scanning a scenery, such as for generating a depth profile of an object or of a scenery, e.g. in the field of architecture, metrology, archaeology, arts, medicine, engineering or manufacturing. However, other applications are also possible.

PRIOR ART

A large number of optical sensors and photovoltaic devices are known from the prior art. While photovoltaic devices are generally used to convert electromagnetic radiation, for example, ultraviolet, visible or infrared light, into electrical signals or electrical energy, optical detectors are generally used for picking up image information and/or for detecting at least one optical parameter, for example, a brightness.

A large number of optical sensors which can be based generally on the use of inorganic and/or organic sensor materials are known from the prior art. Examples of such sensors are disclosed in US 2007/0176165 A1, U.S. Pat. No. 6,995,445 B2, DE 2501124 A1, DE 3225372 A1 or else in numerous other prior art documents. To an increasing extent, in particular for cost reasons and for reasons of large-area processing, sensors comprising at least one organic sensor material are being used, as described for example in US 2007/0176165 A1. In particular, so-called dye solar cells are increasingly of importance here, which are described generally, for example in WO 2009/013282 A1.

A large number of detectors for detecting at least one object are known on the basis of such optical sensors. Such detectors can be embodied in diverse ways, depending on the respective purpose of use. Examples of such detectors are imaging devices, for example, cameras and/or microscopes. High-resolution confocal microscopes are known, for example, which can be used in particular in the field of medical technology and biology in order to examine biological samples with high optical resolution. Further examples of detectors for optically detecting at least one object are distance measuring devices based, for example, on propagation time methods of corresponding optical signals, for example laser pulses. Further examples, of detectors for optically detecting at least one object are edge detection detectors using depth from focus technologies. However, edge detection may be only possible at relatively short distances from the object to the detector. Further examples of detectors for optically detecting at least one object are confocal detectors by means of which distance measurement can be carried out. However, such detectors may require mechanical movement of detector components to ensure that the object is in a focus of an optical system of the detector. Further examples of detectors for optically detecting objects are triangulation systems, for example using laser triangulation, by means of which distance measurements can likewise be carried out. Kurt Konolige et al., A Low-Cost Laser Distance Sensor, 2008 IEEE International Conference on Robotics and Automation, Pasadena, Calif., USA, May 19-23, 2008, discuss competing technologies using triangulation for planar laser distance sensor. Structured line devices use a light stripe laser and offset camera to determine range to a set of points. Because the laser energy is spread over a line, it is difficult to achieve accurate range, especially in the presence of ambient light, or with darker objects. Point scan devices for 3D scanning of small objects typically use a scanning mirror to direct a point laser beam and redirect the laser return to an optical receiver. Such devices cannot be miniaturized, and their cost and mechanical fragility will remain high. Centroid point modules typically use position-sensitive devices. These devices measure the centroid of all light impinging on their surface. Although modulation techniques can be used to offset some of the effects of ambient light, PSDs do not perform well unless the laser spot has a very strong reflection, limiting their use to ranges of a meter or less. Pixel-based point modules search the pixel with maximum signal intensity to determine the position of the light spot on the sensor. Typically CMOS line arrays are used for detection. Konolige et al. introduce a low-cost version of a Pixel-based point module.

In WO 2012/110924 A1, the content of which is herewith included by reference, a detector for optically detecting at least one object is proposed. The detector comprises at least one optical sensor. The optical sensor has at least one sensor region. The optical sensor is designed to generate at least one sensor signal in a manner dependent on an illumination of the sensor region. The sensor signal, given the same total power of the illumination, is dependent on a geometry of the illumination, in particular on a beam cross section of the illumination on the sensor area. The detector furthermore has at least one evaluation device. The evaluation device is designed to generate at least one item of geometrical information from the sensor signal, in particular at least one item of geometrical information about the illumination and/or the object.

WO 2014/097181 A1, the full content of which is herewith included by reference, discloses a method and a detector for determining a position of at least one object, by using at least one transversal optical sensor and at least one optical sensor. Specifically, the use of sensor stacks is disclosed, in order to determine a longitudinal position of the object with a high degree of accuracy and without ambiguity.

WO 2015/024871 A1, the full content of which is herewith included by reference, discloses an optical detector, comprising:
  at least one spatial light modulator being adapted to modify at least one property of a light beam in a spatially resolved fashion, having a matrix of pixels, each pixel being controllable to individually modify the at least one optical property of a portion of the light beam passing the pixel;
  at least one optical sensor adapted to detect the light beam after passing the matrix of pixels of the spatial light modulator and to generate at least one sensor signal;
  at least one modulator device adapted for periodically controlling at least two of the pixels with different modulation frequencies; and at least one evaluation device adapted for performing a frequency analysis in order to determine signal components of the sensor signal for the modulation frequencies.

U.S. Pat. No. 4,767,211 discloses an apparatus for and a method of measuring a boundary surface of a sample in which a ratio of the light quantity of a part of reflected light from a sample which travels in the vicinity of the optical axis of the reflected light, to the light quantity of another part of the reflected light which is directed to a position deviating from the optical axis by a predetermined distance is used to accurately measure a boundary surface of a sample. Since the accuracy of measurement is increased by using the above ratio, light capable of passing through the sample can be used as incident light. Thus, a deep hole in the surface of the sample and a void such as an air bubble in a living being sample, which cannot be measured by the prior art, can be measured very accurately.

WO 2014/198629 A1, the full content of which is herewith included by reference, discloses a detector for determining a position of at least one object, comprising:

at least one optical sensor, the optical sensor being adapted to detect a light beam propagating from the object towards the detector, the optical sensor having at least one matrix of pixels; and at least one evaluation device, the evaluation device being adapted to determine a number N of pixels of the optical sensor which are illuminated by the light beam, the evaluation device further being adapted to determine at least one longitudinal coordinate of the object by using the number N of pixels which are illuminated by the light beam.

Further, generally, for various other detector concepts, reference may be made to WO 2014/198626 A1, WO 2014/198629 A1 and WO 2014/198625 A1, the full content of which is herewith included by reference. Further, referring to potential materials and optical sensors which may also be employed in the context of the present invention, reference may be made to European patent applications EP 15 153 215.7, filed on Jan. 30, 2015, EP 15 157 363.1, filed on Mar. 3, 2015, EP 15 164 653.6, filed on Apr. 22, 2015, EP 15177275.3, filed on Jul. 17, 2015, EP 15180354.1 and EP 15180353.3, both filed on Aug. 10, 2015, and EP 15 185 005.4, filed on Sep. 14, 2015, EP 15 196 238.8 and EP 15 196 239.6, both filed on Nov. 25, 2015, EP 15 197 744.4, filed on Dec. 3, 2015, the full content of all of which is herewith also included by reference.

Further, reference may be made to detector concepts comparing signals of at least two different sources for determining a position of an object. Thus, as an example, reference may be made to EP 16155834.1, EP 16155835.8 or EP 16155845.7, all filed on Feb. 16, 2016, the full disclosure of which is herewith included by reference.

Despite the advantages implied by the above-mentioned devices and detectors, several technical challenges remain. Thus, generally, a need exists for detectors for detecting a position of an object in space which is both reliable and may be manufactured at low cost. Specifically, a need exists for 3D-sensing concepts. Various known concepts are at least partially based on using so-called FiP sensors, such as several of the above-mentioned concepts. Therein, as an example, large area sensors may be used, in which the individual sensor pixels are significantly larger than the light spot and which are fixed to a specific size. Still, large area sensors in many cases are inherently limited in the use of the FiP measurement principle, specifically in case more than one light spot is to be investigated simultaneously.

A further challenge using FiP detectors is detector area or active area. Typically, for distance measurements, a large active area of the detector is used or even is required. This area, however, may cause noise problems, specifically when the tetralateral conductivity concept is employed to build a PSD. This often results in poor signal-to-noise-ratios and slow detector response times due to the large capacitance in conjunction with the series resistance of the detector. A further challenge using FiP detectors is cost of manufacturing. Thus, in many cases, typical FiP sensors are expensive, as compared to e.g. conventional Si-based photodiodes. Further, the evaluation of the measurement results of measurements using FiP-sensors remains an issue, specifically in case the total power of a light beam is unknown. In case a plurality of FiP-sensors is used, located at different positions along an axis of propagation of the light beam, a range of measurement typically is limited to the range in between the two positions of the sensors. Further, many FiP-detectors show a luminance dependency which renders the evaluation of the measurement result more difficult, and, additionally, FiP-measurements in many cases are dependent on a target spot size.

Referring to concepts comparing sensor signals generated by at least two different sources such as at least two different optical sensors, one technical challenge remains a reduction of cost of the overall system and, specifically, of the optical sensors. Thus, in many concepts, special optical sensors have to be used, having a dedicated design and placement, which typically requires setting up an expensive optoelectronic semiconductor manufacturing process and a complex assembly scheme.

A further technical challenge may be measuring the distance of at least one object through an optical fiber. Using known methods such as time of flight or triangulation methods accurate determination of the distance through the optical fiber is very demanding. In particular, for triangulation a baseline, e.g. distance between light source and receiver lens, is necessary. Further, in particular for time of flight measurements light travelling time through the fiber may not be accurate enough.

U.S. Pat. No. 4,653,905 describes using one or more optical fibers with different numerical apertures for differently transmitting light from an object. Light is thus transmitted for a given range at a predetermined ratio corresponding to a difference between the different numerical apertures. That ratio is varied by variations in the range. The varying ratio is detected and a range finder operation is performed in response to that detected varying ratio.

DE 32 03 613 A1 describes a distance measuring device which projects a light beam onto an object to be detected. Light reflected from this object is subdivided into two light components by a beam splitter. The intensity of one of the light components is sensed by a first light intensity detector. The other light component is subjected to intensity modulation in agreement with the angle formed between the illuminating light and the reflected light, and the intensity of the modulated light component is sensed by a second light intensity detector. The outputs of the two detectors are input into a computer which derives information which indicates the distance up to the object to be detected.

US 2016/084650 A1 describes an optical sensor which includes at least two optical sensing pixels and at least two different grating elements. These grating elements are disposed above these optical sensing pixels correspondingly.

WO 2010/063521 A2 describes an optical measuring arrangement for the contactless optical scanning and/or detection of surfaces and/or treatment zones of workpieces and/or processes. The optical measuring arrangement comprises at least one angle of incidence sensor which is positioned in the beam path of electromagnetic radiation emitted by a measuring point or emission source. Said angle of incidence sensor has at least one body which is arranged in the beam path of the electromagnetic radiation emitted by the measuring point or the radiation emission source and is at least partly permeable to the electromagnetic radiation. The optical angle of incidence sensor comprises at least one exit point acting as an interface for splitting up the electromagnetic radiation into diffracted and reflected portions of the electromagnetic radiation.

US 2011/248151 A1 describes a system which includes a plurality of photo detectors, which generate signals proportional to incident light. The system further includes an optical barrier adjacent to a surface and includes a control circuit. The optical barrier partially obstructs reflected light from reaching the plurality of photo detectors to produce a spatially dependent reflectance pattern that is dependent on a position of an object relative to a substrate. The control circuit determines a position of the object during a reflectance measurement cycle using each of the plurality of photo detectors by calibrating to ambient light conditions, measuring ambient plus reflected light, determining the reflected light and detecting the position of the object based on a ratio of the reflected light received by at least two of the plurality of photo detectors.

U.S. Pat. No. 6,118,119 A describes a device for simultaneously determining the direction and wavelength of an incident light beam. The device includes a transparent block and a diffraction grating for diffracting the incident light beam to produce a number of diffracted beams within the transparent block. The device further includes a detector array generating an output indicative of positions of intersection of the diffracted beams. Finally, the device includes a processor for processing the output to determine the direction and wavelength of the incident light beam.

EP 3 045 935 A1 describes a system for detecting a characteristic of an object, comprising: a source to generate a pulsed radiation pattern; a detector; a processor to process data from the detector when radiation from the radiation source is reflected by an object; a synchronization means interfacing between the detector and the radiation source; wherein: the detector is synchronized with the source so that radiation is detected only during the pulses, the processor determines a characteristic of the object by determining displacement of spots with reference to reference positions, the source emits monochromatic light and the detector is equipped with a corresponding filter arranged on a dome, wherein fish-eye optics arranged between said filter and said detector guide light that has passed through said filter towards a light-sensitive area of said detector.

US 2008/130005 A1 describes an apparatus that detects an object using an optoelectronic apparatus. Light beams generated by a light source are scattered back and/or reflected by an object and are detected by a receiver arrangement in accordance with the triangulation principle. An object detection signal is output by an evaluation unit and the light beams in the receiver arrangement act via an optical receiver system and a microlens array on a pixel array comprising photodetectors. A macropixel has a plurality of subpixels associated with each microlens. The evaluation unit comprises a unit for determining the received signal distribution over the subpixels. Methods for operating the apparatus are also provided.

EP 2 781 931 A2 describes a limited reflection type photoelectric sensor. The limited reflection type photoelectric sensor includes a light projecting unit having a laser diode and a light receiving unit having a photodiode. In the light projecting unit and the light receiving unit, an intersecting angle between an optical axis of a projected light beam and an optical axis of a receiving light beam is set such that the projected light beam from the light projecting unit is directed to an object detection limited area and the receiving light beam which is reflected light from an object existing in the object detection limited area is received by the light receiving unit. Presence/absence of the object is determined based on a light receiving level of the photodiode. A diffracting grating configured to a projected light beam into beams oriented in a plurality of directions is provided in an optical path of the projected light beam from the laser diode.

Problem Addressed by the Invention

It is therefore an object of the present invention to provide devices and methods facing the above-mentioned technical challenges of known devices and methods. Specifically, it is an object of the present invention to provide devices and methods which reliably may determine a position of an object in space, preferably with a low technical effort and with low requirements in terms of technical resources and cost.

SUMMARY OF THE INVENTION

This problem is solved by the invention with the features of the independent patent claims. Advantageous developments of the invention, which can be realized individually or in combination, are presented in the dependent claims and/or in the following specification and detailed embodiments.

As used in the following, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e. a situation in which A solely and exclusively consists of B) and to a situation in which, besides B, one or more further elements are present in entity A, such as element C, elements C and D or even further elements.

Further, it shall be noted that the terms "at least one", "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once.

Further, as used in the following, the terms "preferably", "more preferably", "particularly", "more particularly", "specifically", "more specifically" or similar terms are used in conjunction with optional features, without restricting alternative possibilities. Thus, features introduced by these terms are optional features and are not intended to restrict the scope of the claims in any way. The invention may, as the skilled person will recognize, be performed by using alternative features. Similarly, features introduced by "in an embodiment of the invention" or similar expressions are intended to be optional features, without any restriction regarding alternative embodiments of the invention, without any restrictions regarding the scope of the invention and without any restriction regarding the possibility of combining the features introduced in such a way with other optional or non-optional features of the invention.

In a first aspect of the present invention a detector for determining a position of at least one object is disclosed. As used herein, the term "object" refers to a point or region emitting at least one light beam. The light beam may originate from the object, such as by the object and/or at least one illumination source integrated or attached to the object emitting the light beam, or may originate from a different illumination source, such as from an illumination source directly or indirectly illuminating the object, wherein the light beam is reflected or scattered by the object. As used herein, the term "position" refers to at least one item of information regarding a location and/or orientation of the object and/or at least one part of the object in space. Thus, the at least one item of information may imply at least one distance between at least one point of the object and the at least one detector. As will be outlined in further detail below, the distance may be a longitudinal coordinate or may contribute to determining a longitudinal coordinate of the point of the object. Additionally or alternatively, one or more other items of information regarding the location and/or orientation of the object and/or at least one part of the object may be determined. As an example, additionally, at least one transversal coordinate of the object and/or at least one part of the object may be determined. Thus, the position of the object may imply at least one longitudinal coordinate of the object and/or at least one part of the object. Additionally or alternatively, the position of the object may imply at least one transversal coordinate of the object and/or at least one part of the object. Additionally or alternatively, the position of the object may imply at least one orientation information of the object, indicating an orientation of the object in space.

The detector comprises:
- at least one angle dependent optical element adapted to generate at least one light beam having at least one beam profile depending on an angle of incidence of an incident light beam propagating from the object towards the detector and illuminating the angle dependent optical element, wherein the angle dependent optical element comprises at least one optical element selected from the group consisting of: at least one optical fiber, in particular at least one multifurcated optical fiber, in particular at least one bifurcated optical fiber; at least one lens array arranged in at least one plane perpendicular to an optical axis of the detector, in particular at least one microlens array; at least one optical interference filter; at least one nonlinear optical element, in particular one birefringent optical element;
- at least two optical sensors, wherein each optical sensor has at least one light sensitive area, wherein each optical sensor is designed to generate at least one sensor signal in response to an illumination of its respective light-sensitive area by the light beam generated by the angle dependent optical element;
- at least one evaluation device being configured for determining at least one longitudinal coordinate z of the object by evaluating a combined signal Q from the sensor signals.

The detector comprises at least one transfer device. The transfer device has at least one focal length in response to the at least one incident light beam propagating from the object to the detector. The transfer device specifically may comprise one or more of: at least one lens, for example at least one lens selected from the group consisting of at least one focus-tunable lens, at least one aspheric lens, at least one spherical lens, at least one Fresnel lens; at least one diffractive optical element; at least one concave mirror; at least one beam deflection element, preferably at least one mirror; at least one beam splitting element, preferably at least one of a beam splitting cube or a beam splitting mirror; at least one multi-lens system. The transfer device may comprise at least one gradient index (GRIN) lens.

The transfer device may be adapted to adjust and/or to change the direction of propagation of the light beam. The transfer device may comprise at least one optical axis. The transfer device may be adapted to influence, for example to divert, the light beam propagating from the object to the detector. In particular, the transfer device may be adapted to adjust the direction of propagation of the light beam. The transfer device may be adapted to adjust and/or to generate an angle of propagation with respect to the optical axis of the transfer device. The angle of propagation may be an angle between the optical axis of the transfer device and the direction of propagation of the light beam propagating from the object to the detector. Without using a transfer device the angle of propagation of the light beam may depend primarily on properties of the object, such as surface properties and/or material properties, from which the light beam was generated. The transfer device may be adapted to adjust and/or to generate the angle of propagation such that it is independent from surface properties of the object. The transfer device may be adapted to strengthen and/or to amplify angle dependency of the direction of propagation of the light beam. Without wishing to be bound by theory, the light beam generated by the object may propagate from the object to the detector and may impinge on the transfer device under an angle range from 0°, i.e. the optical axis, to an arbitrary angle X, which may be defined by an origin of the scattering on the object to an edge of the transfer device. Since the transfer device may comprise focusing properties, the angle range after passing through the transfer device may differ significantly from the original angle range. For example, light beams impinging parallel to the optical axis may be focused on the focal point or focus. Depending on focusing properties of the transfer device the angle dependency before impinging on the transfer device and after passing through the transfer device may be inverted. The transfer device may be adapted to amplify the angle dependency for a far field, i.e. in case the object is arranged at far distances, wherein light beams are propagating essentially parallel to the optical axis. Generally, without using the transfer device the angle dependency may be greatest in near field regions. In the near field, signals may generally be stronger compared to far field signals. Therefore, a smaller angle dependency in the near field due to a transfer device that amplifies the angle dependency in the far field, may be at least partially compensated by a generally better signal to noise ratio in the near field, and/or by using additional near field properties such as a distance dependent spot-movement due to a non-zero baseline.

The angle dependent optical element may be arranged in a direction of propagation of the incident light beam propagating from the object to the detector behind the transfer device. The angle dependent optical element and the transfer device may be arranged such that the light beam propagating from the object to the detector passes through the transfer device before impinging on the angle dependent optical element. The transfer device and the angle dependent optical element may be arranged spatially separated in a direction parallel to the optical axis. The transfer device and/or the angle dependent optical element, and/or the detector may be be arranged displaced in a direction perpendicular to the optical axis. The angle dependent optical element may be arranged tilted with respect to the optical axis, so that at least one angle between the angle dependent optical element and the optical axis is below 90°. The angle dependent optical element may be arranged as such, that the light beam propagating from the object to the detector impinges on the angle dependent optical element between the transfer device and the focal point of the transfer device. For example, a distance in a direction parallel to the optical axis between the transfer device and the position where the light beam propagating from the object to the detector impinges on the angle dependent optical element may be at least 20% of the focal length, more preferably at least 50% of the focal length, most preferably at least 80% of the focal length. For example, in case the angle dependent optical element comprises at least one optical fiber, the distance in a direction parallel to the optical axis between an end of the optical fiber receiving the light beam propagating from the object to the detector and the transfer device may be at least 20% of the focal length, more preferably at least 50% of the focal length, most preferably at least 80% of the focal length.

As used herein, an "optical sensor" generally refers to a light-sensitive device for detecting a light beam, such as for detecting an illumination and/or a light spot generated by at least one light beam. As further used herein, a "light-sensitive area" generally refers to an area of the optical sensor which may be illuminated externally, by the at least one light beam, in response to which illumination the at least one sensor signal is generated. The light-sensitive area may specifically be located on a surface of the respective optical sensor. Other embodiments, however, are feasible. As used herein, the term "at least two optical sensors each having at least one light sensitive area" refers to configurations with two single optical sensors each having one light sensitive area and to configurations with one combined optical sensor having at least two light sensitive areas. Thus, the term "optical sensor" furthermore refers to a light-sensitive device configured to generate one output signal, whereas, herein, a light-sensitive device configured to generate two or more output signals, for example at least one CCD and/or CMOS device, is referred to as two or more optical sensors. As will further be outlined in detail below, each optical sensor may be embodied such that precisely one light-sensitive area is present in the respective optical sensor, such as by providing precisely one light-sensitive area which may be illuminated, in response to which illumination precisely one uniform sensor signal is created for the whole optical sensor. Thus, each optical sensor may be a single area optical sensor. The use of the single area optical sensors, however, renders the setup of the detector specifically simple and efficient. Thus, as an example, commercially available photo-sensors, such as commercially available silicon photodiodes, each having precisely one sensitive area, may be used in the set-up. Other embodiments, however, are feasible. Thus, as an example, an optical device comprising two, three, four or more than four light-sensitive areas may be used which is regarded as two, three, four or more than four optical sensors in the context of the present invention. As an example, the optical device may comprise a matrix of light-sensitive areas. Thus, as an example, the optical sensors may be part of or constitute a pixelated optical device. As an example, the optical sensors may be part of or constitute at least one CCD and/or CMOS device having a matrix of pixels, each pixel forming a light-sensitive area.

As further used herein, a "sensor signal" generally refers to a signal generated by an optical sensor in response to the illumination by the light beam. Specifically, the sensor signal may be or may comprise at least one electrical signal, such as at least one analogue electrical signal and/or at least one digital electrical signal. More specifically, the sensor signal may be or may comprise at least one voltage signal and/or at least one current signal. More specifically, the sensor signal may comprise at least one photocurrent. Further, either raw sensor signals may be used, or the detector, the optical sensor or any other element may be adapted to process or preprocess the sensor signal, thereby generating secondary sensor signals, which may also be used as sensor signals, such as preprocessing by filtering or the like.

At least one of the light-sensitive areas may be oriented towards the object. As used herein, the term "is oriented towards the object" generally refers to the situation that the respective surfaces of the light-sensitive areas are fully or partially visible from the object. Specifically, at least one interconnecting line between at least one point of the object and at least one point of the respective light-sensitive area may form an angle with a surface element of the light-sensitive area which is different from 0°, such as an angle in the range of 20° to 90°, preferably 80 to 90° such as 90°. Thus, when the object is located on the optical axis or close to the optical axis, the light beam propagating from the object towards the detector may be essentially parallel to the optical axis. As used herein, the term "essentially perpendicular" refers to the condition of a perpendicular orientation, with a tolerance of e.g. ±20° or less, preferably a tolerance of ±10° or less, more preferably a tolerance of ±5° or less. Similarly, the term "essentially parallel" refers to the condition of a parallel orientation, with a tolerance of e.g. ±20° or less, preferably a tolerance of ±10° or less, more preferably a tolerance of ±5° or less. Additionally or alternatively, at least one of the light-sensitive areas may be oriented differing from an orientation towards the object. For example, at least one of the optical sensors may be oriented perpendicular or under an arbitrary angle to the optical axis and with respect to the object. The angle dependent optical element may be adapted to generate the light beam such that the light beam impinges on the light-sensitive areas. For example, in case at least one of the light-sensitive areas is oriented under the arbitrary angle with respect to the optical axis, the angle dependent optical element may be adapted to guide the light beam onto the light-sensitive area.

The incident light beam may propagate from the object towards the detector. As will be outlined in further detail below, the incident light beam may originate from the object, such as by the object and/or at least one illumination source integrated or attached to the object emitting the light beam, or may originate from a different illumination source, such as from an illumination source directly or indirectly illuminating the object, wherein the light beam is reflected or scattered by the object and, thereby, is at least partially directed towards the detector. The illumination source, as an example, may be or may comprise one or more of an external illumination source, an illumination source integrated into the detector or an illumination source integrated into a beacon device being one or more of attached to the object, integrated into the object or held by the object. Thus, the detector may be used in active and/or passive illumination scenarios. For example, the illumination source may be adapted to illuminate the object, for example, by directing a light beam towards the object, which reflects the light beam. Additionally or alternatively, the object may be adapted to generate and/or to emit the at least one light beam. The light source may be or may comprise at least one multiple beam light source. For example, the light source may comprise at least one laser source and one or more diffractive optical elements (DOEs). The illumination source may be adapted to illuminate the object through at least one angle-dependent optical element.

As used herein, the term "ray" generally refers to a line that is perpendicular to wavefronts of light which points in a direction of energy flow. As used herein, the term "beam" generally refers to a collection of rays. In the following, the terms "ray" and "beam" will be used as synonyms. As further used herein, the term "light beam" generally refers to an amount of light, specifically an amount of light traveling essentially in the same direction, including the possibility of the light beam having a spreading angle or widening angle. The light beam may have a spatial extension. Specifically, the light beam may have a non-Gaussian beam profile. The beam profile may be selected from the group consisting of a trapezoid beam profile; a triangle beam profile; a conical beam profile. The trapezoid beam profile may have a plateau region and at least one edge region. As used herein, the term "beam profile" generally refers to a transverse intensity profile of the light beam. The beam profile may be a spatial distribution, in particular in at least one plane perpendicular to the propagation of the light beam, of an intensity of the light beam. The light beam specifically may be a Gaussian light beam or a linear combination of Gaussian light beams, as will be outlined in further detail below. Other embodiments are feasible, however. The detector may comprise the at least one transfer device configured for one or more of adjusting, defining and determining the beam profile, in particular a shape of the beam profile.

As used herein, the term light generally refers to electromagnetic radiation in one or more of the visible spectral range, the ultraviolet spectral range and the infrared spectral range. Therein, the term visible spectral range generally refers to a spectral range of 380 nm to 780 nm. The term infrared spectral range generally refers to electromagnetic radiation in the range of 780 nm to 1 mm, preferably in the range of 780 nm to 3.0 micrometers. The term ultraviolet spectral range generally refers to electromagnetic radiation in the range of 1 nm to 380 nm, preferably in the range of 100 nm to 380 nm. Preferably, light as used within the present invention is visible light, i.e. light in the visible spectral range.

The term light beam generally may refer to an amount of light emitted and/or reflected into a specific direction. Thus, the light beam may be a bundle of the light rays having a predetermined extension in a direction perpendicular to a direction of propagation of the light beam. Preferably, the light beams may be or may comprise one or more Gaussian light beams such as a linear combination of Gaussian light beams, which may be characterized by one or more Gaussian beam parameters, such as one or more of a beam waist, a Rayleigh-length or any other beam parameter or combination of beam parameters suited to characterize a development of a beam diameter and/or a beam propagation in space.

The optical sensors may be sensitive in one or more of the ultraviolet, the visible or the infrared spectral range. Specifically, the optical sensors may be sensitive in the visible spectral range from 500 nm to 780 nm, most preferably at 650 nm to 750 nm or at 690 nm to 700 nm. Specifically, the optical sensors may be sensitive in the near infrared region. Specifically, the optical sensors may be sensitive in the part of the near infrared region where silicon photodiodes are applicable specifically in the range of 700 nm to 1000 nm. The optical sensors, specifically, may be sensitive in the infrared spectral range, specifically in the range of 780 nm to 3.0 micrometers. For example, the optical sensors each, independently, may be or may comprise at least one element selected from the group consisting of a photodiode, a photocell, a photoconductor, a phototransistor or any combination thereof. For example, the optical sensors may be or may comprise at least one element selected from the group consisting of a CCD sensor element, a CMOS sensor element, a photodiode, a photocell, a photoconductor, a phototransistor or any combination thereof. Any other type of photosensitive element may be used. As will be outlined in further detail below, the photosensitive element generally may fully or partially be made of inorganic materials and/or may fully or partially be made of organic materials. Most commonly, as will be outlined in further detail below, one or more photodiodes may be used, such as commercially available photodiodes, e.g. inorganic semiconductor photodiodes.

As used herein, the term "angle dependent optical element" refers to an optical element adapted to generate the at least one light beam having at least one beam profile depending on the angle of incidence of the incident light beam propagating from the object towards the detector and illuminating the angle dependent optical element. In particular, the angle dependent optical element may be adapted to influence and/or change and/or adjust the beam profile of the incident light beam. For example, the angle dependent optical element may have one or more of angle dependent transmission properties, angle dependent reflection properties or angle dependent absorption properties. The light beam generated by the angle dependent optical element may comprise at least one transmission light beam and/or at least one reflection light beam. The angle of incidence may be measured with respect to an optical axis of the angle dependent optical element.

An electromagnetic wave impinging on a first side, for example a surface and/or an entrance, of the angle dependent optical element may be partly, depending on the properties of the angle dependent optical element, absorbed and/or reflected and/or transmitted. The term "absorption" refers to a reduction of power and/or intensity of the incident light beam by the angle dependent optical element. For example, the power and/or intensity of the incident light beam may be transformed by the angle dependent optical element to heat or another type of energy. As used herein, the term "transmission" refers to a part of the electromagnetic wave which is measurable outside the angle dependent optical element in a half-space with angles from 90° and higher with respect to the optical axis. For example, transmission may be a remaining part of the electromagnetic wave impinging on the first side of the angle dependent optical element, penetrating the angle dependent optical element and leaving the angle dependent optical element at a second side, for example an opposite side and/or an exit. The term "reflection" refers to a part of the electromagnetic wave which is measurable outside the angle dependent optical element in a half-space with angles below 90° with respect to the optical axis. For example, reflection may be a change in direction of a wavefront of the incident light beam due to interaction with the angle dependent optical element.

The total power of the electromagnetic wave impinging on the angle dependent optical element may be distributed by the angle dependent optical element in at least three components, i.e. an absorption component, a reflection component and a transmission component. A degree of transmission may be defined as power of the transmission component normalized by the total power of the electromagnetic wave impinging on the angle dependent optical element. A degree of absorption may be defined as power of the absorption component normalized by the total power of the electromagnetic wave impinging on the angle dependent optical element. A degree of reflection may be defined as power of the reflection component normalized by the total power of the electromagnetic wave impinging on the angle dependent optical element.

As used herein, "angle dependent transmission" refers to the fact that the degree of transmission depends on the angle of incidence at which the incident light beam propagating from the object towards the detector impinges on the angle dependent optical element. As outlined above, the angle of incident may be measured with respect to an optical axis of the angle dependent optical element. The angle dependent optical element may be arranged in the direction of propagation behind at least one transfer device. The angle dependent optical element and the transfer device may be arranged such that the light beam propagating from the object to the detector passes through the transfer device before impinging on the angle dependent optical element. The angle dependent optical element may be arranged as such, that the light beam propagating from the object to the detector impinges on the angle dependent optical element between the transfer device and the focal point of the transfer device. Use of at least one transfer device allows to further enhance robustness of the measurement of the longitudinal coordinate. The transfer device may, for example, comprise at least one collimating lens. The angle dependent optical element may be designed to weaken rays impinging with larger angles compared to rays impinging with a smaller angle. For example, the degree of transmission may be highest for light rays parallel to the optical axis, i.e. at 0°, and may decrease for higher angles. In particular, at at least one cut-off angle the degree of transmission may steeply fall to zero. Thus, light rays having a large angle of incidence may be cut-off.

As used herein, the term "angle dependent absorption" refers to the fact that the degree of absorption depends on the angle of incidence at which the incident light beam propagating from the object towards the detector impinges on the angle dependent optical element. As used herein, the term "angle dependent absorption" refers to the fact that a degree of absorption depends on the angle of incidence at which the incident light beam propagating from the object towards the detector impinges on the angle dependent optical element. For example, photon energy and/or intensity of the light beam propagating from the object to the detector may be reduced depending on the angle of incidence.

As used herein, the term "angle dependent reflection" refers to the fact that the degree of reflection depends on the angle of incidence at which the incident light beam propagating from the object towards the detector impinges on the angle dependent optical element.

The angle dependent optical element comprises at least one optical element selected from the group consisting of: at least one optical fiber, in particular at least one multifurcated optical fiber, in particular at least one bifurcated optical fiber; at least one lens array arranged in at least one plane perpendicular to an optical axis of the detector, in particular at least one microlens array; at least one optical interference filter; at least one nonlinear optical element, in particular one birefringent optical element. The angle dependent optical element may comprise at least one optical element selected from the group consisting of: at least one diffractive optical element; at least one angle dependent reflective element, at least one diffractive grating element, in particular a blaze grating element; at least one aperture stop; at least one prism; at least one lens; at least one transmission grating. The at least one optical interference filter generally may be at least one arbitrary optical filter based on the principle of interference. The optical interference filter may be and/or may comprise at least one polarization filter and/or at least one bandpass filter and/or at least one liquid crystal filter, in particular a liquid crystal tunable filter, and/or at least one short-pass filter and/or at least one long-pass filter and/or at least one notch filter.

For example, the angle dependent optical element comprises at least one optical fiber. Specifically, the angle dependent optical element comprises at least one optical measurement fiber. The optical fiber may be designed such that the degree of transmission may be highest for incoming light rays parallel, i.e. at an angle of 0°, to the optical fiber, neglecting reflection effects. The optical fiber may be designed such that for higher angles, for example angles from 1° to 10°, the degree of transmission may decrease smoothly to around 80% of the degree of transmission for parallel light rays and may remain at this level constantly up to an acceptance angle of the optical fiber. As used herein, the term "acceptance angle" may refer to an angle above which total reflection within the optical fiber is not possible such that the light rays are reflected out of the optical fiber. The optical fiber may be designed that at the acceptance angle, the degree of transmission may steeply fall to zero. Light rays having a large angle of incidence may be cut-off.

The optical fiber may be adapted to transmit at least parts of the incident light beam which are not absorbed and/or reflected, between two ends of the optical fiber. The optical fiber may have a length and may be adapted to permit transmission over a distance. The optical fiber may comprise at least one material selected from the group consisting of: silica, aluminosilicate glass, germane silicate glass, fluorozirconate, rare earth doped glass, fluoride glass, chalcogenide glasses, sapphire, doped variants, especially for silica glass, phosphate glass, PMMA, polystyrene, fluoropolymers such as poly(perfluoro-butenylvinyl ether), or the like. The optical fiber may be a single or multi-mode fiber. The optical fiber may be a step index fiber, a polarizing fiber, a polarization maintaining fiber, a plastic optical fiber or the like. The optical fiber may comprise at least one fiber core which is surrounded by at least one fiber cladding having a lower index of refraction as the fiber core. The fiber cladding may also be a double or multiple cladding. The fiber cladding may comprise a so-called outer jacket. The fiber cladding may be coated by a so-called buffer adapted to protect the optical fiber from damages and moisture. The buffer may comprise at least one UV-cured urethane acrylate composite and/or at least one polyimide material. In one embodiment, a refractive index of the fiber core may be higher than the refractive index of the fiber cladding material and the optical fiber may be adapted to guide the incoming light beam by total internal reflection below the angle of acceptance. In one embodiment, the optical fiber may comprise at least one hollow core fiber, also called photonic bandgap fiber. The hollow-core fiber may be adapted to guide the incoming light beam essentially within a so-called hollow region, wherein a minor portion of the light beam is lost due to propagation into the fiber cladding material.

The optical fiber may comprise one or more fiber connectors at the end of the fiber. The optical fiber may comprise end caps such as coreless end caps. The optical fiber may comprise one or more of a fiber coupler, a fiber Bragg grating, a fiber polarizer, a fiber amplifier, a fiber coupled diode laser, a fiber collimator, a fiber joint, a fiber splicing, a fiber connector, a mechanical splicing, a fusion splicing, or the like. The optical fiber may comprise a polymer coating.

The optical fiber may comprise at least two or more fibers. The optical fiber may be at least one multifurcated optical fiber, in particular at least one bifurcated optical fiber. For example, the bifurcated optical fiber may comprise two fibers, in particular at least one first fiber and at least one second fiber. The first fiber and the second fiber may be arranged close to each other at an entrance end of the bifurcated optical fiber and may split into two legs separated by a distance at an exit end of the bifurcated optical fiber. The first and second fiber may be designed as fibers having identical properties or may be fibers of different type. The first fiber may be adapted to generate at least one first transmission light beam and the second fiber may be adapted to generate at least one second transmission light beam. The bifurcated optical fiber may be arranged such that the incident light beam may impinge at a first angle of incidence into the first fiber and at a second angle of incidence, different from the first angle, into the second fiber, such that the degree of transmission is different for the first transmission light beam and the second transmission light beam. One of the optical sensors may be arranged at an exit end of the first fiber and the other optical sensor may be arranged at an exit end of the second fiber. The optical fiber may comprise more than two fibers, for example three, four or more fibers. For example, the multifurcated may comprise multiple fibers wherein each fiber may comprise at least one of a core, a cladding, a buffer, a jacket, and one or more fibers may partially or entirely be bundled by a further jacket such as a polymer hose to ensure that the fibers stay close to each other such as at one end of the fiber. All optical fibers may have the same numerical aperture. All optical fibers may be arranged as such, that the light beam propagating from the object to the detector impinges on all of the optical fibers between the transfer device and the focal point of the transfer device. The optical fibers may be arranged as such, that the position along the optical axis where the light beam propagating from the object to the detector impinges on the optical fibers is identical for all optical fibers. Other arrangements may be possible.

The detector may comprise a plurality of optical fibers, for example a plurality of single optical fibers or a plurality of multifurcated optical fibers. For example, the optical fibers may be arranged in a bundle of optical fibers. For example, the detector may comprise a plurality of single optical fibers, for example optical fibers having identical properties. The optical fibers, i.e. the single optical fibers or multifurcated optical fibers, may be arranged such that the incident light beam may impinge at different angles of incidence into each of the optical fibers such that the degree of transmission is different for each of the optical fibers. At the exit ends of each optical fiber at least one optical sensor may be arranged. Alternatively, at least two or more of the optical fibers may use the same optical sensor. The optical sensors at the end of the optical fibers may be arranged as such that at least 80%, preferably at least 90%, more preferably at least 99% of the luminance power of the light beams exiting the optical fiber towards the optical sensors impinge on at least one optical sensor. In case the angle dependent optical element is an optical fiber, the relevant position of the angle dependent optical element and/or the optical sensor relative to the transfer device to optimize the combined signal Q may be given by the position where the light beam travelling from the object to the detector impinges on the angle dependent optical element. In particular, the position relative to the transfer device where the light beam travelling from the object to the detector impinges on the optical fiber may be optimized to obtain a combined signal Q with a high dynamic range. Further, concerning the optimization of the optical setup, in case the angle dependent optical element is an optical fiber, the position where the light beam travelling from the object to the detector impinges on the optical fiber corresponds to the position where the light beam travelling from the object to the detector impinges on the optical sensor in case the angle dependent optical element is not a fiber, such as an interference filter.

The detector may further comprise an illumination source for illuminating the object. As an example, the illumination source may be configured for generating an illuminating light beam for illuminating the object. The detector may be configured such that the illuminating light beam propagates from the detector towards the object along an optical axis of the detector. For this purpose, the detector may comprise at least one reflective element, preferably at least one prism, for deflecting the illuminating light beam onto the optical axis.

Specifically, the illumination source may comprise at least one laser and/or laser source. Various types of lasers may be employed, such as semiconductor lasers. Additionally or alternatively, non-laser light sources may be used, such as LEDs and/or light bulbs. The illumination source may be adapted to generate and/or to project a cloud of points, for example the illumination source may comprise one or more of at least one digital light processing projector, at least one LCoS projector, at least one spatial light modulator; at least one diffractive optical element; at least one array of light emitting diodes; at least one array of laser light sources. The illumination source may comprise an artificial illumination source, in particular at least one laser source and/or at least one incandescent lamp and/or at least one semiconductor light source, for example, at least one light-emitting diode, in particular an organic and/or inorganic light-emitting diode. As an example, the light emitted by the illumination source may have a wavelength of 300 to 1000 nm, especially 500 to 1000 nm. Additionally or alternatively, light in the infrared spectral range may be used, such as in the range of 780 nm to 3.0 µm. Specifically, the light in the part of the near infrared region where silicon photodiodes are applicable specifically in the range of 700 nm to 1000 nm may be used. On account of their generally defined beam profiles and other properties of handleability, the use of at least one laser source as the illumination source is particularly preferred. The illumination source may be integrated into a housing of the detector.

Further, the illumination source may be configured for emitting modulated or non-modulated light. In case a plurality of illumination sources is used, the different illumination sources may have different modulation frequencies which, as outlined in further detail below, later on may be used for distinguishing the light beams.

The illuminating light beam generally may be parallel to the optical axis or tilted with respect to the optical axis, e.g. including an angle with the optical axis. As an example, the illuminating light beam, such as the laser light beam, and the optical axis may include an angle of less than 10°, preferably less than 5° or even less than 2°. Other embodiments, however, are feasible. Further, the illuminating light beam may be on the optical axis or off the optical axis. As an example, the illuminating light beam may be parallel to the optical axis having a distance of less than 10 mm to the optical axis, preferably less than 5 mm to the optical axis or even less than 1 mm to the optical axis or may even coincide with the optical axis.

The illumination source may be adapted to illuminate the object through the angle dependent optical element. The optical fiber may comprise at least one illumination fiber adapted to transmit at least one incoming light beam generated by the illumination source such that it illuminates the object. The illumination source may be adapted to couple the at least one light beam generated by the illumination source into the illumination fiber. The detector may comprise at least one coupling element, for example at least one in-coupling element and/or at least one outcoupling element, which may be arranged in front of and/or behind the optical fiber. The coupling element may be or may comprise at least one transfer device.

The detector may comprise a further coupling element, in particular a further in-coupling element, adapted to couple the light beam travelling from the object to the detector into the illumination fiber. The further coupling element may be arranged in direction of propagation of the light beam travelling from the object to the detector in front of the optical fiber. The further coupling element may be or may comprise at least one transfer device.

In case the detector comprises a plurality of optical fibers, the detector may comprise one illumination source or a plurality of identical illumination sources and/or a plurality of different illumination sources. For example, the plurality of illumination sources may comprise at least two illumination sources generating light with different properties such as color or modulation frequencies. In one embodiment, at least two of the optical fibers of the plurality of the optical fibers may be illuminated using the same illumination source and/or two identical illumination sources. At the exit ends of each optical fiber illuminated by the same illumination source and/or by identical illumination sources at least one optical sensor may be arranged. Alternatively, at least two or more of the optical fibers illuminated by the same illumination source may use the same optical sensor. Such a detector, in which for a plurality of optical fibers the same illumination source and same optical sensors are used, may be used as proximity sensor. In one embodiment, at least two of the optical fibers of the plurality of optical fibers may be illuminated by using at least two different illumination sources. At the exit ends of each optical fiber at least one optical sensor may be arranged. Alternatively, at least two or more of the optical fibers may use the same optical sensor.

The detector may comprise a small baseline. In particular, the baseline may be a distance between at least one illumination channel and at least one receiver channel of the detector. Specifically, a distance, for example in a xy-plane, between at least one illumination channel and at least one receiver channel may be as small as possible. As used herein, the term "illumination channel" refers to at least one optical channel comprising at least one illumination source and/or at least one light emitting element such as at least one optical illumination fiber adapted to generate at least one illumination light beam for illuminating the at least one object. The illumination channel may comprise at least one transmitter-optics such as at least one illumination source and at least one lens element. As used herein, the term "receiver channel" refers to at least one optical channel comprising at least one optical element adapted to receive the light beam propagating from the object to the detector. The receiver channel may comprise at least one receiver-optics such as the at least one transfer device and the at least one angle dependent optical element and the optical sensors. The baseline, i.e. the distance between the illumination channel and the receiver channel, may be a minimum distance. The minimum distance may depend only on a size of components of the transmitter-optics and the receiver-optics. The minimum distance may be zero. In particular, a distance perpendicular to an optical axis of the detector between the illumination source and the optical sensors may be small. The distance perpendicular to the optical axis of the detector between the illumination source and the optical sensors may be less than 0.1 m, preferably less than 0.05 m, more preferably less than 0.025. In particular, the distance perpendicular to the optical axis of the detector between the illumination source and the optical sensors may be less than 0.01 m, preferably less than 0.005 m, more preferably less than 0.0025 m. In particular, the distance between the detector and the illumination source may be less than 150% of a diameter of the transfer device, preferably less than 110% of the diameter of the transfer device, more preferably less than 100% of the diameter of the transfer device. Embodiments, wherein the baseline is zero are possible. The illumination source and the optical axis may be separated by a small baseline. As used herein, the term "baseline", also denoted as basis line, further refers to a distance, for example in a xy-plane, between at least one transmitter-optics and at least one receiver-optics. For example, the baseline may be a distance between the optical axis and the illumination source, in particular a distance between the optical axis and a z-component of the illumination light beam. The detector may comprise additional optical elements, for example, at least one mirror, which may additionally enhance distance to the illumination source. For example, in case the angle dependent optical element comprises the at least one optical fiber, the baseline may be a distance between transmitter-lens and receiver-lens. The transmitter-lens may be arranged behind the optical illumination fiber in direction of propagation of the illumination light beam. The receiver-lens may be arranged in front of the optical fiber in a direction of propagation of the light beam propagating from the object to the detector. The transfer device may comprise the receiver-lens. Specifically, in case the angle dependent optical element comprises the at least one optical fiber, also denoted as receiving fiber, the term "baseline" refers to a distance between the position where the light beam propagating from the object to the detector impinges on the angle dependent optical element, in particular at least one entrance face of the at least one receiving fiber, and the illumination source and/or at least one exit face of at least one optical illumination fiber. As used herein, the term "entrance face of the optical illumination fiber" refers to at least one end of the optical illumination fiber which is adapted to receive the light beam generated by the illumination source. The term "exit face of the optical illumination fiber" refers to at least one end of the optical fiber from which the light beam propagating through the optical illumination fiber leaves the optical illumination fiber. As used herein, the term "entrance face of the optical fiber" refers to at least one end of the optical fiber which is adapted to receive the light beam propagating from the object to the detector. The term "exit face of the optical fiber" refers to at least one end of the optical fiber from which the light beam propagating through the optical fiber leaves the optical fiber. The angle dependent element may comprise two receiving fibers, a first receiving fiber providing light to a first optical sensor and a second receiving fiber providing light to a second optical sensor. Each of the receiving fibers may comprise an exit end and an entrance end. For example, the angle dependent optical element may comprise at least two optical fibers each having at least one entrance face, wherein the entrance faces are arranged, in particular within a measuring head, concentric or on top of each other or parallel to each other or side by side. The distance perpendicular to an optical axis of the detector between the illumination source and/or an exit end of the optical illumination fiber and one or both entrance faces may be less than 0.01 m, preferably less than 0.005 m, more preferably less than 0.0025 m.

The illumination source and/or the exit face of the illumination fiber may be spaced apart from the optical axis by a minimum distance. The minimum distance from the optical axis may be defined by further detector elements such as size and position of the optical sensors and of the at least one transfer device, which will be described in detail below. The baseline may be less than 0.1 m, preferably less than 0.05 m, more preferably less than 0.025 m. The baseline may be less than 0.01 m, preferably less than 0.005 m, more preferably less than 0.0025 m. For example, the baseline may be 2 mm. In particular, a distance between the illumination source and/or the exit face of the illumination fiber and the angle dependent optical element is small. In case the angle dependent optical element is or comprises at least one optical fiber, a distance between the illumination source and/or the exit face of the illumination fiber and an entrance to the optical fiber is small. In particular in case the angle dependent optical element is an optical fiber, the baseline may even be smaller than a radius of the transfer device. For example, the angle dependent optical element may be an optical fiber. The illumination source may be guided through an optical fiber wherein the illumination beam may exit the optical fiber behind the transfer device within a baseline that is smaller than the radius of the transfer device. The baseline may be zero. The illumination source may be adapted to generate at least one illumination light beam, wherein the optical fiber guiding the illumination beam may be attached to the transfer device such as by a polymer or glue or the like, to reduce reflections at interfaces with larger differences in refractive index. For example, the detector may be a compact device without further optical elements, wherein the illumination source may be placed as close as possible to an edge of the transfer device. Thus, the baseline may be close to half a diameter of the transfer device, in particular the lens diameter and housings of lens and light source. For example, the detector may be an even more compact device, wherein a mirror, in particular a small mirror, may be positioned in front of the transfer device, in particular in a center, for example a geometrical center, or close to the center of the transfer device, in order to couple the illumination beam into the beam path. Thus, the baseline may be less than half the diameter of the transfer device. The illumination source may be arranged such that the baseline is as small as possible. By arranging the illumination source and/or the exit face of the illumination fiber such that the direction of propagation of the illumination light beam is essentially parallel to the optical axis and that the illumination source and/or the exit face of the illumination fiber and the optical axis are separated by the small baseline, very compact devices are possible. For example, a distance from the center of the transfer device to the illumination source and/or the exit face of the illumination fiber, in particular along a connecting line from the center of the transfer device to the illumination source and/or the exit face of the illumination fiber, may be preferably less than 2.5 times a distance from the center of the transfer device to an edge if the transfer device, more preferably less than 1.5 times the distance center to edge of the transfer device, and most preferably less 1 times the distance center to edge of the transfer device. The transfer device may have an arbitrary shape, in particular non-circular shapes are possible. At small distances an aperture of the illumination source may be small and the baseline may be small. At large distances an aperture of the illumination source may be large and the baseline may be small. This is contrarily as in triangulation methods, wherein at large distances a large baseline is necessary. Further, triangulation based systems have a minimum detection range significantly greater than zero, for example such as 20 cm from the detector system, due to necessary spatial extend of the baseline. Such a large baseline may result in that the illuminated light scattered from the object may not reach the light sensitive area of the optical sensor behind the transfer device. In addition, in triangulation based systems, using a small baseline would reduce the minimum detection range, however, at the same time would reduce a maximum detection range. Further, triangulation based systems require a plurality of light sensitive areas and sensor signals, for example sensor signals of at least one detector row. According to the invention, determination of the longitudinal coordinate z is possible with a reduced number of sensor signals, in particular with less than 20, preferably less than 10 and more preferably less than 5 sensor signals. The illumination source and the angle dependent optical element may be arranged in the direction of propagation of the light beam traveling from the object to the detector behind the transfer device, which will be described in detail below. The distance perpendicular to the optical axis of the detector between the illumination source and/or the exit face of the illumination fiber and the optical sensors may be less than the radius of the transfer device.

The illumination source and/or the exit face of the illumination fiber and one or both of the optical sensors may be arranged with a relative spatial offset from the optical axis of the detector. In particular, the illumination source and/or the exit face of the illumination fiber and one or both of the optical sensors may be arranged with different spatial offsets from the optical axis. The illumination source and/or the exit face of the illumination fiber and the angle dependent optical element may be arranged with a relative spatial offset from the optical axis of the detector. In particular, the illumination source and/or the exit face of the illumination fiber and the angle dependent optical element may be arranged with different spatial offsets from the optical axis. The optical sensors may be arranged with a relative spatial offset from the optical axis of the detector. In particular, each of the optical sensors may be arranged with different spatial offset from the optical axis of the detector. The illumination source and the optical sensors and/or the illumination source and the angle dependent optical element and/or the optical sensors may be arranged with a relative spatial offset from the optical axis of the detector. Such an arrangement may allow enhancing the tendency of the quotient, and thus, accuracy of the distance measurement. In particular, with increasing spatial offset a slope in a Q vs distance diagram increases and thus allows distinguishing similar distances more accurately. For example, one of the illumination source and the optical sensors may be arranged on the optical axis and the other one may be arranged spaced apart from the optical axis. For example, both of illumination source and the optical sensors may be arranged space apart from the optical axis by at least one different distance, in particular perpendicular to the optical axis. For example, the at least two fibers of a multifurcated optical fiber may be arranged at different distances from the optical axis. The angle dependent optical element may be adapted to mimic a larger distance compared to the real distance perpendicular to an optical axis between the illumination source and the optical sensors without moving the illumination source and/or optical sensors.

In addition, the detector comprises at least one transfer device. The term "transfer device", also denoted as "transfer system", may generally refer to one or more optical elements which are adapted to modify the light beam, such as by modifying one or more of a beam parameter of the light beam, a width of the light beam or a direction of the light beam. The transfer device may be adapted to guide the light beam onto the optical sensors. The transfer device specifically may comprise one or more of: at least one lens, for example at least one lens selected from the group consisting of at least one focus-tunable lens, at least one aspheric lens, at least one spherical lens, at least one Fresnel lens; at least one diffractive optical element; at least one concave mirror; at least one beam deflection element, preferably at least one mirror; at least one beam splitting element, preferably at least one of a beam splitting cube or a beam splitting mirror; at least one multi-lens system. The transfer device may comprise at least one gradient index (GRIN) lens. The GRIN lens may have a continuous refraction gradient, for example, an axial and/or radial and/or spherical refraction gradient. The f-number of the GRIN lens may be dependent on a lens length. Using GRIN lens may allow miniaturizing optics, in particular using very thin optics. For example, very thin optics with a thickness or diameter of 0.2 mm may be possible. The transfer device may comprise at least one annular axial lens, for example torus form. The annular axial lens may have a plano-convex form, for example, an axial and/or radial and/or spherical curvature.

As used herein, the term "focal length" of the transfer device refers to a distance over which incident collimated rays which may impinge the transfer device are brought into a "focus" which may also be denoted as "focal point". Thus, the focal length constitutes a measure of an ability of the transfer device to converge an impinging light beam. Thus, the transfer device may comprise one or more imaging elements which can have the effect of a converging lens. By way of example, the transfer device can have one or more lenses, in particular one or more refractive lenses, and/or one or more convex mirrors. In this example, the focal length may be defined as a distance from the center of the thin refractive lens to the principal focal points of the thin lens. For a converging thin refractive lens, such as a convex or biconvex thin lens, the focal length may be considered as being positive and may provide the distance at which a beam of collimated light impinging the thin lens as the transfer device may be focused into a single spot. Additionally, the transfer device can comprise at least one wavelength-selective element, for example at least one optical filter. Additionally, the transfer device can be designed to impress a predefined beam profile on the electromagnetic radiation, for example, at the location of the sensor region and in particular the sensor area. The abovementioned optional embodiments of the transfer device can, in principle, be realized individually or in any desired combination.

The transfer device may have an optical axis. In particular, the detector and the transfer device have a common optical axis. As used herein, the term "optical axis of the transfer device" generally refers to an axis of mirror symmetry or rotational symmetry of the lens or lens system. The optical axis of the detector may be a line of symmetry of the optical setup of the detector. The detector comprises at least one transfer device, preferably at least one transfer system having at least one lens. The transfer system, as an example, may comprise at least one beam path, with the elements of the transfer system in the beam path being located in a rotationally arranged or even symmetrical fashion with respect to the optical axis. Still, as will also be outlined in further detail below, one or more optical elements located within the beam path may also be off-centered or tilted with respect to the optical axis. In this case, however, the optical axis may be defined sequentially, such as by interconnecting the centers of the optical elements in the beam path, e.g. by interconnecting the centers of the lenses, wherein, in this context, the optical sensors are not counted as optical elements. The optical axis generally may denote the beam path. Therein, the detector may have a single beam path along which a light beam may travel from the object to the optical sensors, or may have a plurality of beam paths. As an example, a single beam path may be given or the beam path may be split into two or more partial beam paths. In the latter case, each partial beam path may have its own optical axis. The optical sensors may be located in one and the same beam path or partial beam path. Alternatively, however, the optical sensors may also be located in different partial beam paths.

The transfer device may constitute a coordinate system, wherein a longitudinal coordinate I is a coordinate along the optical axis and wherein d is a spatial offset from the optical axis. The coordinate system may be a polar coordinate system in which the optical axis of the transfer device forms a z-axis and in which a distance from the z-axis and a polar angle may be used as additional coordinates. A direction parallel or antiparallel to the z-axis may be considered a longitudinal direction, and a coordinate along the z-axis may be considered a longitudinal coordinate I. Any direction perpendicular to the z-axis may be considered a transversal direction, and the polar coordinate and/or the polar angle may be considered a transversal coordinate.

The optical sensors and/or the entrance face of the at least one receiving fiber may be positioned off focus. As used herein, the term "focus" generally refers to one or both of a minimum extend of a circle of confusion of the light beam, in particular of at least one light beam emitted from one point of the object, caused by the transfer device or a focal length of the transfer device. As used herein, the term "circle of confusion" refers to a light spot caused by a cone of light rays of the light beam focused by the transfer device. The circle of confusion may depend on a focal length f of the transfer device, a longitudinal distance from the object to the transfer device, a diameter of an exit pupil of the transfer device, a longitudinal distance from the transfer device to the light sensitive area, a distance from the transfer device to an image of the object. For example, for Gaussian beams, a diameter of the circle of confusion may be a width of the Gaussian beam. In particular, for a point like object situated or placed at infinite distance from the detector the transfer device may be adapted to focus the light beam from the object into a focus point at the focal length of the transfer device. For non-point like objects situated or placed at infinite distance from the detector the transfer device may be adapted to focus the light beam from at least one point of the object into a focus plane at the focal length of the transfer device. For point like objects not situated or placed at infinite distance from the detector, the circle of confusion may have a minimum extend at least at one longitudinal coordinate. For non-point like objects not situated or placed at infinite distance from the detector, the circle of confusion of the light beam from at least one point of the object may have a minimum extend at least at one longitudinal coordinate. As used herein, the term "positioned off focus" generally refers to a position other than the minimum extend of a circle of confusion of the light beam caused by the transfer device or a focal length of the transfer device. In particular, the focal point or minimum extend of the circle of confusion may be at a longitudinal coordinate $I_{focus}$, whereas the position of each of the optical sensors and/or the entrance face of the at least one receiving fiber may have a longitudinal coordinate $I_{sensor}$ different from $I_{focus}$. For example, the longitudinal coordinate $I_{sensor}$ may be, in a longitudinal direction, arranged closer to the position of the transfer device than the longitudinal coordinate $I_{focus}$ or may be arranged further away from the position of the transfer device than the longitudinal coordinate $I_{focus}$. Thus, the longitudinal coordinate $I_{sensor}$ and the longitudinal coordinate $I_{focus}$ may be situated at different distances from the transfer device. For example, the optical sensors and/or the entrance face of the at least one receiving fiber may be spaced apart from the minimum extend of the circle of confusion in longitudinal direction by ±2% of focal length, preferably by ±10% of focal length, most preferably ±20% of focal length. For example, at a focal length of the transfer device may be 20 mm and the longitudinal coordinate $I_{sensor}$ may be 19.5 mm, i.e. the sensors and/or the entrance face of the at least one receiving fiber may be positioned at 97.5% focal length, such that $I_{sensor}$ is spaced apart from the focus by 2.5% of focal length.

As outlined above, the optical sensors and/or the entrance face of the at least one receiving fiber may be arranged off focus. The optical sensors and/or the entrance face of the at least one receiving fiber may be arranged such that the variance over distance dependence of the combined signal is maximal, which is equivalent to a maximum dynamic range in the combined signal Q. Without wishing to be bound by this theory, a practical approximation for maximizing the dynamic range is to maximize a circle of confusion variance over distance dependence. The quotient of circle of confusion radii at small and large object distances is a practical approximation to the quotient of combined signals at small and large object distances. In particular, the optical sensors and/or the entrance face of the at least one receiving fiber may be positioned as such that a combined signal $Q_{far}$ at large object distances and a combined signal $Q_{close}$ at small object distances have a maximum variation $$\frac{Q_{far}}{Q_{close}} \approx \frac{r_{CoC}^{Object,close}(z_O, z_s, z_i)^2}{r_{CoC}^{Object,far}(z_O, z_s, z_i)^2} \to \max,$$

wherein $r_{CoC}^{Object,close}$ is a radius of the circle of confusion at small object distances and $r_{CoC}^{Object,far}$ is a radius of the circle of confusion at large object distances, wherein $z_O$ is a detectable distance range between optical sensors and/or the entrance face of the at least one receiving fiber and the object, $z_s$ is a distance between the transfer device and the optical sensors and/or the entrance face of the at least one receiving fiber and $z_i$ is a position of the focused image behind the transfer device, which depends on the position of the object $z_o$. The optimal position of the optical sensors and/or the optimal position of the angle dependent optical element, specifically the position of the end of the optical fiber where the light beam travelling from the object to the detector impinges on the optical fiber, may be adjusted using the following steps: i) positioning the optical sensors and/or the entrance face of the at least one receiving fiber at a focal point of farthest object distance; ii) moving the optical sensors and/or the entrance face of the at least one receiving fiber out of the focal point, in particular along or against the optical axis, such that a distance Δ from the focal point gives the best circle of confusion variation and the largest range, wherein $$\Delta = \frac{z_i^2(z_O^{far})}{z_O^{far} f} O_{size} F_\#,$$

wherein $O_{size}$ is the spot size on the optical sensor and/or the entrance face of the at least one receiving fiber, f is the focal length of the transfer device $F_\#$ is the F number of the transfer device, $z_O^{far}$ is the farthest object distance.

The optical sensors and/or the entrance face of the at least one receiving fiber may be arranged such that the light-sensitive areas of the optical sensors and/or the entrance face of the at least one receiving fiber differ in at least one of: their longitudinal coordinate, their spatial offset, or their surface areas.

Each light-sensitive area may have a geometrical center. As used herein, the term "geometrical center" of an area generally may refer to a center of gravity of the area. As an example, if an arbitrary point inside or outside the area is chosen, and if an integral is formed over the vectors interconnecting this arbitrary point with each and every point of the area, the integral is a function of the position of the arbitrary point. When the arbitrary point is located in the geometrical center of the area, the integral of the absolute value of the integral is minimized. Thus, in other words, the geometrical center may be a point inside or outside the area with a minimum overall or sum distance from all points of the area.

For example, each geometrical center of each light-sensitive area may be arranged at a longitudinal coordinate $I_{center,i}$, wherein i denotes the number of the respective optical sensor. In the case of the detector comprising precisely two optical sensors and in the case of the detector comprising more than two optical sensors, the optical sensors may comprise at least one first optical sensor, wherein the first optical sensor, in particular the geometrical center, being arranged at a first longitudinal coordinate $I_{center,1}$, and at least one second optical sensor, wherein the second optical sensor, in particular the geometrical center, being at a second longitudinal coordinate $I_{center,2}$, wherein the first longitudinal coordinate and the second longitudinal coordinate differ. For example, the first optical sensor and the second optical sensor may be located in different planes which are offset in a direction of the optical axis. The first optical sensor may be arranged in front of the second optical sensor. Thus, as an example, the first optical sensor may simply be placed on the surface of the second optical sensor. Additionally or alternatively, the first optical sensor may be spaced apart from the second optical sensor, for example, by no more than five times the square root of a surface area of the first light-sensitive area. Additionally or alternatively, the first optical sensor may be arranged in front of the second optical sensor and may be spaced apart from the second optical sensor by no more than 50 mm, preferably by no more than 15 mm. Relative distance of the first optical sensor and second optical sensor may depend, for example, on focal length or object distance.

The longitudinal coordinates of the optical sensors may also be identical, as long as one of the above-mentioned conditions is fulfilled. For example, the longitudinal coordinates of the optical sensors may be identical, but the light-sensitive areas may be spaced apart from the optical axis and/or the surface areas differ.

Each geometrical center of each light-sensitive area may be spaced apart from the optical axis of the transfer device, such as the optical axis of the beam path or the respective beam path in which the respective optical sensor is located. The distance, in particular in transversal direction, between the geometrical center and the optical axis is denoted by the term "spatial offset". In the case of the detector comprising precisely two optical sensors and in the case of the detector comprising more than two optical sensors, the optical sensors may comprise at least one first optical sensor being spaced apart from the optical axis by a first spatial offset and at least one second optical sensor being spaced apart from the optical axis by a second spatial offset, wherein the first spatial offset and the second spatial offset differ. The first and second spatial offsets, as an example, may differ by at least a factor of 1.2, more preferably by at least a factor of 1.5, more preferably by at least a factor of two. The spatial offsets may also be zero or may assume negative values, as long as one of the above-mentioned conditions is fulfilled.

As used herein, the term "surface area" generally refers to both of a shape and a content of at least one light-sensitive area. In the case of the detector comprising precisely two optical sensors and in the case of the detector comprising more than two optical sensors, the optical sensors may comprise at least one first optical sensor having a first surface area and at least one second optical sensor having a second surface area. In the case of the detector comprising more than two optical sensors, e.g. a sensor element comprising a matrix of optical sensors, a first group of optical sensors or at least one of the optical sensors of the matrix may form a first surface area, wherein a second group of optical sensors or at least one other optical sensor of the matrix may form a second surface area. The first surface area and the second surface area may differ. In particular, the first surface area and the second surface area are not congruent. Thus, the surface area of the first optical sensor and the second optical sensor may differ in one or more of the shape or content. For example, the first surface area may be smaller than the second surface area. As an example, both the first surface area and the second surface area may have the shape of a square or of a rectangle, wherein side lengths of the square or rectangle of the first surface area are smaller than corresponding side lengths of the square or rectangle of the second surface area. Alternatively, as an example, both the first surface area and the second surface area may have the shape of a circle, wherein a diameter of the first surface area is smaller than a diameter of the second surface area. Again, alternatively, as an example, the first surface area may have a first equivalent diameter, and the second surface area may have a second equivalent diameter, wherein the first equivalent diameter is smaller than the second equivalent diameter. The surface areas may be congruent, as long as one of the above-mentioned conditions is fulfilled.

The optical sensors, in particular the light-sensitive areas, may overlap or may be arranged such that no overlap between the optical sensors is given.

For example, the detector may comprise at least two optical fibers, in particular at least two receiving fibers, wherein a first receiving fiber is adapted to provide at least one part of the light beam propagating from the object to the detector to a first optical sensor and wherein a second receiving fiber is adapted to provide at least one part of the light beam propagating from the object to the detector to a second optical sensor. The detector, in particular the angle dependent optical element, may comprise a plurality of optical fibers, wherein each of the optical fibers is adapted to provide at least one part of the light beam propagating from the object to the detector to one of the optical sensors. Each geometrical center of the respective entrance face of the receiving fibers may be arranged at a longitudinal coordinate $l_{center,i}$, wherein i denotes the number of the respective receiving fiber. The detector may comprise precisely two optical sensors and/or precisely two receiving fibers, each comprising an entrance face. The detector may comprise more than two optical sensors and/or more than two receiving fibers. The receiving fibers may comprise at least one first receiving fiber having at least one first entrance face and at least one second receiving fiber having at least one second entrance face. The first entrance face, in particular the geometrical center, may be arranged at a first longitudinal coordinate $l_{center,1}$, and the second entrance face, in particular the geometrical center, may be arranged at a second longitudinal coordinate $l_{center,2}$, wherein the first longitudinal coordinate and the second longitudinal coordinate differ. For example, the first entrance end and the second entrance end may be located in different planes which are offset in a direction of the optical axis. The first entrance end may be arranged in front of the second entrance end. A relative distance of the first entrance end and the second entrance end may depend, for example, on focal length or object distance. The longitudinal coordinates of the entrance faces of the receiving fibers may also be identical, as long as one of the above-mentioned conditions is fulfilled. Specifically, the longitudinal coordinates of the entrance faces of the receiving fibers may be identical, but the entrance faces of the receiving fibers may be spaced apart from the optical axis by a different spatial offset. The first optical fiber and the second optical fiber may be arranged having a common central axis. The first optical fiber and the second optical fiber may be arranged concentric. The first optical fiber may surround the second optical fiber. For example, the first entrance face and the second entrance face may have a circular shape, wherein the first entrance face may be a circle with a first radius and the second entrance face may be circle with a second radius different from the first radius. Additionally or alternatively, the first entrance face may be spaced apart from the second entrance face. The first entrance face may be arranged in front of the second entrance face and may be spaced apart from the second entrance face by no more than 50 mm, preferably by no more than 15 mm. The relative distance of the first optical sensor and second optical sensor may depend, for example, on focal length or object distance.

The angle dependent optical element may comprise at least two optical fibers each having at least one entrance face. The angle dependent optical element may comprise a plurality of optical fibers. The entrance faces are arranged with respect to each other concentric and/or on top of each other and/or parallel to each other and/or side by side.

Each geometrical center of each entrance face of the receiving fibers may be spaced apart from the optical axis of the transfer device, such as the optical axis of the beam path or the respective beam path in which the respective entrance face of the receiving fibers is located. In the case of the detector comprising precisely two receiving fibers each comprising one entrance face and in the case of the detector comprising more than two receiving fibers, the receiving fibers may comprise at least one first receiving fiber comprising at least one first entrance face being spaced apart from the optical axis by a first spatial offset and at least one second receiving fiber comprising at least one first entrance face being spaced apart from the optical axis by a second spatial offset, wherein the first spatial offset and the second spatial offset may differ. The first and second spatial offsets, as an example, may differ by at least a factor of 1.2, more preferably by at least a factor of 1.5, more preferably by at least a factor of two. The spatial offsets may also be zero or may assume negative values, as long as one of the above-mentioned conditions is fulfilled.

In the case of the detector comprising precisely two receiving fibers and in the case of the detector comprising more than two receiving fibers, the receiving fibers may comprise at least one first receiving fiber having a first cross section and at least one second receiving fiber having a second cross section. The term "cross section" refers to an area perpendicular to a direction of extension of the receiving fiber. In the case of the detector comprising more than two receiving fibers a first group of optical fibers or at least one of the optical fibers may form a first cross section, wherein a second group of optical fibers or at least one other optical fiber may form a second cross section. The first cross section and the second cross section may differ. In particular, the first cross section and the second cross section are not congruent. Thus, the cross section of the first receiving fiber and the second receiving fiber may differ in one or more of the shape or content. For example, the first cross section may be smaller than the second cross section. As an example, both the first cross section and the second cross section may have the shape of a circle. The radius of a first circle of the first entrance face may be smaller than the corresponding radius of a second circle of the second entrance face. Specifically, a diameter of the first cross section may be smaller than a diameter of the second cross section. Again, alternatively, as an example, the first cross section may have a first equivalent diameter, and the second cross section may have a second equivalent diameter, wherein the first equivalent diameter is smaller than the second equivalent diameter. The cross sections may be congruent, as long as one of the above-mentioned conditions is fulfilled.

As further used herein, the term "evaluation device" generally refers to an arbitrary device adapted to perform the named operations, preferably by using at least one data processing device and, more preferably, by using at least one processor and/or at least one application-specific integrated circuit. Thus, as an example, the at least one evaluation device may comprise at least one data processing device having a software code stored thereon comprising a number of computer commands. The evaluation device may provide one or more hardware elements for performing one or more of the named operations and/or may provide one or more processors with software running thereon for performing one or more of the named operations.

The evaluation device is configured for determining at least one longitudinal coordinate z of the object by evaluating a combined signal Q of the sensor signals. As used herein, the term "combined signal Q" refers to a signal which is generated by combining the sensor signals, in particular by one or more of dividing the sensor signals, dividing multiples of the sensor signals or dividing linear combinations of the sensor signals. In particular, the combined signal may be a quotient signal. The combined signal Q may be determined by using various means. As an example, a software means for deriving the combined signal, a hardware means for deriving the combined signal, or both, may be used and may be implemented in the evaluation device. Thus, the evaluation device, as an example, may comprise at least one divider, wherein the divider is configured for deriving the quotient signal. The divider may fully or partially be embodied as one or both of a software divider or a hardware divider.

The evaluation device may be configured for deriving the combined signal Q by one or more of dividing the sensor signals, dividing multiples of the sensor signals, dividing linear combinations of the sensor signals. The evaluation device may be configured for using at least one predetermined relationship between the combined signal Q and the longitudinal coordinate for determining the longitudinal coordinate. For example, the evaluation device is configured for deriving the combined signal Q by $$Q(z_O) = \frac{\int\int_{A_1} E(x, y; z_O)dxdy}{\int\int_{A_2} E(x, y; z_O)dxdy}$$

wherein x and y are transversal coordinates, A1 and A2 are areas of the beam profile of the light beam generated by the angle dependent optical element at the sensor position, and $E(x,y,z_o)$ denotes the beam profile given at the object distance $z_o$. Area A1 and area A2 may differ. In particular, A1 and A2 are not congruent. Thus, A1 and A2 may differ in one or more of the shape or content. The beam profile may be a cross section of the light beam. The beam profile may be selected from the group consisting of a trapezoid beam profile; a triangle beam profile; a conical beam profile and a linear combination of Gaussian beam profiles. Generally the beam profile is dependent on luminance $L(z_o)$ and beam shape $S(x,y;z_o)$, $E(x, y; zo)=L\cdot S$. Thus, by deriving the combined signal it may allow determining the longitudinal coordinate independent from luminance. In addition, using the combined signal allows determination of the distance $z_0$ independent from the object size. Thus, the combined signal allows determination of the distance $z_0$ independent from the material properties and/or reflective properties and/or scattering properties of the object and independent from alterations of the light source such as by manufacturing precision, heat, water, dirt, damages on the lens, or the like.

Each of the sensor signals may comprise at least one information of at least one area of the beam profile of the light beam generated by the angle dependent optical element. As used herein, the term "area of the beam profile" generally refers to an arbitrary region of the beam profile at the sensor position used for determining the combined signal Q. The light-sensitive areas may be arranged such that a first sensor signal comprises information of a first area of the beam profile and a second sensor signal comprises information of a second area of the beam profile. The first area of the beam profile and second area of the beam profile may be one or both of adjacent or overlapping regions. The first area of the beam profile and the second area of the beam profile may be not congruent in area.

The evaluation device may be configured to determine and/or to select the first area of the beam profile and the second area of the beam profile. The first area of the beam profile may comprise essentially edge information of the beam profile and the second area of the beam profile may comprise essentially center information of the beam profile. The beam profile may have a center, i.e. a maximum value of the beam profile and/or a center point of a plateau of the beam profile and/or a geometrical center of the light spot, and falling edges extending from the center. The second region may comprise inner regions of the cross section and the first region may comprise outer regions of the cross section. As used herein, the term "essentially center information" generally refers to a low proportion of edge information, i.e. proportion of the intensity distribution corresponding to edges, compared to a proportion of the center information, i.e. proportion of the intensity distribution corresponding to the center. Preferably the center information has a proportion of edge information of less than 10%, more preferably of less than 5%, most preferably the center information comprises no edge content. As used herein, the term "essentially edge information" generally refers to a low proportion of center information compared to a proportion of the edge information. The edge information may comprise information of the whole beam profile, in particular from center and edge regions. The edge information may have a proportion of center information of less than 10%, preferably of less than 5%, more preferably the edge information comprises no center content. At least one area of the beam profile may be determined and/or selected as second area of the beam profile if it is close or around the center and comprises essentially center information. At least one area of the beam profile may be determined and/or selected as first area of the beam profile if it comprises at least parts of the falling edges of the cross section. For example, the whole area of the cross section may be determined as first region. The first area of the beam profile may be area A2 and the second area of the beam profile may be area A1.

The edge information may comprise information relating to a number of photons in the first area of the beam profile and the center information may comprise information relating to a number of photons in the second area of the beam profile. The evaluation device may be adapted for determining an area integral of the beam profile. The evaluation device may be adapted to determine the edge information by integrating and/or summing of the first area. The evaluation device may be adapted to determine the center information by integrating and/or summing of the second area. For example, the beam profile may be a trapezoid beam profile and the evaluation device may be adapted to determine an integral of the trapezoid. Further, when trapezoid beam profiles may be assumed, the determination of edge and center signals may be replaced by equivalent evaluations making use of properties of the trapezoid beam profile such as determination of the slope and position of the edges and of the height of the central plateau and deriving edge and center signals by geometric considerations.

Additionally or alternatively, the evaluation device may be adapted to determine one or both of center information or edge information from at least one slice or cut of the light spot. This may be realized, for example, by replacing the area integrals in the combined signal Q by a line integrals along the slice or cut. For improved accuracy, several slices or cuts through the light spot may be used and averaged. In case of an elliptical spot profile, averaging over several slices or cuts may result in an improved distance information.

The evaluation device may be configured to derive the combined signal Q by one or more of dividing the edge information and the center information, dividing multiples of the edge information and the center information, dividing linear combinations of the edge information and the center information. Thus, essentially, photon ratios may be used as the physical basis of the method.

In an embodiment of the present invention, the detector may comprise:
at least one first optical sensor having a first light-sensitive area, wherein the first optical sensor may be configured to generate at least one first sensor signal in response to an illumination of the first light-sensitive area by the light beam generated by the angle dependent optical element;
at least one second optical sensor having a second light-sensitive area, wherein the second optical sensor may be configured to generate at least one second sensor signal in response to an illumination of the second light-sensitive area by the light beam generated by the angle dependent optical element.

The evaluation device may be configured for determining at least one longitudinal coordinate z of the object by evaluating the first and second sensor signals.

The first light-sensitive area may be smaller than the second light-sensitive area. In this embodiment the optical sensors may be arranged such that the light-sensitive areas of the optical sensors differ in their longitudinal coordinate and/or their surface areas.

The light beam generated by the angle dependent optical element specifically may fully illuminate the first light-sensitive area, such that the first light-sensitive area is fully located within the light beam, with a width of the light beam being larger than the light-sensitive area of the first optical sensor. Contrarily, preferably, the light beam generated by the angle dependent optical element specifically may create a light spot on the second light-sensitive area, which is smaller than the second light-sensitive area, such that the light spot is fully located within the second light-sensitive area. Within the light spot on the second light-sensitive area, a shadow created by the first optical sensor may be located. Thus, generally, the first optical sensor, having the smaller first light-sensitive area, may be located in front of the second optical sensor, as seen from the object, with the first light-sensitive area being fully located within the light beam and with the light beam generating a light spot on the second light-sensitive area being smaller than the second light-sensitive area, and with further a shadow created by the first optical sensor within the light spot. The situation may easily be adjusted by a person skilled in the art of optics by choosing one or more appropriate lenses or elements having a focusing or defocusing effect on the light beam, such as by using an appropriate transfer device as will be outlined in further detail below. As further used herein, a light spot generally refers to a visible or detectable round or non-round illumination of an article, an area or object by a light beam.

As outlined above, the first light-sensitive area is smaller than the second light-sensitive area. As used therein, the term "is smaller than" refers to the fact that the surface area of the first light-sensitive area is smaller than the surface area of the second light-sensitive area, such as by at least a factor of 0.9, e.g. at least a factor of 0.7 or even by at least a factor of 0.5. As an example, both the first light-sensitive area and the second light-sensitive area may have the shape of a square or of a rectangle, wherein side lengths of the square or rectangle of the first light-sensitive area are smaller than corresponding side lengths of the square or rectangle of the second light-sensitive area. Alternatively, as an example, both the first light-sensitive area and the second light-sensitive area may have the shape of a circle, wherein a diameter of the first light-sensitive area is smaller than a diameter of the second light-sensitive area. Again, alternatively, as an example, the first light-sensitive area may have a first equivalent diameter, and the second light-sensitive area may have a second equivalent diameter, wherein the first equivalent diameter is smaller than the second equivalent diameter.

As outlined above, the second light-sensitive area is larger than the first light-sensitive area. Thus, as an example, the second light-sensitive area may be larger by at least a factor of two, more preferably by at least a factor of three and most preferably by at least a factor of five and the first light-sensitive area.

The first light-sensitive area specifically may be a small light-sensitive area, such that, preferably, the light beam fully illuminates this light-sensitive area. Thus, as an example which may be applicable to typical optical configurations, the first light-sensitive area may have a surface area of 1 $mm^2$ to 150 $mm^2$, more preferably a surface area of 10 $mm^2$ to 100 $mm^2$.

The second light-sensitive area specifically may be a large area. Thus, preferably, within a measurement range of the detector, light spots generated by the light beam generated by the angle dependent optical element may fully be located within the second light-sensitive area, such that the light spot is fully located within the borders of the second light-sensitive area. As an example, which is applicable e.g. in typical optical setups, the second light-sensitive area may have a surface area of 160 $mm^2$ to 1000 $mm^2$, more preferably a surface area of 200 $mm^2$ to 600 $mm^2$.

The first light-sensitive area specifically may overlap with the second light-sensitive area in a direction of propagation of the light beam generated by the angle dependent optical element. The light beam generated by the angle dependent optical element may illuminate both the first light-sensitive area and, fully or partially, the second light-sensitive area. Thus, as an example, as seen from an object located on an optical axis of the detector, the first light-sensitive area may be located in front of the second light-sensitive area, such that the first light-sensitive area, as seen from the object, is fully located within the second light-sensitive area. When the light beam from this object propagates towards the first and second light-sensitive areas, as outlined above, the light beam generated by the angle dependent optical element may fully illuminate the first light-sensitive area and may create a light spot on the second light-sensitive area, wherein a shadow created by the first optical sensor is located within the light spot. It shall be noted, however, that other embodiments are feasible.

The first and second optical sensors specifically may be arranged linearly in one and the same beam path of the detector. As used herein, the term "linearly" generally refers to that the sensors are arranged along one axis. Thus, as an example, the first and second optical sensors both may be located on an optical axis of the detector. Specifically, the first and second optical sensors may be arranged concentrically with respect to an optical axis of the detector.

The first optical sensor may be arranged in front of the second optical sensor. Thus, as an example, the first optical sensor may simply be placed on the surface of the second optical sensor. Additionally or alternatively, the first optical sensor may be spaced apart from the second optical sensor by no more than five times the square root of a surface area of the first light-sensitive area. Additionally or alternatively, the first optical sensor may be arranged in front of the second optical sensor and may be spaced apart from the second optical sensor by no more than 50 mm, preferably by no more than 15 mm.

The detector may comprise:
  at least one first receiving fiber having a first cross section, wherein the first receiving fiber may be adapted to provide at least one part of the light beam propagating from the object to the detector to at least one optical sensor of the optical sensors;
  at least one second receiving fiber having a second cross section, wherein the second receiving fiber may be adapted to provide at least one part of the light beam propagating from the object to the detector to at least one other optical sensor of the optical sensors.

The first cross section may be smaller than the second cross section. The entrance faces of the receiving fibers may be arranged such that the cross sections of the receiving fibers differ in their longitudinal coordinate and/or their surface areas.

The light beam propagating from the object to the detector specifically may fully illuminate the first cross section and/or the second cross section, such that the first cross section and/or the second cross section are fully located within the light beam, with a width of the light beam being larger than the first cross section of the first receiving fiber and/or the second cross section of the second receiving fiber. Contrarily, preferably, the light beam propagating from the object to the detector specifically may partially illuminate the first cross section and/or the second cross section. At least one or more appropriate lenses or elements having a focusing or defocusing effect on the light beam may be arranged in front of the entrance faces of the receiving fibers in direction of propagation of the light beam propagating from the object to the detector, for example an appropriate transfer device.

As outlined above, the first cross section may be smaller than the second cross section. As used therein, the term "is smaller than" refers to the fact that the first cross section is smaller than the second cross section, such as by at least a factor of 0.9, e.g. at least a factor of 0.7 or even by at least a factor of 0.5. As an example, both the first cross section and the second cross section may have the shape of a circle, wherein a diameter of the first cross section is smaller than a diameter of the second cross section. As outlined above, the second cross section may be larger than the first cross section. Thus, as an example, the second cross section may be larger by at least a factor of two, more preferably by at least a factor of three and most preferably by at least a factor of five than the first cross section.

The first cross section specifically may overlap with the second cross section in a direction of propagation of the light beam propagating from the object to the detector. The light beam propagating from the object to the detector may illuminate both the first cross section and, fully or partially, the second cross section. Thus, as an example, as seen from an object located on an optical axis of the detector, the first cross section may be located in a center of the second cross section such that the first cross section and the second cross section are concentric. It shall be noted, however, that other embodiments are feasible.

The entrance faces of the first and second receiving fibers specifically may be arranged at the same longitudinal coordinate or may be arranged at different longitudinal coordinates. Thus, as an example, the first and second entrance faces both may be located on an optical axis of the detector. Specifically, the first and second entrance faces may be arranged concentrically with respect to an optical axis of the detector. For example, the first entrance face may be arranged in front of the second entrance face. For example, the first entrance face may be spaced apart from the second entrance face by no more than five times the square root of a cross section of the first entrance face. Additionally or alternatively, the first entrance face may be arranged in front of the second entrance face and may be spaced apart from the second entrance face by no more than 50 mm, preferably by no more than 15 mm.

Alternatively to the linear arrangement of the two optical sensors, the optical sensors may be arranged in different beam paths of the detector. The angle dependent optical element may be adapted to generate the first light beam and the second light beam. The first light beam and the second light beam may be generated with different degree of transmission. The first optical sensor may be configured to generate the first sensor signal in response to the illumination of the first light-sensitive area by the first light beam generated by the angle dependent optical element. The second optical sensor may be configured to generate the second sensor signal in response to the illumination of the second light-sensitive area by the second light beam generated by the angle dependent optical element. For example, as outlined above, the angle dependent optical element may comprise at least one multifurcated optical fiber which may be arranged such that the incident light beam may impinge at the first angle of incidence into the first fiber and at the second angle of incidence, different from the first angle, into the second fiber, such that the degree of transmission is different for the first light beam, in this case a first transmission light beam, and the second light beam, in this case a second transmission light beam. One of the first and second optical sensors may be arranged at the exit end of the first fiber and the other optical sensor may be arranged at the exit end of the second fiber.

The evaluation device specifically may be configured for deriving the combined signal Q by dividing the first and second sensor signals, by dividing multiples of the first and second sensor signals or by dividing linear combinations of the first and second sensor signals. As an example, Q may simply be determined as $$Q=s_1/s_2$$

or $$Q=s_2/s_1,$$

with $s_1$ denoting the first sensor signal and $s_2$ denoting the second sensor signal. Additionally or alternatively, Q may be determined as $$Q=a \cdot s_1/b \cdot s_2$$

or $$Q=b \cdot s_2/a \cdot s_1,$$

with a and b being real numbers which, as an example, may be predetermined or determinable. Additionally or alternatively, Q may be determined as $$Q=(a \cdot s_1+b \cdot s_2)/(c \cdot s_1+d \cdot s_2),$$

with a, b, c and d being real numbers which, as an example, may be predetermined or determinable. As a simple example for the latter, Q may be determined as $$Q=s_1/(s_1+s_2).$$

Other combined or quotient signals are feasible.

Typically, in the setup described above, Q is a monotonous function of the longitudinal coordinate of the object and/or of the size of the light spot such as the diameter or equivalent diameter of the light spot. Thus, as an example, specifically in case linear optical sensors are used, the quotient $Q=s_1/s_2$ is a monotonously decreasing function of the size of the light spot. Without wishing to be bound by this theory, it is believed that this is due to the fact that, in the setup described above, both the first signal $s_1$ and the second signal $s_2$ decrease as a square function with increasing distance to the light source, since the amount of light reaching the detector decreases. Therein, however, the first signal $s_1$ decreases more rapidly than the second signal $s_2$, since, in the optical setup as used in the experiments, the light spot in the image plane grows and, thus, is spread over a larger area. The quotient of the first and second sensor signals, thus, continuously decreases with increasing diameter of the light beam or diameter of the light spot on the first and second light-sensitive areas. The quotient, further, is mainly independent from the total power of the light beam, since the total power of the light beam forms a factor both in the first sensor signal and in the second sensor signal. Consequently, the quotient Q may form a secondary signal which provides a unique and unambiguous relationship between the first and second sensor signals and the size or diameter of the light beam. Since, on the other hand, the size or diameter of the light beam is dependent on a distance between the object, from which the incident light beam propagates towards the detector, and the detector itself, i.e. dependent on the longitudinal coordinate of the object, a unique and unambiguous relationship between the first and second sensor signals and the longitudinal coordinate may exist. For the latter, reference e.g. may be made to one or more of the above-mentioned prior art documents, such as WO 2014/097181 A1. The predetermined relationship may be determined by analytical considerations, such as by assuming a linear combination of Gaussian light beams, by empirical measurements, such as measurements measuring the first and second sensor signals or a secondary signal derived thereof as a function of the longitudinal coordinate of the object, or both.

In view of the technical challenges involved in the prior art documents discussed above, specifically in view of the technical effort which is required for generating the FiP effect, it has to be noted that the present invention specifically may be realized by using non-FiP optical sensors. In fact, since optical sensors having the FiP characteristic typically exhibit a strong peak in the respective sensor signals at a focal point, the range of measurement of a detector according to the present invention using FiP sensors as optical sensors may be limited to a range in between the two positions and which the first and second optical sensors are in focus of the light beam. When using linear optical sensors, however, i.e. optical sensors not exhibiting the FiP effect, this problem, with the setup of the present invention, generally may be avoided. Consequently, the first and second optical sensor may each have, at least within a range of measurement, a linear signal characteristic such that the respective first and second sensor signals may be dependent on the total power of illumination of the respective optical sensor and may be independent from a diameter of a light spot of the illumination. It shall be noted, however, that other embodiments are feasible, too.

The first and second optical sensors each specifically may be semiconductor sensors, preferably inorganic semiconductor sensors, more preferably photodiodes and most preferably silicon photodiodes. Thus, as opposed to complex and expensive FiP sensors, the present invention simply may be realized by using commercially available inorganic photodiodes, i.e. one small photodiode and one large area photodiode. Thus, the setup of the present invention may be realized in a cheap and inexpensive fashion.

Specifically, the first and second optical sensors, each independently, may be or may comprise inorganic photodiodes which are sensitive in the infrared spectral range, preferably in the range of 780 nm to 3.0 micrometers, and/or sensitive in the visible spectral range, preferably in the range of 380 nm to 780 nm. Specifically, the first and second optical sensors may be sensitive in the part of the near infrared region where silicon photodiodes are applicable specifically in the range of 700 nm to 1000 nm. Infrared optical sensors which may be used for the first optical sensor, for the second optical sensor or for both the first and second optical sensors may be commercially available infrared optical sensors, such as infrared optical sensors commercially available from Hamamatsu Photonics Deutschland GmbH, D-82211 Herrsching am Ammersee, Germany. Thus, as an example, the first optical sensor, the second optical sensor or both the first and the second optical sensor may comprise at least one optical sensor of an intrinsic photovoltaic type, more preferably at least one semiconductor photodiode selected from the group consisting of: a Ge photodiode, an InGaAs photodiode, an extended InGaAs photodiode, an InAs photodiode, an InSb photodiode, a HgCdTe photodiode. Additionally or alternatively, the first optical sensor, the second optical sensor or both the first and the second optical sensor may comprise at least one optical sensor of an extrinsic photovoltaic type, more preferably at least one semiconductor photodiode selected from the group consisting of: a Ge:Au photodiode, a Ge:Hg photodiode, a Ge:Cu photodiode, a Ge:Zn photodiode, a Si:Ga photodiode, a Si:As photodiode. Additionally or alternatively, the first optical sensor, the second optical sensor or both the first and the second optical sensor may comprise at least one bolometer, preferably a bolometer selected from the group consisting of a VO bolometer and an amorphous Si bolometer.

The first and second optical sensors each, independently, may be opaque, transparent or semitransparent. For the sake of simplicity, however, opaque sensors which are not transparent for the light beam, may be used, since these opaque sensors generally are widely commercially available.

The first and second optical sensors each specifically may be uniform sensors having a single light-sensitive area each. Thus, the first and second optical sensors specifically may be non-pixelated optical sensors.

The above-mentioned operations, including determining the at least one longitudinal coordinate of the object, are performed by the at least one evaluation device. Thus, as an example, one or more of the above-mentioned relationships may be implemented in software and/or hardware, such as by implementing one or more lookup tables. Thus, as an example, the evaluation device may comprise one or more programmable devices such as one or more computers, application-specific integrated circuits (ASICs), Field Programmable Gate Arrays (FPGAs), or digital signal processors (DSPs) which are configured to perform the above-mentioned evaluation, in order to determine the at least one longitudinal coordinate of the object. Additionally or alternatively, however, the evaluation device may also fully or partially be embodied by hardware.

As outlined above, by evaluating the first and second sensor signals, the detector may be enabled to determine the at least one longitudinal coordinate of the object, including the option of determining the longitudinal coordinate of the whole object or of one or more parts thereof. In addition, however, other coordinates of the object, including one or more transversal coordinates and/or rotational coordinates, may be determined by the detector, specifically by the evaluation device. Thus, as an example, one or more additional transversal sensors may be used for determining at least one transversal coordinate of the object. Various transversal sensors are generally known in the art, such as the transversal sensors disclosed in WO 2014/097181 A1 and/or other position-sensitive devices (PSDs), such as quadrant diodes, CCD or CMOS chips or the like. These devices may generally also be implemented into the detector according to the present invention. As an example, a part of the light beam may be split off within the detector, by at least one beam splitting element. The split-off portion, as an example, may be guided towards a transversal sensor, such as a CCD or CMOS chip or a camera sensor, and a transversal position of a light spot generated by the split-off portion on the transversal sensor may be determined, thereby determining at least one transversal coordinate of the object. Consequently, the detector according to the present invention may either be a one-dimensional detector, such as a simple distance measurement device, or may be embodied as a two-dimensional detector or even as a three-dimensional detector. Further, as outlined above or as outlined in further detail below, by scanning a scenery or an environment in a one-dimensional fashion, a three-dimensional image may also be created. Consequently, the detector according to the present invention specifically may be one of a one-dimensional detector, a two-dimensional detector or a three-dimensional detector. The evaluation device may further be configured to determine at least one transversal coordinate x, y of the object.

As outlined above, the detector may further comprise one or more additional elements such as one or more additional optical elements. Further, the detector may fully or partially be integrated into at least one housing.

In a further embodiment of the present invention, the detector may comprise:
at least one sensor element having a matrix of optical sensors, the optical sensors each having a light-sensitive area, wherein each optical sensor may be configured to generate at least one sensor signal in response to an illumination of the light-sensitive area by the light beam generated by the angle dependent optical element.

For example, the detector may comprise two sensor elements, in particular at least one first sensor element and at least one second sensor element, arranged in different beam paths of the detector. The angle dependent optical element may be adapted to generate the first light beam and the second light beam. The first light beam and the second light beam may be generated with different degree of transmission. The first sensor element may be configured to generate the first sensor signal in response to the illumination by the first light beam generated by the angle dependent optical element. The second sensor element may be configured to generate the second sensor signal in response to an illumination by the second light beam generated by the angle dependent optical element. For example, as outlined above, the angle dependent optical element may comprise at least one mulitfurcated optical fiber arranged such that the incident light beam may impinge at the first angle of incidence into the first fiber and at the second angle of incidence, different from the first angle, into the second fiber, such that the degree of transmission is different for the first transmission light beam and the second transmission light beam. One of the first and second sensors elements may be arranged at the exit end of the first fiber and the other sensor element may be arranged at the exit end of the second fiber.

The evaluation device may be configured for evaluating the sensor signals, by
a) determining at least one optical sensor having the highest sensor signal and forming at least one center signal;

b) evaluating the sensor signals of the optical sensors of the matrix and forming at least one sum signal;
c) determining at least one combined signal by combining the center signal and the sum signal; and
d) determining at least one longitudinal coordinate z of the object by evaluating the combined signal.

In this embodiment the optical sensors may be arranged such that the light-sensitive areas of the optical sensors differ in spatial offset and/or surface areas.

As used herein, the term "sensor element" generally refers to a device or a combination of a plurality of devices configured for sensing at least one parameter. In the present case, the parameter specifically may be an optical parameter, and the sensor element specifically may be an optical sensor element. The sensor element may be formed as a unitary, single device or as a combination of several devices. As further used herein, the term "matrix" generally refers to an arrangement of a plurality of elements in a predetermined geometrical order. The matrix, as will be outlined in further detail below, specifically may be or may comprise a rectangular matrix having one or more rows and one or more columns. The rows and columns specifically may be arranged in a rectangular fashion. It shall be outlined, however, that other arrangements are feasible, such as nonrectangular arrangements. As an example, circular arrangements are also feasible, wherein the elements are arranged in concentric circles or ellipses about a center point. For example, the matrix may be a single row of pixels. Other arrangements are feasible.

The optical sensors of the matrix specifically may be equal in one or more of size, sensitivity and other optical, electrical and mechanical properties. The light-sensitive areas of all optical sensors of the matrix specifically may be located in a common plane, the common plane preferably facing the object, such that the light beam generated by the angle dependent optical element may generate a light spot on the common plane.

As explained in more detail in one or more of the above-mentioned prior art documents, e.g. in WO 2012/110924 A1 or WO 2014/097181 A1, typically, a predetermined or determinable relationship exists between a size of a light spot, such as a diameter of the light spot, a beam waist or an equivalent diameter, and the longitudinal coordinate of the object from which the light beam propagates towards the detector. Without wishing to be bound by this theory, the light spot, may be characterized by two measurement variables: a measurement signal measured in a small measurement patch in the center or close to the center of the light spot, also referred to as the center signal, and an integral or sum signal integrated over the light spot, with or without the center signal. For a light beam having a certain total power which does not change when the beam is widened or focused, the sum signal should be independent from the spot size of the light spot, and, thus, should, at least when linear optical sensors within their respective measurement range are used, be independent from the distance between the object and the detector. The center signal, however, is dependent on the spot size. Thus, the center signal typically increases when the light beam is focused, and decreases when the light beam is defocused. By comparing the center signal and the sum signal, thus, an item of information on the size of the light spot generated by the light beam and, thus, on the longitudinal coordinate of the object may be generated. The comparing of the center signal and the sum signal, as an example, may be done by forming the combined signal Q out of the center signal and the sum signal and by using a predetermined or determinable relationship between the longitudinal coordinate and the combined signal for deriving the longitudinal coordinate.

The use of a matrix of optical sensors provides a plurality of advantages and benefits. Thus, the center of the light spot generated by the light beam on the sensor element, such as on the common plane of the light-sensitive areas of the optical sensors of the matrix of the sensor element, may vary with a transversal position of the object. By using a matrix of optical sensors, the detector according to the present invention may adapt to these changes in conditions and, thus, may determine the center of the light spot simply by comparing the sensor signals. Consequently, the detector according to the present invention may, by itself, choose the center signal and determine the sum signal and, from these two signals, derive a combined signal which contains information on the longitudinal coordinate of the object. By evaluating the combined signal, the longitudinal coordinate of the object may, thus, be determined. The use of the matrix of optical sensors, thus, provides a significant flexibility in terms of the position of the object, specifically in terms of a transversal position of the object.

The transversal position of the light spot on the matrix of optical sensors, such as the transversal position of the at least one optical sensor generating the sensor signal, may even be used as an additional item of information, from which at least one item of information on a transversal position of the object may be derived, as e.g. disclosed in WO 2014/198629 A1. Additionally or alternatively, as will be outlined in further detail below, the detector according to the present invention may contain at least one additional transversal detector for, in addition to the at least one longitudinal coordinate, detecting at least one transversal coordinate of the object.

Consequently, in accordance with the present invention, the term "center signal" generally refers to the at least one sensor signal comprising essentially center information of the beam profile. As used herein, the term "highest sensor signal" refers to one or both of a local maximum or a maximum in a region of interest. For example, the center signal may be the signal of the at least one optical sensor having the highest sensor signal out of the plurality of sensor signals generated by the optical sensors of the entire matrix or of a region of interest within the matrix, wherein the region of interest may be predetermined or determinable within an image generated by the optical sensors of the matrix. The center signal may arise from a single optical sensor or, as will be outlined in further detail below, from a group of optical sensors, wherein, in the latter case, as an example, the sensor signals of the group of optical sensors may be added up, integrated or averaged, in order to determine the center signal. The group of optical sensors from which the center signal arises may be a group of neighboring optical sensors, such as optical sensors having less than a predetermined distance from the actual optical sensor having the highest sensor signal, or may be a group of optical sensors generating sensor signals being within a predetermined range from the highest sensor signal. The group of optical sensors from which the center signal arises may be chosen as large as possible in order to allow maximum dynamic range. The evaluation device may be adapted to determine the center signal by integration of the plurality of sensor signals, for example the plurality of optical sensors around the optical sensor having the highest sensor signal. For example, the beam profile may be a trapezoid beam profile and the evaluation device may be adapted to determine an integral of the trapezoid, in particular of a plateau of the trapezoid.

Similarly, the term "sum signal" generally refers to a signal comprising essentially edge information of the beam profile. For example, the sum signal may be derived by adding up the sensor signals, integrating over the sensor signals or averaging over the sensor signals of the entire matrix or of a region of interest within the matrix, wherein the region of interest may be predetermined or determinable within an image generated by the optical sensors of the matrix. When adding up, integrating over or averaging over the sensor signals, the actual optical sensors from which the sensor signal is generated may be left out of the adding, integration or averaging or, alternatively, may be included into the adding, integration or averaging. The evaluation device may be adapted to determine the sum signal by integrating signals of the entire matrix, or of the region of interest within the matrix. For example, the beam profile may be a trapezoid beam profile and the evaluation device may be adapted to determine an integral of the entire trapezoid. Further, when trapezoid beam profiles may be assumed, the determination of edge and center signals may be replaced by equivalent evaluations making use of properties of the trapezoid beam profile such as determination of the slope and position of the edges and of the height of the central plateau and deriving edge and center signals by geometric considerations.

Additionally or alternatively, the evaluation device may be adapted to determine one or both of center information or edge information from at least one slice or cut of the light spot. This may be realized for example by replacing the area integrals in the combined signal Q by a line integrals along the slice or cut. For improved accuracy, several slices or cuts through the light spot may be used and averaged. In case of an elliptical spot profile, averaging over several slices or cuts may result in an improved distance information.

Similarly, the term "combined signal", as used herein, generally refers to a signal which is generated by combining the center signal and the sum signal. Specifically, the combination may include one or more of: forming a quotient of the center signal and the sum signal or vice versa; forming a quotient of a multiple of the center signal and a multiple of the sum signal or vice versa; forming a quotient of a linear combination of the center signal and a linear combination of the sum signal or vice versa. Additionally or alternatively, the combined signal may comprise an arbitrary signal or signal combination which contains at least one item of information on a comparison between the center signal and the sum signal.

The light beam generated by the angle dependent optical element specifically may fully illuminate the at least one optical sensor from which the center signal is generated, such that the at least one optical sensor from which the center signal arises is fully located within the light beam, with a width of the light beam being larger than the light-sensitive area of the at least one optical sensor from which the sensor signal arises. Contrarily, preferably, the light beam generated by the angle dependent optical element specifically may create a light spot on the entire matrix which is smaller than the matrix, such that the light spot is fully located within the matrix. This situation may easily be adjusted by a person skilled in the art of optics by choosing one or more appropriate lenses or elements having a focusing or defocusing effect on the light beam, such as by using an appropriate transfer device as will be outlined in further detail below. As further used herein, a "light spot" generally refers to a visible or detectable round or non-round illumination of an article, an area or object by a light beam.

As outlined above, the center signal generally may be a single sensor signal, such as a sensor signal from the optical sensor in the center of the light spot, or may be a combination of a plurality of sensor signals, such as a combination of sensor signals arising from optical sensors in the center of the light spot, or a secondary sensor signal derived by processing a sensor signal derived by one or more of the aforementioned possibilities. The determination of the center signal may be performed electronically, since a comparison of sensor signals is fairly simply implemented by conventional electronics, or may be performed fully or partially by software. Specifically, the center signal may be selected from the group consisting of: the highest sensor signal; an average of a group of sensor signals being within a predetermined range of tolerance from the highest sensor signal; an average of sensor signals from a group of optical sensors containing the optical sensor having the highest sensor signal and a predetermined group of neighboring optical sensors; a sum of sensor signals from a group of optical sensors containing the optical sensor having the highest sensor signal and a predetermined group of neighboring optical sensors; a sum of a group of sensor signals being within a predetermined range of tolerance from the highest sensor signal; an average of a group of sensor signals being above a predetermined threshold; a sum of a group of sensor signals being above a predetermined threshold; an integral of sensor signals from a group of optical sensors containing the optical sensor having the highest sensor signal and a predetermined group of neighboring optical sensors; an integral of a group of sensor signals being within a predetermined range of tolerance from the highest sensor signal; an integral of a group of sensor signals being above a predetermined threshold.

As outlined above, raw sensor signals of the optical sensors may be used for evaluation or secondary sensor signals derived thereof. As used herein, the term "secondary sensor signal" generally refers to a signal, such as an electronic signal, more preferably an analogue and/or a digital signal, which is obtained by processing one or more raw signals, such as by filtering, averaging, demodulating or the like. Thus, image processing algorithms may be used for generating secondary sensor signals from the totality of sensor signals of the matrix or from a region of interest within the matrix. Specifically, the detector, such as the evaluation device, may be configured for transforming the sensor signals of the optical sensor, thereby generating secondary optical sensor signals, wherein the evaluation device is configured for performing steps a)-d) by using the secondary optical sensor signals. The transformation of the sensor signals specifically may comprise at least one transformation selected from the group consisting of: a filtering; a selection of at least one region of interest; a formation of a difference image between an image created by the sensor signals and at least one offset; an inversion of sensor signals by inverting an image created by the sensor signals; a formation of a difference image between an image created by the sensor signals at different times; a background correction; a decomposition into color channels; a decomposition into hue; saturation; and brightness channels; a frequency decomposition; a singular value decomposition; applying a Canny edge detector; applying a Laplacian of Gaussian filter; applying a Difference of Gaussian filter; applying a Sobel operator; applying a Laplace operator; applying a Scharr operator; applying a Prewitt operator; applying a Roberts operator; applying a Kirsch operator;

applying a high-pass filter; applying a low-pass filter; applying a Fourier transformation; applying a Radon-transformation; applying a Hough-transformation; applying a wavelet-transformation; a thresholding; creating a binary image. The region of interest may be determined manually by a user or maybe determined automatically, such as by recognizing an object within an image generated by the optical sensors. As an example, a vehicle, a person or another type of predetermined object may be determined by automatic image recognition within an image, i.e. within the totality of sensor signals generated by the optical sensors, and the region of interest may be chosen such that the object is located within the region of interest. In this case, the evaluation, such as the determination of the longitudinal coordinate, may be performed for the region of interest, only. Other implementations, however, are feasible.

As outlined above, the detection of the center of the light spot, i.e. the detection of the center signal and/or of the at least one optical sensor from which the center signal arises, may be performed fully or partially electronically or fully or partially by using one or more software algorithms. Specifically, the evaluation device may comprise at least one center detector for detecting the at least one highest sensor signal and/or for forming the center signal. The center detector specifically may fully or partially be embodied in software and/or may fully or partially be embodied in hardware. The center detector may fully or partially be integrated into the at least one sensor element and/or may fully or partially be embodied independently from the sensor element.

As outlined above, the sum signal may be derived from all sensor signals of the matrix, from the sensor signals within a region of interest or from one of these possibilities with the sensor signals arising from the optical sensors contributing to the center signal excluded. In every case, a reliable sum signal may be generated which may be compared with the center signal reliably, in order to determine the longitudinal coordinate. Generally, the sum signal may be selected from the group consisting of: an average over all sensor signals of the matrix; a sum of all sensor signals of the matrix; an integral of all sensor signals of the matrix; an average over all sensor signals of the matrix except for sensor signals from those optical sensors contributing to the center signal; a sum of all sensor signals of the matrix except for sensor signals from those optical sensors contributing to the center signal; an integral of all sensor signals of the matrix except for sensor signals from those optical sensors contributing to the center signal; a sum of sensor signals of optical sensors within a predetermined range from the optical sensor having the highest sensor signal; an integral of sensor signals of optical sensors within a predetermined range from the optical sensor having the highest sensor signal; a sum of sensor signals above a certain threshold of optical sensors being located within a predetermined range from the optical sensor having the highest sensor signal; an integral of sensor signals above a certain threshold of optical sensors being located within a predetermined range from the optical sensor having the highest sensor signal. Other options, however, exist.

The summing may be performed fully or partially in software and/or may be performed fully or partially in hardware. A summing is generally possible by purely electronic means which, typically, may easily be implemented into the detector. Thus, in the art of electronics, summing devices are generally known for summing two or more electrical signals, both analogue signals and digital signals. Thus, the evaluation device may comprise at least one summing device for forming the sum signal. The summing device may fully or partially be integrated into the sensor element or may fully or partially be embodied independently from the sensor element. The summing device may fully or partially be embodied in one or both of hardware or software.

As outlined above, the comparison between the center signal and the sum signal specifically may be performed by forming one or more quotient signals. Thus, generally, the combined signal may be a quotient signal, derived by one or more of: forming a quotient of the center signal and the sum signal or vice versa; forming a quotient of a multiple of the center signal and a multiple of the sum signal or vice versa; forming a quotient of a linear combination of the center signal and a linear combination of the sum signal or vice versa; forming a quotient of the center signal and a linear combination of the sum signal and the center signal or vice versa; forming a quotient of the sum signal and a linear combination of the sum signal and the center signal or vice versa; forming a quotient of an exponentiation of the center signal and an exponentiation of the sum signal or vice versa. Other options, however, exist. The evaluation device may be configured for forming the one or more quotient signals. The evaluation device may further be configured for determining the at least one longitudinal coordinate by evaluating the at least one quotient signal.

The evaluation device specifically may be configured for using at least one predetermined relationship between the combined signal Q and the longitudinal coordinate, in order to determine the at least one longitudinal coordinate. Thus, due to the reasons disclosed above and due to the dependency of the properties of the light spot on the longitudinal coordinate, the combined signal Q typically is a monotonous function of the longitudinal coordinate of the object and/or of the size of the light spot such as the diameter or equivalent diameter of the light spot. Thus, as an example, specifically in case linear optical sensors are used, a simple quotient of the sensor signal $s_{center}$ and the sum signal $s_{sum}$ $Q=s_{center}/s_{sum}$ may be a monotonously decreasing function of the distance. Without wishing to be bound by this theory, it is believed that this is due to the fact that, in the preferred setup described above, both the center signal $s_{center}$ and the sum signal $s_{sum}$ decrease as a square function with increasing distance to the light source, since the amount of light reaching the detector decreases. Therein, however, the center signal $s_{center}$ decreases more rapidly than the sum signal $s_{sum}$, since, in the optical setup as used in the experiments, the light spot in the image plane grows and, thus, is spread over a larger area. The quotient of the center signal and the sum signal, thus, continuously decreases with increasing diameter of the light beam or diameter of the light spot on the light-sensitive areas of the optical sensors of the matrix. The quotient, further, is typically independent from the total power of the light beam, since the total power of the light beam forms a factor both in the center signal and in the sum sensor signal. Consequently, the quotient Q may form a secondary signal which provides a unique and unambiguous relationship between the center signal and the sum signal and the size or diameter of the light beam. Since, on the other hand, the size or diameter of the light beam is dependent on a distance between the object, from which the light beam propagates towards the detector, and the detector itself, i.e. dependent on the longitudinal coordinate of the object, a unique and unambiguous relationship between the center signal and the sum signal on the one hand and the longitudinal coordinate on the other hand may exist. For the latter, reference e.g. may be made to one or more of the above-mentioned prior art documents, such as WO 2014/097181

A1. The predetermined relationship may be determined by analytical considerations, such as by assuming a linear combination of Gaussian light beams, by empirical measurements, such as measurements measuring the combined signal and/or the center signal and the sum signal or secondary signals derived thereof as a function of the longitudinal coordinate of the object, or both.

Thus, generally, the evaluation device may be configured for determining the longitudinal coordinate by evaluating the combined signal Q such as the quotient signal. This determining may be a one-step process, such as by directly combining the center signal and the sum signal and deriving the longitudinal coordinate thereof, or may be a multiple step process, such as by firstly deriving the combined signal from the center signal and the sum signal and, secondly, by deriving the longitudinal coordinate from the combined signal. Both options, i.e. the option of steps c) and d) being separate and independent steps and the option of steps c) and d) being fully or partially combined, shall be comprised by the present invention.

The evaluation device may be configured for using at least one predetermined relationship between the combined signal and the longitudinal coordinate. The predetermined relationship may be one or more of an empiric relationship, a semi-empiric relationship and an analytically derived relationship. The evaluation device may comprise at least one data storage device for storing the predetermined relationship, such as a lookup list or a lookup table.

As outlined above, the optical sensors specifically may be or may comprise photodetectors, preferably inorganic photodetectors, more preferably inorganic semiconductor photodetectors, most preferably silicon photodetectors. Specifically, the optical sensors may be sensitive in the infrared spectral range. All of the optical sensors of the matrix or at least a group of the optical sensors of the matrix specifically may be identical. Groups of identical optical sensors of the matrix specifically may be provided for different spectral ranges, or all optical sensors may be identical in terms of spectral sensitivity. Further, the optical sensors may be identical in size and/or with regard to their electronic or optoelectronic properties.

The matrix may be composed of independent optical sensors. Thus, a matrix of inorganic photodiodes may be composed. Alternatively, however, a commercially available matrix may be used, such as one or more of a CCD detector, such as a CCD detector chip, and/or a CMOS detector, such as a CMOS detector chip.

Thus, generally, the optical sensors of the detector may form a sensor array or may be part of a sensor array, such as the above-mentioned matrix. Thus, as an example, the detector may comprise an array of optical sensors, such as a rectangular array, having m rows and n columns, with m, n, independently, being positive integers. Preferably, more than one column and more than one row is given, i.e. n>1, m>1. Thus, as an example, n may be 2 to 16 or higher and m may be 2 to 16 or higher. Preferably, the ratio of the number of rows and the number of columns is close to 1. As an example, n and m may be selected such that 0.3≤m/n≤3, such as by choosing m/n=1:1, 4:3, 16:9 or similar. As an example, the array may be a square array, having an equal number of rows and columns, such as by choosing m=2, n=2 or m=3, n=3 or the like.

As further outlined above, the matrix specifically may be a rectangular matrix having at least one row, preferably a plurality of rows, and a plurality of columns. As an example, the rows and columns may be oriented essentially perpendicular, wherein, with respect to the term "essentially perpendicular", reference may be made to the definition given above. Thus, as an example, tolerances of less than 20°, specifically less than 10° or even less than 5°, may be acceptable. In order to provide a wide range of view, the matrix specifically may have at least 10 rows, preferably at least 50 rows, more preferably at least 100 rows. Similarly, the matrix may have at least 10 columns, preferably at least 50 columns, more preferably at least 100 columns. The matrix may comprise at least 50 optical sensors, preferably at least 100 optical sensors, more preferably at least 500 optical sensors. The matrix may comprise a number of pixels in a multi-mega pixel range. Other embodiments, however, are feasible. Thus, as outlined above, in setups in which an axial rotational symmetry is to be expected, circular arrangements or concentric arrangements of the optical sensors of the matrix, which may also be referred to as pixels, may be preferred.

As further outlined above, preferably, the sensor element may be oriented essentially perpendicular to the optical axis of the detector. Again, with respect to the term "essentially perpendicular", reference may be made to the definition and the tolerances given above. The optical axis may be a straight optical axis or may be bent or even split, such as by using one or more deflection elements and/or by using one or more beam splitters, wherein the essentially perpendicular orientation, in the latter cases, may refer to the local optical axis in the respective branch or beam path of the optical setup. Additionally or alternatively, the sensor element may be oriented differing from an orientation towards the object. In particular in case the detector comprises two sensor elements, at least one of the sensor element may be oriented differing from an orientation towards the object. For example, at least one of the sensors elements may be oriented perpendicular or under an arbitrary angle to the optical axis and with respect to the object. The angle dependent optical element may be adapted to generate the light beam such that the light beam impinges on the sensor element. For example, in case at least one of the sensor elements is oriented under the arbitrary with respect to the optical axis, the angle dependent optical element may be adapted to guide the light beam onto the light-sensitive areas of the sensor element.

The above-mentioned operations, including determining the at least one longitudinal coordinate of the object, are performed by the at least one evaluation device. Thus, as an example, one or more of the above-mentioned relationships may be implemented in software and/or hardware, such as by implementing one or more lookup tables. Thus, as an example, the evaluation device may comprise one or more programmable devices such as one or more computers, application-specific integrated circuits (ASICs), Digital Signal Processors (DSPs), or Field Programmable Gate Arrays (FPGAs) which are configured to perform the above-mentioned evaluation, in order to determine the at least one longitudinal coordinate of the object. Additionally or alternatively, however, the evaluation device may also fully or partially be embodied by hardware.

As outlined above, by evaluating the center signal and the sum signal, the detector may be enabled to determine the at least one longitudinal coordinate of the object, including the option of determining the longitudinal coordinate of the whole object or of one or more parts thereof. In addition, however, other coordinates of the object, including one or more transversal coordinates and/or rotational coordinates, may be determined by the detector, specifically by the evaluation device. Thus, as an example, one or more transversal sensors may be used for determining at least one transversal coordinate of the object. As outlined above, the position of the at least one optical sensor from which the center signal arises may provide information on the at least one transversal coordinate of the object, wherein, as an example, a simple lens equation may be used for optical transformation and for deriving the transversal coordinate. Additionally or alternatively, one or more additional transversal sensors may be used and may be comprised by the detector. Various transversal sensors are generally known in the art, such as the transversal sensors disclosed in WO 2014/097181 A1 and/or other position-sensitive devices (PSDs), such as quadrant diodes, CCD or CMOS chips or the like. Additionally or alternatively, as an example, the detector according to the present invention may comprise one or more PSDs disclosed in R.A. Street: Technology and Applications of Amorphous Silicon, Springer-Verlag Heidelberg, 2010, pp. 346-349. Other embodiments are feasible. These devices may generally also be implemented into the detector according to the present invention. As an example, a part of the light beam may be split off within the detector, by at least one beam splitting element. The split-off portion, as an example, may be guided towards a transversal sensor, such as a CCD or CMOS chip or a camera sensor, and a transversal position of a light spot generated by the split-off portion on the transversal sensor may be determined, thereby determining at least one transversal coordinate of the object. Consequently, the detector according to the present invention may either be a one-dimensional detector, such as a simple distance measurement device, or may be embodied as a two-dimensional detector or even as a three-dimensional detector. Further, as outlined above or as outlined in further detail below, by scanning a scenery or an environment in a one-dimensional fashion, a three-dimensional image may also be created. Consequently, the detector according to the present invention specifically may be one of a one-dimensional detector, a two-dimensional detector or a three-dimensional detector. The evaluation device may further be configured to determine at least one transversal coordinate x, y of the object. The evaluation device may be adapted to combine the information of the longitudinal coordinate and the transversal coordinate and to determine a position of the object in space.

The detector may be configured for evaluating a single light beam or a plurality of light beams. In case a plurality of light beams propagates from the object to the detector, means for distinguishing the light beams may be provided. Thus, the light beams may have different spectral properties, and the detector may comprise one or more wavelength selective elements for distinguishing the different light beams. Each of the light beams may then be evaluated independently. The wavelength selective elements, as an example, may be or may comprise one or more filters, one or more prisms, one or more gratings, one or more dichroitic mirrors or arbitrary combinations thereof. Further, additionally or alternatively, for distinguishing two or more light beams, the light beams may be modulated in a specific fashion. Thus, as an example, the light beams may be frequency modulated, and the sensor signals may be demodulated in order to distinguish partially the sensor signals originating from the different light beams, in accordance with their demodulation frequencies. These techniques generally are known to the skilled person in the field of high-frequency electronics. Generally, the evaluation device may be configured for distinguishing different light beams having different modulations.

The illumination source may be adapted to generate and/or to project a cloud of points such that a plurality of illuminated regions is generated on the matrix of optical sensor, for example the CMOS detector. Additionally, disturbances may be present on the matrix of optical sensor such as disturbances due to speckles and/or extraneous light and/or multiple reflections. The evaluation device may be adapted to determine at least one region of interest, for example one or more pixels illuminated by the light beam which are used for determination of the longitudinal coordinate of the object. For example, the evaluation device may be adapted to perform a filtering method, for example, a blob-analysis and/or object recognition method.

In a further embodiment the detector may comprise at least two optical sensors, each optical sensor having a light-sensitive area, wherein each light-sensitive area has a geometrical center, wherein the geometrical centers of the optical sensors are spaced apart from an optical axis of the detector by different spatial offsets, wherein each optical sensor is configured to generate a sensor signal in response to an illumination of its respective light-sensitive area by the light beam generated by the angle dependent optical element.

The evaluation device may be configured for determining at least one longitudinal coordinate z of the object by combining the at least two sensor signals. In this further embodiment the optical sensors may be arranged such that the light-sensitive areas of the optical sensors differ in their spatial offset and/or their surface areas The light-sensitive areas of the optical sensors may overlap, as visible from the object, or may not overlap, i.e. may be placed next to each other without overlap. The light-sensitive areas may be spaced apart from each other or may directly be adjacent.

The detector may have a single beam path along which a light beam may travel from the object to the optical sensors, or may have a plurality of beam paths. For example, in case the angle dependent optical element comprises at least one multifurcated optical fiber, each of the fibers of the multifurcated optical fiber may constitute an independent beam path. As an example, a single beam path may be given or the beam path may be split into two or more partial beam paths. In the latter case, each partial beam path may have its own optical axis, and the condition noted above generally may refer to each beam path independently. The optical sensors may be located in one and the same beam path or partial beam path. Alternatively, however, the optical sensors may also be located in different partial beam paths. In case the optical sensors are distributed over different partial beam paths, the above-mentioned condition may be described such that at least one first optical sensor is located in at least one first partial beam path, being offset from the optical axis of the first partial beam path by a first spatial offset, and at least one second optical sensor is located in at least one second partial beam path, being offset from the optical axis of the second partial beam path by at least one second spatial offset, wherein the first spatial offset and the second spatial offset are different.

The detector may comprise more than two optical sensors. In any case, i.e. in the case of the detector comprising precisely two optical sensors and in the case of the detector comprising more than two optical sensors, the optical sensors may comprise at least one first optical sensor being spaced apart from the optical axis by a first spatial offset and at least one second optical sensor being spaced apart from the optical axis by a second spatial offset, wherein the first spatial offset and the second spatial offset differ. In case further optical sensors are provided, besides the first and second optical sensors, these additional optical sensors may also fulfill the condition or, alternatively, may be spaced apart from the optical axis by the first spatial offset, by the second spatial offset or by a different spatial offset. The first and second spatial offsets, as an example, may differ by at least a factor of 1.2, more preferably by at least a factor of 1.5, more preferably by at least a factor of two. The spatial offsets may also be zero or may assume negative values, as long as the above-mentioned conditions are fulfilled.

As outlined above, each light-sensitive area has a geometrical center. Each geometrical center of each light-sensitive area may be spaced apart from the optical axis of the detector, such as the optical axis of the beam path or the respective beam path in which the respective optical sensor is located.

As outlined above, the optical sensors and/or the entrance faces of the receiving fibers specifically may be located in one and the same plane, which, preferably, is a plane perpendicular to the optical axis. Other configurations, however, are possible. Thus, two or more of the optical sensors and/or entrance faces of the receiving fibers may also be spaced apart in a direction parallel to the optical axis.

For example, the optical sensors may be partial diodes of a segmented diode, with a center of the segmented diode being off-centered from the optical axis of the detector. The optical sensors may be partial diodes of a bi-cell or quadrant diode and/or comprise at least one CMOS sensor. As used herein, the term "partial diode" may comprise several diodes that are connected in series or in parallel. This example is rather simple and cost-efficiently realizable. Thus, as an example, bi-cell diodes or quadrant diodes are widely commercially available at low cost, and driving schemes for these bi-cell diodes or quadrant diodes are generally known. As used herein, the term "bi-cell diode" generally refers to a diode having two partial diodes in one packaging. Bi-cell and quadrant diodes may have two or four separate light sensitive areas, in particular two or four active areas. As an example, the bi-cell diodes may each form independent diodes having the full functionality of a diode. As an example, each of the bi-cell diodes may have a square or rectangular shape, and the two diodes may be placed in one plane such that the two partial diodes, in total, form a 1×2 or 2×1 matrix having a rectangular shape. In the present invention, however, a new scheme for evaluating the sensor signals of the bi-cell diodes and quadrant diode is proposed, as will be outlined in further detail below. Generally, however, the optical sensors specifically may be partial diodes of a quadrant diode, with a center of the quadrant diode being off-centered from the optical axis of the detector. As used herein, the term "quadrant diode" generally refers to a diode having four partial diodes in one packaging. As an example, the four partial diodes may each form independent diodes having the full functionality of a diode. As an example, the four partial diodes may each have a square or rectangular shape, and the four partial diodes may be placed in one plane such that the four partial diodes, in total, form a 2×2 matrix having a rectangular or square shape. In a further example, the four partial diodes, in total, may form a 2×2 matrix having a circular or elliptical shape. The partial diodes, as an example, may be adjacent, with a minimum separation from one another.

In case a quadrant diode is used, having a 2×2 matrix of partial diodes, the center of the quadrant diode specifically may be off-centered or offset from the optical axis. Thus, as an example, the center of the quadrant diodes, which may be an intersection of the geometrical centers of the optical sensors of the quadrant diode, may be off-centered from the optical axis by at least 0.2 mm, more preferably by at least 0.5 mm, more preferably by at least 1.0 mm or even 2.0 mm. Similarly, when using other types of optical sensors setups having a plurality of optical sensors, an overall center of the optical sensors may be offset from the optical axis by the same distance.

Generally, the light-sensitive areas of the optical sensors may have an arbitrary surface area or size. Preferably, however, specifically in view of a simplified evaluation of the sensor signals, the light-sensitive areas of the optical sensors are substantially equal, such as within a tolerance of less than 10%, preferably less than 5% or even less than 1%. This, specifically, is the case in typical commercially available quadrant diodes.

Specifically, as will be outlined in further detail below, the evaluation device may be configured to determine the at least one longitudinal coordinate z of the object by using at least one known, determinable or predetermined relationship between sensor signals and/or any secondary signal derived thereof and the longitudinal coordinate. Thus, the evaluation device may be configured for determining at least one combined sensor signal out of the at least two sensor signals, i.e. of the at least one sensor signal of at least one first optical sensor and out of the at least one sensor signal of at least one second optical sensor.

As generally used herein, the term "combine" generally may refer to an arbitrary operation in which two or more components such as signals are one or more of mathematically merged in order to form at least one merged combined signal and/or compared in order to form at least one comparison signal or comparison result. As will be outlined in further detail below, the combined sensor signal or secondary signal may be or may comprise at least one quotient signal.

As an example, Q may simply be determined as $Q = s_1/s_2$ or $Q = s_2/s_1$, with $s_1$ denoting a first one of the sensor signals and $s_2$ denoting a second one of the sensor signals. Additionally or alternatively, Q may be determined as $Q = j \cdot s_1 / k \cdot s_2$ or $Q = k \cdot s_2 / j \cdot s_1$, with j and k being real numbers which, as an example, may be predetermined or determinable. Additionally or alternatively, Q may be determined as $Q = (j \cdot s_1 + k \cdot s_2)/(p \cdot s_1 + q \cdot s_2)$, with j, k, p and q being real numbers which, as an example, may be predetermined or determinable. As a simple example for the latter, Q may be determined as $Q = s_1/(s_1 + s_2)$, or, as a further example, Q may be determined as $Q = (s_1 - s_2)/(s_1 + s_2)$.

Other quotient signals are feasible. Thus, as an example, in case more than two optical sensors are provided, the above-mentioned quotient formation may take place between two of the sensor signals generated by these optical sensors or may take place between more than two of the sensor signals. Thus, instead of using the first one of the sensor signals and the second one of the sensor signals in the formulae given above, combined sensor signals may be used for quotient formation.

The combined signal Q generally is an example for an asymmetry parameter denoting an asymmetry or an asymmetric distribution of the light spot generated by the light beam on the light-sensitive areas. The quotient of the two or more optical sensors, such as the two or more photodiodes, may provide a combined signal which typically is monotonously dependent on the distance between the detector and the object from which the light beam travels towards the detector, as will be shown by experimental data below. In addition or as an alternative to the quotient signal, other types of combined functions implementing the sensor signals of two or more sensors in the setup of the present invention may be used, which also may show a dependency on the distance between the object and the detector. The asymmetry or the asymmetry parameter of the light spot, as an example, may be an indication of the width of a light beam. If this asymmetry parameter depends on the distance only, the measurement can be used to determine the distance.

In typical setups, commercially available quadrant diodes such as quadrant photodiodes are used for positioning, i.e. for adjusting and/or measuring a transversal coordinate of a light spot in the plane of the quadrant photodiode. Thus, as an example, laser beam positioning by using quadrant photodiodes is well known. According to a typical prejudice, however, quadrant photodiodes are used for xy-positioning, only. According to this assumption, quadrant photodiodes are not suitable for measuring distances. The above-mentioned findings, however, using an off-centered quadrant photodiode with regard to an optical axis of the detector, show otherwise, as will be shown in further measurements below. Thus, as indicated above, in quadrant photodiodes, the asymmetry of the spot can be measured by shifting the quadrant diode slightly off-axis, such as by the above-mentioned offset. Thereby, a monotonously z-dependent function may be generated, such as by forming the combined signal Q of two or more of the sensor signals of two or more partial photodiodes, i.e. quadrants, of the quadrant photodiode. Therein, in principle, only two photodiodes are necessary for the measurement. The other two diodes may be used for noise cancellation or to obtain a more precise measurement.

In addition or as an alternative to using a quadrant diode or quadrant photodiode, other types of optical sensors may be used. Thus, as will be shown in further detail below, staggered optical sensors may be used.

The use of quadrant diodes provides a large number of advantages over known optical detectors. Thus, quadrant diodes are used in a large number of applications in combination with LEDs or active targets and are widely commercially available at very low price, with various optical properties such as spectral sensitivities and in various sizes. No specific manufacturing process has to be established, since commercially available products may be implemented into the detector according to the present invention.

The detector according to the present invention specifically may be used in multilayer optical storage discs, such as disclosed by international patent application number PCT/IB2015/052233, filed on Mar. 26, 2015. Measurements performed by using the detector according to the present invention specifically may be used in order to optimize the focus position in optical storage discs.

As will be outlined in further detail below, the distance measurement by using the detector according to the present invention may be enhanced by implementing one or more additional distance measurement means into the detector and/or by combining the detector with other types of distance measurement means. Thus, as an example, the detector may comprise or may be combined with at least one triangulation distance measurement device. Thus, the distance measurement can be enhanced by making use of a combination of the measurement principle discussed above and a triangulation type distance measurement. Further, means for measuring one or more other coordinates, such as x- and/or y-coordinates, may be provided.

In case a quadrant diode is used, the quadrant diode may also be used for additional purposes. Thus, the quadrant diode may also be used for conventional x-y-measurements of a light spot, as generally known in the art of optoelectronics and laser physics. Thus, as an example, the lens or detector position can be adjusted using the conventional xy-position information of the quadrant diode to optimize the position of the spot for the distance measurement. As a practical example, the light spot, initially, may be located right in the center of the quadrant diode, which typically does not allow for the above-mentioned distance measurement using the quotient function Q. Thus, firstly, conventional quadrant photodiode techniques may be used for off-centering a position of the light spot on the quadrant photodiode, such that, e.g., the spot position on the quadrant diode is optimal for the measurement. Thus, as an example, the different off-centering of the optical sensors of the detector may simply be a starting point for movement of the optical sensors relative to the optical axis such that the light spot is off-centered with respect to the optical axis and with respect to a geometrical center of the array of the optical sensors.

Thus, generally, the optical sensors of the detector may form a sensor array or may be part of a sensor array, such as the above-mentioned quadrant diode. Thus, as an example, the detector may comprise an array of optical sensors, such as a rectangular array, having m rows and n columns, with m, n, independently, being positive integers. Preferably, more than one column and more than one row is given, i.e. n>1, m>1. Thus, as an example, n may be 2 to 16 or higher and m may be 2 to 16 or higher. Preferably, the ratio of the number of rows and the number of columns is close to 1. As an example, n and m may be selected such that $0.3 \leq m/n \leq 3$, such as by choosing m/n=1:1, 4:3, 16:9 or similar. As an example, the array may be a square array, having an equal number of rows and columns, such as by choosing m=2, n=2 or m=3, n=3 or the like. The case m=2, n=2 is the case of the quadrant diode or quadrant optical sensor, which, for practical reasons, is one of the preferred cases, since quadrant photodiodes are widely available.

As a starting point, a geometrical center of the optical sensors within the array may be off-centered from the optical axis, such as by the above-mentioned offset. The sensor array specifically may be movable relative to the optical axis, for example along a gradient, preferably automatically, such as by moving the sensor array, e.g. in a plane perpendicular to the optical axis, and/or by moving the optical axis itself, e.g. shifting the optical axis in a parallel shift and/or tilting the optical axis. Thus, the sensor array may be shifted in order to adjust a position of a light spot generated by the light beam in the plane of the sensor array. Additionally or alternatively, the optical axis may be shifted and/or tilted by using appropriate elements, such as by using one or more deflection elements and/or one or more lenses. The movement, as an example, may take place by using one or more appropriate actuators, such as one or more piezo actuators and/or one or more electromagnetic actuators and/or one or more pneumatic or mechanical actuators, which, e.g., move and/or shift the array and/or move and/or shift and/or tillage one or more optical elements in the beam path in order to move the optical axis, such as parallel shifting the optical axis and/or tilting the optical axis. The evaluation device specifically may be adjusted to control a relative position of the sensor array to the optical axis, e.g. in the plane perpendicular to the optical axis. An adjustment procedure may take place in that the evaluation device is configured for, firstly, determining the at least one transversal position of a light spot generated by the light beam on the sensor array by using the sensor signals and for, secondly, moving the array relative to the optical axis, such as by moving the array and/or the optical axis, e.g. by moving the array in the plane to the optical axis until the light spot is off-centered and/or by tilting a lens until the light spot is off-centered. As used therein, a transversal position may be a position in a plane perpendicular to the optical axis, which may also be referred to as the x-y-plane. For the measurement of the transversal coordinate, as an example, the sensor signals of the optical sensors may be compared. As an example, in case the sensor signals are found to be equal and, thus, in case it is determined that the light spot is located symmetrically with respect to the optical sensors, such as in the center of the quadrant diodes, a shifting of the array and/or a tilting of a lens may take place, in order to off-center the light spot in the array. Thus, as outlined above, the off-centering of the array from the optical axis, such as by off-centering the center of the quadrant photodiode from the optical axis, may simply be a starting point in order to avoid the situation which is typical, in which the light spot is located on the optical axis and, thus, is centered. By off-centering the array relative to the optical axis, thus, the light spot should be off-centered. In case this is found not to be true, such that the light spot, incidentally, is located in the center of the array and equally illuminates all optical sensors, the above-mentioned shifting of the array relative to the optical axis may take place, preferably automatically, in order to off-center the light spot on the array. Thereby, a reliable distance measurement may take place.

Further, in a scanning system with a movable light source, the position of the light spot on the quadrant diode may not be fixed. This is still possible, but may necessitate that different calibrations are used, dependent on the xy-position of the spot in the diode.

Further, the use of the above-mentioned combined signal Q is a very reliable method for distance measurements. Typically, Q is a monotonous function of the longitudinal coordinate of the object and/or of the size of the light spot such as the diameter or equivalent diameter of the light spot. Thus, as an example, specifically in case linear optical sensors are used, the quotient $Q=s_1/s_2$ is a monotonously decreasing function of the size of the light spot. Without wishing to be bound by this theory, it is believed that this is due to the fact that, in the preferred setup described above, the sensor signals, such as the above-mentioned first sensor signal $s_1$ and the above-mentioned second sensor signal $s_2$, decrease as a square function with increasing distance to the light source, since the amount of light reaching the detector decreases. Therein, however, due to the off-centering, the one of the sensor signals decreases more rapidly than the other, since, in the optical setup as used in the experiments, the light spot in the image plane grows and, thus, is spread over a larger area. By spreading the light spot, however, the portion of the light illuminating the one or more optical sensors outside the center of the light spot increases, as compared to a situation of a very small light spot. Thus, the quotient of the sensor signals continuously changes, i.e. increases or decreases, with increasing diameter of the light beam or diameter of the light spot. The quotient, further, may further be rendered mainly independent from the total power of the light beam, since the total power of the light beam forms a factor in all sensor signals. Consequently, the quotient Q may form a secondary signal which provides a unique and unambiguous relationship between the sensor signals and the size or diameter of the light beam.

Since, on the other hand, the size or diameter of the light beam is dependent on a distance between the object, from which the light beam propagates towards the detector, and the detector itself, i.e. dependent on the longitudinal coordinate of the object, a unique and unambiguous relationship between the first and second sensor signals and the longitudinal coordinate may exist. For the latter, reference e.g. may be made to one or more of the above-mentioned prior art documents, such as WO 2014/097181 A1. The predetermined relationship may be determined by analytical considerations, such as by assuming a linear combination of Gaussian light beams, by empirical measurements, such as measurements measuring the first and second sensor signals or a secondary signal derived thereof as a function of the longitudinal coordinate of the object, or both.

As outlined above, specifically, quadrant photodiodes may be used. As an example, commercially available quadrant photodiodes may be integrated in order to provide four optical sensors, such as one or more quadrant photodiodes available from Hamamatsu Photonics Deutschland GmbH, D-82211 Herrsching am Ammersee, Germany, such as quadrant Si PIN photodiodes of the type S4349, which are sensitive in the UV spectral range to the near IR spectral range. In case an array of optical sensors is used, the array may be a naked chip or may be an encapsulated array, such as encapsulated in a TO-5 metal package. Additionally or alternatively, a surface mounted device may be used, such as TT Electronics OPR5911 available from TT Electronics plc, Fourth Floor, St Andrews House, West Street Woking Surrey, GU21 6EB, England. It shall be noted that other optical sensors may also be used.

Further, it shall be noted that, besides the option of using precisely one quadrant photodiode, two or more quadrant photodiodes may also be used. Thus, as an example, a first quadrant photodiode may be used for the distance measurement, as described above, providing the two or more optical sensors. Another quadrant photodiode may be used, e.g. in a second partial beam path split off from the beam path of the first quadrant photodiode, for a transversal position measurement, such as for using at least one transversal coordinate x and/or y. The second quadrant photodiode, as an example, may be located on-axis with respect to the optical axis.

Further, it shall be noted that, besides the option of using one or more quadrant photodiodes, one or more quadrant photodiodes or further photodiode arrays may also be replaced or mimicked by separated photodiodes that are arranged or assembled close to each other, preferably in a symmetric shape such as a rectangular matrix, such as a 2×2 matrix. However further arrangements are feasible. In such an arrangement or assembly, the photodiodes may be arranged or assembled in a housing or mount, such as all photodiodes in a single housing or mount or groups of photodiodes in one housing or mount, or each of the photodiodes in a separate housing or mount. Further, the photodiodes may also be assembled directly on a circuit board. In such arrangements or assemblies, photodiodes may be arranged as such that the separation between the active area of the photodiodes, has a distinct value less than one centimeter, preferably less than one millimeter, more preferably as small as possible. Further, to avoid optical reflexes, distortions, or the like that may deteriorate the measurement, the space between the active areas may be either empty or filled with a material, preferably with a light absorbing material such as a black polymer, such as black silicon, black polyoxymethylene, or the like, more preferably optically absorbing and electrically insulating material, such as black ceramics or insulating black polymers such as black silicon, or the like. Further, the distinct value of the photodiode separation may also be realized by adding a distinct building block between the photodiodes such as a plastic separator. Further embodiments are feasible. The replacement of quadrant photodiodes by single diodes arranged in a similar setup such as in a 2×2 rectangular matrix with minimal distance between the active areas may further minimize the costs for the optical detector. Further, two or more diodes from a quadrant diode may be connected in parallel or in series to form a single light sensitive area.

Additionally or alternatively, the optical sensors may comprise at least one optical sensor of an intrinsic photovoltaic type, more preferably at least one semiconductor photodiode selected from the group consisting of: a Ge photodiode, an InGaAs photodiode, an extended InGaAs photodiode, an InAs photodiode, an InSb photodiode, a HgCdTe photodiode. Additionally or alternatively, the optical sensors may comprise at least one optical sensor of an extrinsic photovoltaic type, more preferably at least one semiconductor photodiode selected from the group consisting of: a Ge:Au photodiode, a Ge:Hg photodiode, a Ge:Cu photodiode, a Ge:Zn photodiode, a Si:Ga photodiode, a Si:As photodiode. Additionally or alternatively, the optical sensors may comprise at least one bolometer, preferably a bolometer selected from the group consisting of a VO bolometer and an amorphous Si bolometer.

The optical sensors each, independently, may be opaque, transparent or semitransparent. For the sake of simplicity, however, opaque sensors which are not transparent for the light beam, may be used, since these opaque sensors generally are widely commercially available.

The optical sensors each specifically may be uniform sensors having a single light-sensitive area each. Thus, the optical sensors specifically may be non-pixelated optical sensors.

As outlined above, by evaluating the sensor signals, the detector may be enabled to determine the at least one longitudinal coordinate of the object, including the option of determining the longitudinal coordinate of the whole object or of one or more parts thereof. In addition, however, other coordinates of the object, including one or more transversal coordinates and/or rotational coordinates, may be determined by the detector, specifically by the evaluation device. Thus, as an example, one or more additional transversal sensors may be used for determining at least one transversal coordinate of the object. Various transversal sensors are generally known in the art, such as the transversal sensors disclosed in WO 2014/097181 A1 and/or other position-sensitive devices (PSDs), such as quadrant diodes, CCD or CMOS chips or the like. These devices may generally also be implemented into the detector according to the present invention. As an example, a part of the light beam may be split off within the detector, by at least one beam splitting element. The split-off portion, as an example, may be guided towards a transversal sensor, such as a CCD or CMOS chip or a camera sensor, and a transversal position of a light spot generated by the split-off portion on the transversal sensor may be determined, thereby determining at least one transversal coordinate of the object. Consequently, the detector according to the present invention may either be a one-dimensional detector, such as a simple distance measurement device, or may be embodied as a two-dimensional detector or even as a three-dimensional detector. Further, as outlined above or as outlined in further detail below, by scanning a scenery or an environment in a one-dimensional fashion, a three-dimensional image may also be created. Consequently, the detector according to the present invention specifically may be one of a one-dimensional detector, a two-dimensional detector or a three-dimensional detector. The evaluation device may further be configured to determine at least one transversal coordinate x, y of the object. The evaluation device may be adapted to combine the information of the longitudinal coordinate and the transversal coordinate and to determine a position of the object in space.

In one embodiment, the detector may comprise:
at least one measuring head comprising one optical measurement fiber and the at least one transfer device;
the at least two optical sensors wherein each optical sensor has the at least one light sensitive area, wherein each optical sensor is designed to generate the at least one sensor signal in response to illumination of its respective light-sensitive area by at least one light beam originating from the optical measurement fiber;
the at least one evaluation device being configured for determining the at least one longitudinal coordinate z of the object by evaluating the combined signal Q from the sensor signals.

As used herein, the term "measuring head" refers to at least one measuring means adapted to receive at least one light beam from the object. The measuring head may be or may comprise at least one optical measurement fiber and may further comprise at least one element selected from the group consisting of: at least one optical illumination fiber; at least one optical measurement fiber; at least one spacer element; at least one transfer element. The measuring head may comprise at least one radially arranged or even radially-symmetric design, in particular in view of an arrangement of the optical measurement fiber and at least one illumination fiber. The radially arranged or radially symmetric design may allow enhancing robustness of measurement values, in particular at strong black-and-white contrast in a measured point of the object or for measurements of concave or convex surfaces.

As used herein, the term "optical measurement fiber" refers to the at least one angle dependent optical element having at least one optical fiber. The measuring head may comprise exactly one optical measurement fiber. In order to allow using one optical measurement fiber only, the combined signal Q is determined from at least two sensor signals from the at least two optical sensors arranged at an exit-end of the optical measurement fiber. The optical measurement fiber may comprise two ends. The optical measurement fiber may comprise at least one receiving end adapted to receive at least one light beam originating from the object. The optical measurement fiber may comprise at least one exit-end from which the light beam originating from the object leaves the optical measurement fiber. The optical measurement fiber may also be denoted as receiving fiber. The receiving end may also be denoted as at least one entrance face of the at least one receiving fiber which may also be denoted as the position where the light beam travelling from the object to the detector impinges on the angle dependent optical element, specifically on the optical fiber. Without wishing to be bound by this theory, it is believed that the angle of incidence of a light beam received by the optical fiber is preserved such that the angle of incidence is equal to the exit-angle, assuming that the angle of incidence is equal or smaller than the acceptance angle of the optical fiber. Thus, distance information encoded in the light beam can be essentially preserved and can be evaluated using the combined signal Q.

The optical sensors may be partial diodes of a bi-cell or quadrant diode and/or comprise at least one CMOS sensor. For example, the optical sensors may comprise a CMOS sensor. The evaluation device may be adapted to divide the sensor region of the CMOS sensor into at least two sub-regions. Specifically, the evaluation device may be adapted to divide the sensor region of the CMOS sensor into at least one left part and at least one right part and/or at least one upper part and at least one lower part and/or at least one inner and at least one outer part. The evaluation device may be configured for determining the at least one longitudinal coordinate z of the object by evaluating the combined signal Q from the sensor signals of the at least two sub-regions. Using at least one CMOS sensor may allow movement of the illumination source for illuminating the object. In particular independent movement of at least one optical illumination fiber and the optical measurement fiber may be possible.

The measuring head may comprise at least one transfer device comprising at least one collimating lens. A numerical aperture of the transfer device may be smaller than a numerical aperture of the optical measurement fiber.

The detector may comprise at least one optical illumination fiber. The illumination source may be adapted to illuminate the object through the optical illumination fiber. As used herein, the term "optical illumination fiber" refers to at least one optical fiber adapted to provide at least one light beam for illumination of the object. The optical illumination fiber may be or may comprise at least one light guiding element. The optical illumination fiber may comprise at least one first end which is adapted to receive at least one illumination light beam, e.g. generated by the illumination source. Additionally or alternatively, the illumination source may be guided through an optical fiber. The optical illumination fiber may comprise at least one second end from which the illumination light beam leaves the optical illumination fiber for illumination of the object. The second end may also be denoted as exit face of the at least one optical illumination fiber. In case of using optical sensors arranged as partial diodes of a bi-cell or quadrant diode, the optical measurement fiber and the optical illumination fiber may be interconnected, in particular fixedly. Additionally or alternatively to an illumination using the optical illumination fiber, the object may be illuminated by a light beam generated from an arbitrary illumination source. In particular, the illumination of the object may be performed independently from the optical fiber.

The illumination source and the optical sensors may be separated by a baseline. In particular, the optical illumination fiber may comprise the at least one transmitter-lens. The optical measurement fiber may comprise the at least one receiver-lens. The baseline between transmitter-lens and receiver-lens may be small. The baseline may be less than 0.01 m, preferably less than 0.005 m, more preferably less than 0.0025 m. A dividing line of the partial diodes of the bi-cell or of the quadrant diode may be arranged essential parallel or essential orthogonal to the baseline.

In a further aspect of the present invention, a detector system for determining a position of at least one object is disclosed. The detector system comprises at least one detector according to the present invention, such as according to one or more of the embodiments disclosed above or according to one or more of the embodiments disclosed in further detail below. The detector system further comprises at least one beacon device adapted to direct at least one light beam towards the detector, wherein the beacon device is at least one of attachable to the object, holdable by the object and integratable into the object. Further details regarding the beacon device will be given below, including potential embodiments thereof. Thus, the at least one beacon device may be or may comprise at least one active beacon device, comprising one or more illumination sources such as one or more light sources like lasers, LEDs, light bulbs or the like. As an example, the light emitted by the illumination source may have a wavelength of 300 to 1000 nm, especially 500 to 1000 nm. Alternatively, as outlined above, the infrared spectral range may be used, such as in the range of 780 nm to 3.0 µm. Specifically, the near infrared region where silicon photodiodes are applicable specifically in the range of 700 nm to 1000 nm may be used. The light emitted by the one or more beacon devices may be non-modulated or may be modulated, as outlined above, in order to distinguish two or more light beams. Additionally or alternatively, the at least one beacon device may be adapted to reflect one or more light beams towards the detector, such as by comprising one or more reflective elements. Further, the at least one beacon device may be or may comprise one or more scattering elements adapted for scattering a light beam. Therein, elastic or inelastic scattering may be used. In case the at least one beacon device is adapted to reflect and/or scatter a primary light beam towards the detector, the beacon device may be adapted to leave the spectral properties of the light beam unaffected or, alternatively, may be adapted to change the spectral properties of the light beam, such as by modifying a wavelength of the light beam.

In a further aspect of the present invention, a human-machine interface for exchanging at least one item of information between a user and a machine is disclosed. The human-machine interface comprises at least one detector system according to the embodiments disclosed above and/or according to one or more of the embodiments disclosed in further detail below. Therein, the at least one beacon device is adapted to be at least one of directly or indirectly attached to the user or held by the user. The human-machine interface is designed to determine at least one position of the user by means of the detector system, wherein the human-machine interface is designed to assign to the position at least one item of information.

In a further aspect of the present invention, an entertainment device for carrying out at least one entertainment function is disclosed. The entertainment device comprises at least one human-machine interface according to the embodiment disclosed above and/or according to one or more of the embodiments disclosed in further detail below. The entertainment device is configured to enable at least one item of information to be input by a player by means of the human-machine interface. The entertainment device is further configured to vary the entertainment function in accordance with the information.

In a further aspect of the present invention, a tracking system for tracking a position of at least one movable object is disclosed. The tracking system comprises at least one detector system according to one or more of the embodiments referring to a detector system as disclosed above and/or as disclosed in further detail below. The tracking system further comprises at least one track controller. The track controller is adapted to track a series of positions of the object at specific points in time.

In a further aspect of the present invention, a camera for imaging at least one object is disclosed. The camera comprises at least one detector according to any one of the embodiments referring to a detector as disclosed above or as disclosed in further detail below.

In a further aspect of the present invention, a readout device for optical storage media is proposed. The readout device comprises at least one detector according to any one of the preceding embodiments referring to a detector. As used therein, a readout device for optical storage media generally refers to a device which is capable of optically retrieving information stored in optical storage media such as optical storage discs, e.g. CCD, DVD or Blu-ray discs. Thus, the above-described measurement principle of the detector according to the present invention may be used for detecting data modules within an optical storage medium such as in optical storage discs. As an example, in case a reflective data module is present and reflects the illuminating light beam, the detector will not only detect the reflected light beam according to the above-mentioned measurement principle but will also detect a distance between the detector and the reflective data module, i.e. a depth of the reflective data module within the optical storage medium. Thus, as an example, the detector may be used for detecting different layers of information modules or data modules within the optical storage medium. Thereby, as an example, two layer discs or three layer discs or even discs having more than three layers may be generated and read out.

In a further aspect of the present invention, a scanning system for determining a depth profile of a scenery, which may also imply determining at least one position of at least one object, is provided. The scanning system comprises at least one detector according to the present invention, such as at least one detector as disclosed in one or more of the embodiments listed above and/or as disclosed in one or more of the embodiments below. The scanning system further comprises at least one illumination source adapted to scan the scenery with at least one light beam, which may also be referred to as an illumination light beam or scanning light beam. As used herein, the term "scenery" generally refers to a two-dimensional or three-dimensional range which is visible by the detector, such that at least one geometric or spatial property of the two-dimensional or three-dimensional range may be evaluated with the detector. As further used herein, the term "scan" generally refers to a consecutive measurement in different regions. Thus, the scanning specifically may imply at least one first measurement with the illumination light beam being oriented or directed in a first fashion, and at least one second measurement with the illumination light beam being oriented or directed in a second fashion which is different from the first fashion. The scanning may be a continuous scanning or a stepwise scanning. Thus, in a continuous or stepwise fashion, the illumination light beam may be directed into different regions of the scenery, and the detector may be detected to generate at least one item of information, such as at least one longitudinal coordinate, for each region. As an example, for scanning an object, one or more illumination light beams may, continuously or in a stepwise fashion, create light spots on the surface of the object, wherein longitudinal coordinates are generated for the light spots. Alternatively, however, a light pattern may be used for scanning. The scanning may be a point scanning or a line scanning or even a scanning with more complex light patterns. The illumination source of the scanning system may be distinct from the optional illumination source of the detector. Alternatively, however, the illumination source of the scanning system may also be fully or partially identical with or integrated into the at least one optional illumination source of the detector.

Thus, the scanning system may comprise at least one illumination source which is adapted to emit the at least one light beam being configured for the illumination of the at least one dot located at the at least one surface of the at least one object. As used herein, the term "dot" refers to an area, specifically a small area, on a part of the surface of the object which may be selected, for example by a user of the scanning system, to be illuminated by the illumination source. Preferably, the dot may exhibit a size which may, on one hand, be as small as possible in order to allow the scanning system to determine a value for the distance between the illumination source comprised by the scanning system and the part of the surface of the object on which the dot may be located as exactly as possible and which, on the other hand, may be as large as possible in order to allow the user of the scanning system or the scanning system itself, in particular by an automatic procedure, to detect a presence of the dot on the related part of the surface of the object.

For this purpose, the illumination source may comprise an artificial illumination source, in particular at least one laser source and/or at least one incandescent lamp and/or at least one semiconductor light source, for example, at least one light-emitting diode, in particular an organic and/or inorganic light-emitting diode. As an example, the light emitted by the illumination source may have a wavelength of 300-1000 nm, especially 500 to 1000 nm. Additionally or alternatively, light in the infrared spectral range may be used, such as in the range of 780 nm to 3.0 µm. Specifically, the light in the part of the near infrared region where silicon photodiodes are applicable specifically in the range of 700 nm to 1000 nm may be used. On account of their generally defined beam profiles and other properties of handleability, the use of at least one laser source as the illumination source is particularly preferred. Herein, the use of a single laser source may be preferred, in particular in a case in which it may be important to provide a compact scanning system that might be easily storable and transportable by the user. The illumination source may thus, preferably be a constituent part of the detector and may, therefore, in particular be integrated into the detector, such as into the housing of the detector. In a preferred embodiment, particularly the housing of the scanning system may comprise at least one display configured for providing distance-related information to the user, such as in an easy-to-read manner. In a further preferred embodiment, particularly the housing of the scanning system may, in addition, comprise at least one button which may be configured for operating at least one function related to the scanning system, such as for setting one or more operation modes. In a further preferred embodiment, particularly the housing of the scanning system may, in addition, comprise at least one fastening unit which may be configured for fastening the scanning system to a further surface, such as a rubber foot, a base plate or a wall holder, such as a base plate or holder comprising a magnetic material, in particular for increasing the accuracy of the distance measurement and/or the handleability of the scanning system by the user.

Particularly, the illumination source of the scanning system may, thus, emit a single laser beam which may be configured for the illumination of a single dot located at the surface of the object. By using at least one of the detectors according to the present invention at least one item of information about the distance between the at least one dot and the scanning system may, thus, be generated. Hereby, preferably, the distance between the illumination system as comprised by the scanning system and the single dot as generated by the illumination source may be determined, such as by employing the evaluation device as comprised by the at least one detector. However, the scanning system may, further, comprise an additional evaluation system which may, particularly, be adapted for this purpose. Alternatively or in addition, a size of the scanning system, in particular of the housing of the scanning system, may be taken into account and, thus, the distance between a specific point on the housing of the scanning system, such as a front edge or a back edge of the housing, and the single dot may, alternatively, be determined. The illumination source may be adapted to generate and/or to project a cloud of points, for example the illumination source may comprise one or more of at least one digital light processing projector, at least one LCoS projector, at least one spatial light modulator; at least one diffractive optical element; at least one array of light emitting diodes; at least one array of laser light sources.

Alternatively, the illumination source of the scanning system may emit two individual laser beams which may be configured for providing a respective angle, such as a right angle, between the directions of an emission of the beams, whereby two respective dots located at the surface of the same object or at two different surfaces at two separate objects may be illuminated. However, other values for the respective angle between the two individual laser beams may also be feasible. This feature may, in particular, be employed for indirect measuring functions, such as for deriving an indirect distance which may not be directly accessible, such as due to a presence of one or more obstacles between the scanning system and the dot or which may otherwise be hard to reach. By way of example, it may, thus, be feasible to determine a value for a height of an object by measuring two individual distances and deriving the height by using the Pythagoras formula. In particular for being able to keep a predefined level with respect to the object, the scanning system may, further, comprise at least one leveling unit, in particular an integrated bubble vial, which may be used for keeping the predefined level by the user.

As a further alternative, the illumination source of the scanning system may emit a plurality of individual laser beams, such as an array of laser beams which may exhibit a respective pitch, in particular a regular pitch, with respect to each other and which may be arranged in a manner in order to generate an array of dots located on the at least one surface of the at least one object. For this purpose, specially adapted optical elements, such as beam-splitting devices and mirrors, may be provided which may allow a generation of the described array of the laser beams. In particular, the illumination source may be directed to scan an area or a volume by using one or more movable mirrors to redirect the light beam in a periodic or non-periodic fashion.

Thus, the scanning system may provide a static arrangement of the one or more dots placed on the one or more surfaces of the one or more objects. Alternatively, the illumination source of the scanning system, in particular the one or more laser beams, such as the above described array of the laser beams, may be configured for providing one or more light beams which may exhibit a varying intensity over time and/or which may be subject to an alternating direction of emission in a passage of time, in particular by moving one or more mirrors, such as the micro-mirrors comprised within the mentioned array of micro-mirrors. As a result, the illumination source may be configured for scanning a part of the at least one surface of the at least one object as an image by using one or more light beams with alternating features as generated by the at least one illumination source of the scanning device. In particular, the scanning system may, thus, use at least one row scan and/or line scan, such as to scan the one or more surfaces of the one or more objects sequentially or simultaneously. Thus, the scanning system may be adapted to measure angles by measuring three or more dots, or the scanning system may be adapted to measure corners or narrow regions such as a gable of a roof, which may be hardly accessible using a conventional measuring stick. As non-limiting examples, the scanning system may be used in safety laser scanners, e.g. in production environments, and/or in 3D-scanning devices as used for determining the shape of an object, such as in connection to 3D-printing, body scanning, quality control, in construction applications, e.g. as range meters, in logistics applications, e.g. for determining the size or volume of a parcel, in household applications, e.g. in robotic vacuum cleaners or lawn mowers, or in other kinds of applications which may include a scanning step. As non-limiting examples, the scanning system may be used in industrial safety curtain applications. As non-limiting examples, the scanning system may be used to perform sweeping, vacuuming, mopping, or waxing functions, or yard or garden care functions such as mowing or raking. As non-limiting examples, the scanning system may employ an LED illumination source with collimated optics and may be adapted to shift the frequency of the illumination source to a different frequency to obtain more accurate results and/or employ a filter to attenuate certain frequencies while transmitting others. As non-limiting examples, the scanning system and/or the illumination source may be rotated as a whole or rotating only a particular optics package such as a mirror, beam splitter or the like, using a dedicated motor as such that in operation, the scanning system may have a full 360 degree view or even be moved and or rotated out of plane to further increase the scanned area. Further, the illumination source may be actively aimed in a predetermined direction. Further, to allow the rotation of wired electrical systems, slip rings, optical data transmission, or inductive couplings may be employed.

As a non-limiting example, the scanning system may be attached to a tripod and point towards an object or region with a several corners and surfaces. One or more flexibly movable laser sources are attached to the scanning system. The one or more laser sources are moved as such that they illuminate points of interest. The position of the illuminated points with respect to the scanning system is measured when pressing a designated button on the scanning system and the position information is transmitted via a wireless interface to a mobile phone. The position information is stored in a mobile phone application. The laser sources are moved to illuminate further points of interest the position of which are measured and transmitted to the mobile phone application. The mobile phone application may transform the set of points into a 3d model by connecting adjacent points with planar surfaces. The 3d model may be stored and processed further. The distances and or angles between the measured points or surfaces may be displayed directly on a display attached to a scanning system or on the mobile phone to which the position information is transmitted.

As a non-limiting example, a scanning system may comprise two or more flexible movable laser sources to project points and further one movable laser source projecting a line. The line may be used to arrange the two or more laser spots along a line and the display of the scanning device may display the distance between the two or more laser spots that may be arranged along the line, such as at equal distance. In the case of two laser spots, a single laser source may be used whereas the distance of the projected points is modified using one or more beam-splitters or prisms, where a beam-splitter or prism can be moved as such that the projected laser spots move apart or closer together. Further, the scanning system may be adapted to project further patterns such as a right angle, a circle, a square, a triangle, or the like, along which a measurement can be done by projecting laser spots and measuring their position.

The detector comprises at least one measuring head comprising at least one first optical measurement fiber adapted to provide at least one light beam originating from the object to a first optical sensor and at least one second optical measurement fiber adapted to provide the light beam originating from the object to a second optical sensor. With respect to description and embodiments of the measuring head and the optical measurement fibers reference is made to the description of the detector above or as given in further detail below.

Specifically, each of the optical measurement fibers may have at least two ends, a distal end, also denoted as exit-end, and at least one proximal end, also denoted as receiving end. The proximal end may be arranged within and/or attached to the measuring head. The respective proximal end may be adapted to couple the light beam originating from the object into the respective optical measurement fiber. The distal end may be arranged closer to the optical sensors and may be arranged such that the light beam travelling from the proximal end to the distal end through the optical measurement fiber leaves the optical measurement fiber at the distal end and illuminates the respective optical sensor.

The measuring head further may comprise at least one transfer device. The transfer device may be arranged in front of the optical measurement fibers. The transfer device may be adapted to focus the light beam originating from the object on the proximal end. For example, the transfer device may comprise at least one transfer element selected from the group consisting of: at least one concave lens; at least one convex lens; at least one spherical lens; at least one GRIN lens; at least one tip-shaped lens; at least one prism shaped lens, in particular a non-rotationally symmetric lens. In addition the measuring head may comprise at least one spacer element which is adapted to attach the transfer devices to the optical measurement fibers. Optical paths of the first measurement fiber and the second measurement fiber may be fully or partially optically separated by mechanical means such as a fully or partially intransparent mechanical wall or cladding or the like to avoid internal reflections. This optical separation by mechanical means may be part of the spacer element.

The detector may comprise at least one optical illumination fiber. The illumination source may be adapted to illuminate the object through the optical illumination fiber. The optical illumination fiber may comprise at least one first end adapted to receive the at least one light beam and at least one second end from where the at least one light beam leaves the optical illumination fiber for illumination of the object. At least the second end of the optical illumination fiber may be arranged within and/or may be attached to the measuring head.

The scanning system may comprise at least one actuator configured to move the measuring head to scan a region of interest. As used herein, the term "move" refers to driving the measuring head and/or to causing the measuring head to oscillate. As used herein, the term "actuator" refers to an arbitrary device adapted to generate a force causing the measuring head to move. Specifically, the actuator may be attached and/or coupled and/or connected to the optical measurement fibers and may be adapted to generate a force causing the optical measurement fibers to move, in particular to oscillate. The actuator may be attached and/or coupled and/or connected to the optical illumination fiber and may be adapted to generate a force causing the optical illumination fiber to move. The actuator may be adapted to generate a force corresponding to a harmonic of a natural resonant frequency of the optical measurement fibers and/or the optical illumination fiber. The actuator may comprise at least one electromechanical actuator and/or at least one piezo actuator. The piezo actuator may comprise at least one actuator selected from the group consisting of: at least one piezoceramic actuator; at least one piezoelectric actuator. The actuator may be configured to cause the measuring head, specifically the optical illumination fiber and/or the optical measurement fibers to oscillate. The actuator may be adapted to move the measuring head in a linear scan and/or a radial scan and/or a spiral scan. For example, the actuator may be adapted to generate a force on the measuring head such that the measuring head moves upwards and downwards. For example, the actuator may be configured to generate a force on the measuring head such that the measuring head moves in an orbit with a predefined radius. The radius may be adjustable. For example, the actuator may be adapted to generate a force such that the measuring head moves in a spiral such as with a radius which alternately decreases or increases.

As a non-limiting example, the scanning system may be adapted to support the work with tools, such as wood or metal processing tools, such as a saw, a driller, or the like. Thus, the scanning system may be adapted to measure the distance in two opposite directions and display the two measured distances or the sum of the distances in a display. Further, the scanning system may be adapted to measure the distance to the edge of a surface as such that when the scanning system is placed on the surface, a laser point is moved automatically away from the scanning system along the surface, until the distance measurement shows a sudden change due to a corner or the edge of a surface. This makes it possible to measure the distance of the end of a wood plank while the scanning device is placed on the plank but remote from its end. Further, the scanning system may measure the distance of the end of a plank in one direction and project a line or circle or point in a designated distance in the opposite direction. The scanning system may be adapted to project the line or circle or point in a distance depending on the distance measured in the opposite direction such as depending on a predetermined sum distance. This allows working with a tool such as a saw or driller at the projected position while placing the scanning system in a safe distance from the tool and simultaneously perform a process using the tool in a predetermined distance to the edge of the plank. Further, the scanning system may be adapted to project points or lines or the like in two opposite directions in a predetermined distance. When the sum of the distances is changed, only one of the projected distances changes.

As a non-limiting example, the scanning system may be adapted to be placed onto a surface, such as a surface on which a task is performed, such as cutting, sawing, drilling, or the like, and to project a line onto the surface in a predetermined distance that can be adjusted such as with buttons on the scanning device.

As non-limiting examples, the scanning system may be used in safety laser scanners, e.g. in production environments, and/or in 3D-scanning devices as used for determining the shape of an object, such as in connection to 3D-printing, body scanning, quality control, in construction applications, e.g. as range meters, in logistics applications, e.g. for determining the size or volume of a parcel, in household applications, e.g. in robotic vacuum cleaners or lawn mowers, or in other kinds of applications which may include a scanning step.

The transfer device can, as explained above, be designed to feed light propagating from the object to the detector to the optical sensor, preferably successively. As explained above, this feeding can optionally be effected by means of imaging or else by means of non-imaging properties of the transfer device. In particular the transfer device can also be designed to collect the electromagnetic radiation before the latter is fed to the optical sensor. The transfer device can also be wholly or partly a constituent part of at least one optional illumination source, for example by the illumination source being designed to provide a light beam having defined optical properties, for example having a defined or precisely known beam profile, for example at least one linear combination of Gaussian beams, in particular at least one laser beam having a known beam profile.

For potential embodiments of the optional illumination source, reference may be made to WO 2012/110924 A1. Still, other embodiments are feasible. Light emerging from the object can originate in the object itself, but can also optionally have a different origin and propagate from this origin to the object and subsequently toward the transversal and/or longitudinal optical sensor. The latter case can be effected for example by at least one illumination source being used. This illumination source can for example be or comprise an ambient illumination source and/or may be or may comprise an artificial illumination source. By way of example, the detector itself can comprise at least one illumination source, for example at least one laser and/or at least one incandescent lamp and/or at least one semiconductor illumination source, for example, at least one light-emitting diode, in particular an organic and/or inorganic light-emitting diode. On account of their generally defined beam profiles and other properties of handleability, the use of one or a plurality of lasers as illumination source or as part thereof, is particularly preferred. The illumination source itself can be a constituent part of the detector or else be formed independently of the detector. The illumination source can be integrated in particular into the detector, for example a housing of the detector. Alternatively or additionally, at least one illumination source can also be integrated into the at least one beacon device or into one or more of the beacon devices and/or into the object or connected or spatially coupled to the object.

The light emerging from the one or more optional beacon devices can accordingly, alternatively or additionally from the option that said light originates in the respective beacon device itself, emerge from the illumination source and/or be excited by the illumination source. By way of example, the electromagnetic light emerging from the beacon device can be emitted by the beacon device itself and/or be reflected by the beacon device and/or be scattered by the beacon device before it is fed to the detector. In this case, emission and/or scattering of the electromagnetic radiation can be effected without spectral influencing of the electromagnetic radiation or with such influencing. Thus, by way of example, a wavelength shift can also occur during scattering, for example according to Stokes or Raman. Furthermore, emission of light can be excited, for example, by a primary illumination source, for example by the object or a partial region of the object being excited to generate luminescence, in particular phosphorescence and/or fluorescence. Other emission processes are also possible, in principle. If a reflection occurs, then the object can have for example at least one reflective region, in particular at least one reflective surface. Said reflective surface can be a part of the object itself, but can also be for example a reflector which is connected or spatially coupled to the object, for example a reflector plaque connected to the object. If at least one reflector is used, then it can in turn also be regarded as part of the detector which is connected to the object, for example, independently of other constituent parts of the detector.

The beacon devices and/or the at least one optional illumination source generally may emit light in at least one of: the ultraviolet spectral range, preferably in the range of 200 nm to 380 nm; the visible spectral range (380 nm to 780 nm); the infrared spectral range, preferably in the range of 780 nm to 3.0 micrometers, more preferably in the part of the near infrared region where silicon photodiodes are applicable specifically in the range of 700 nm to 1000 nm. For thermal imaging applications the target may emit light in the far infrared spectral range, preferably in the range of 3.0 micrometers to 20 micrometers. For example, the at least one illumination source is adapted to emit light in the visible spectral range, preferably in the range of 500 nm to 780 nm, most preferably at 650 nm to 750 nm or at 690 nm to 700 nm. For example, the at least one illumination source is adapted to emit light in the infrared spectral range. Other options, however, are feasible.

The feeding of the light beam to the optical sensor can be effected in particular in such a way that a light spot, for example having a round, oval or differently configured cross section, is produced on the optional sensor area of the optical sensor. By way of example, the detector can have a visual range, in particular a solid angle range and/or spatial range, within which objects can be detected. Preferably, the transfer device may be designed in such a way that the light spot, for example in the case of an object arranged within a visual range of the detector, is arranged completely on a sensor region and/or on a sensor area of the optical sensor. By way of example, a sensor area can be chosen to have a corresponding size in order to ensure this condition.

In a further aspect, the present invention discloses a method for determining a position of at least one object by using a detector, such as a detector according to the present invention, such as according to one or more of the embodiments referring to a detector as disclosed above or as disclosed in further detail below. Still, other types of detectors may be used. The method comprises the following method steps, wherein the method steps may be performed in the given order or may be performed in a different order. Further, one or more additional method steps may be present which are not listed. Further, one, more than one or even all of the method steps may be performed repeatedly.

The method comprises the following steps:
providing at least one angle dependent optical element and generating at least one light beam having at least one beam profile depending on an angle of incidence;
providing at least two optical sensors, wherein each optical sensor has at least one light sensitive area, wherein each optical sensor is designed to generate at least one sensor signal in response to an illumination of its respective light-sensitive area by the light beam generated by the angle dependent optical element;

illuminating each of the light-sensitive areas of the at least two optical sensors of the detector with the light beam generated by the angle dependent optical element, wherein, thereby, each of the light-sensitive areas generates at least one sensor signal; and evaluating the sensor signals, thereby, determining at least one longitudinal coordinate z of the object, wherein the evaluating comprises deriving a combined signal Q of the sensor signals.

Specifically, evaluating the first and second sensor signal may comprise deriving the combined signal Q by dividing the first and second sensor signals, by dividing multiples of the first and second sensor signals or by dividing linear combinations of the first and second sensor signals. Further, the determining the longitudinal coordinate may comprise evaluating the combined signal Q.

As also discussed above, the second optical sensor specifically may comprise at least two photosensitive elements. The method may further comprise determining at least one transversal coordinate x, y of the object by evaluating the sensor signals of the photosensitive elements.

The method may further comprise the following steps:
providing at least one measuring head comprising one optical measurement fiber and at least one transfer device;
generating at least one light beam originating from the optical measurement fiber;
providing the at least two optical sensors, wherein each optical sensor is designed to generate the at least one sensor signal in response to illumination of its respective light-sensitive area by the at least one light beam originating from the optical measurement fiber;
illuminating each of the light-sensitive areas of the at least two optical sensors with the light beam, wherein, thereby, each of the light-sensitive areas generates at least one sensor signal; and
evaluating the sensor signals, thereby, determining the at least one longitudinal coordinate z of the object, wherein the evaluating comprises deriving a combined signal Q of the sensor signals.

For details, options and definitions, reference may be made to the detector as discussed above. Thus, specifically, as outlined above, the method may comprise using the detector according to the present invention, such as according to one or more of the embodiments given above or given in further detail below.

In a further aspect of the present invention, use of the detector according to the present invention, such as according to one or more of the embodiments given above or given in further detail below, is proposed, for a purpose of use, selected from the group consisting of: a position measurement in traffic technology; an entertainment application; an optical data storage application; a security application; a surveillance application; a safety application; a human-machine interface application; a tracking application; a photography application; an imaging application or camera application; a mapping application for generating maps of at least one space; a homing or tracking beacon detector for vehicles; a machine vision application; a robotics application; a quality control application; a manufacturing application.

The object generally may be a living or non-living object. The detector or the detector system even may comprise the at least one object, the object thereby forming part of the detector system. Preferably, however, the object may move independently from the detector, in at least one spatial dimension. The object generally may be an arbitrary object.

In one embodiment, the object may be a rigid object. Other embodiments are feasible, such as embodiments in which the object is a non-rigid object or an object which may change its shape.

As will be outlined in further detail below, the present invention may specifically be used for tracking positions and/or motions of a person, such as for the purpose of controlling machines, gaming or simulation of sports. In this or other embodiments, specifically, the object may be selected from the group consisting of: an article of sports equipment, preferably an article selected from the group consisting of a racket, a club, a bat; an article of clothing; a hat; a shoe.

Thus, generally, the devices according to the present invention, such as the detector, may be applied in various fields of uses. Specifically, the detector may be applied for a purpose of use, selected from the group consisting of: a position measurement in traffic technology; an entertainment application; a security application; a human-machine interface application; a tracking application; a photography application; a mapping application for generating maps of at least one space, such as at least one space selected from the group of a room, a building and a street; a mobile application; a webcam; an audio device; a dolby surround audio system; a computer peripheral device; a gaming application; a camera or video application; a security application; a surveillance application; an automotive application; a transport application; a medical application; a sports' application; a machine vision application; a vehicle application; an airplane application; a ship application; a spacecraft application; a building application; a construction application; a cartography application; a manufacturing application. Additionally or alternatively, applications in local and/or global positioning systems may be named, especially landmark-based positioning and/or navigation, specifically for use in cars or other vehicles (such as trains, motorcycles, bicycles, trucks for cargo transportation), robots or for use by pedestrians. Further, indoor positioning systems may be named as potential applications, such as for household applications and/or for robots used in manufacturing, logistics, surveillance, or maintenance technology.

The devices according to the present invention may be used in mobile phones, tablet computers, laptops, smart panels or other stationary or mobile or wearable computer or communication applications. Thus, the devices according to the present invention may be combined with at least one active light source, such as a light source emitting light in the visible range or infrared spectral range, in order to enhance performance. Thus, as an example, the devices according to the present invention may be used as cameras and/or sensors, such as in combination with mobile software for scanning and/or detecting environment, objects and living beings. The devices according to the present invention may even be combined with 2D cameras, such as conventional cameras, in order to increase imaging effects. The devices according to the present invention may further be used for surveillance and/or for recording purposes or as input devices to control mobile devices, especially in combination with voice and/or gesture recognition. Thus, specifically, the devices according to the present invention acting as human-machine interfaces, also referred to as input devices, may be used in mobile applications, such as for controlling other electronic devices or components via the mobile device, such as the mobile phone. As an example, the mobile application including at least one device according to the present invention may be used for controlling a television set, a game console, a music player or music device or other entertainment devices.

Further, the devices according to the present invention may be used in webcams or other peripheral devices for computing applications. Thus, as an example, the devices according to the present invention may be used in combination with software for imaging, recording, surveillance, scanning or motion detection. As outlined in the context of the human-machine interface and/or the entertainment device, the devices according to the present invention are particularly useful for giving commands by facial expressions and/or body expressions. The devices according to the present invention can be combined with other input generating devices like e.g. mouse, keyboard, touchpad, microphone etc. Further, the devices according to the present invention may be used in applications for gaming, such as by using a webcam. Further, the devices according to the present invention may be used in virtual training applications and/or video conferences. Further, devices according to the present invention may be used to recognize or track hands, arms, or objects used in a virtual or augmented reality application, especially when wearing head-mounted displays. For example, the devices may be used for determining a distance between eyes and glasses and/or a position of eyes and/or glasses in virtual or augmented reality applications such as to determine the focus and or position of a projection.

Further, the devices according to the present invention may be used in mobile audio devices, television devices and gaming devices, as partially explained above. Specifically, the devices according to the present invention may be used as controls or control devices for electronic devices, entertainment devices or the like. Further, the devices according to the present invention may be used for eye detection or eye tracking, such as in 2D- and 3D-display techniques, especially with transparent displays for augmented reality applications and/or for recognizing whether a display is being looked at and/or from which perspective a display is being looked at. Further, devices according to the present invention may be used to explore a room, boundaries, obstacles, in connection with a virtual or augmented reality application, especially when wearing a head-mounted display.

Further, the devices according to the present invention may be used in or as digital cameras such as DSC cameras and/or in or as reflex cameras such as SLR cameras. For these applications, reference may be made to the use of the devices according to the present invention in mobile applications such as mobile phones, as disclosed above.

Further, the devices according to the present invention may be used for security or surveillance applications. Thus, as an example, at least one device according to the present invention can be combined with one or more digital and/or analogue electronics that will give a signal if an object is within or outside a predetermined area (e.g. for surveillance applications in banks or museums). Specifically, the devices according to the present invention may be used for optical encryption. Detection by using at least one device according to the present invention can be combined with other detection devices to complement wavelengths, such as with IR, x-ray, UV-VIS, radar or ultrasound detectors. The devices according to the present invention may further be combined with an active infrared light source to allow detection in low light surroundings. The devices according to the present invention are generally advantageous as compared to active detector systems, specifically since the devices according to the present invention avoid actively sending signals which may be detected by third parties, as is the case e.g. in radar applications, ultrasound applications, LIDAR or similar active detector devices. Thus, generally, the devices according to the present invention may be used for an unrecognized and undetectable tracking of moving objects. Additionally, the devices according to the present invention generally are less prone to manipulations and irritations as compared to conventional devices.

Further, given the ease and accuracy of 3D detection by using the devices according to the present invention, the devices according to the present invention generally may be used for facial, body and person recognition and identification. Therein, the devices according to the present invention may be combined with other detection means for identification or personalization purposes such as passwords, finger prints, iris detection, voice recognition or other means. Thus, generally, the devices according to the present invention may be used in security devices and other personalized applications.

Further, the devices according to the present invention may be used as 3D barcode readers for product identification.

In addition to the security and surveillance applications mentioned above, the devices according to the present invention generally can be used for surveillance and monitoring of spaces and areas. Thus, the devices according to the present invention may be used for surveying and monitoring spaces and areas and, as an example, for triggering or executing alarms in case prohibited areas are violated. Thus, generally, the devices according to the present invention may be used for surveillance purposes in building surveillance or museums, optionally in combination with other types of sensors, such as in combination with motion or heat sensors, in combination with image intensifiers or image enhancement devices and/or photo-multipliers. Further, the devices according to the present invention may be used in public spaces or crowded spaces to detect potentially hazardous activities such as commitment of crimes such as theft in a parking lot or unattended objects such as unattended baggage in an airport.

Further, the devices according to the present invention may advantageously be applied in camera applications such as video and camcorder applications. Thus, the devices according to the present invention may be used for motion capture and 3D-movie recording. Therein, the devices according to the present invention generally provide a large number of advantages over conventional optical devices. Thus, the devices according to the present invention generally require a lower complexity with regard to optical components. Thus, as an example, the number of lenses may be reduced as compared to conventional optical devices, such as by providing the devices according to the present invention having one lens only. Due to the reduced complexity, very compact devices are possible, such as for mobile use. Conventional optical systems having two or more lenses with high quality generally are voluminous, such as due to the general need for voluminous beam-splitters. Further, the devices according to the present invention generally may be used for focus/autofocus devices, such as autofocus cameras. Further, the devices according to the present invention may also be used in optical microscopy, especially in confocal microscopy. One or more devices of the present invention may be used for determining distances in microscopy, such as a distance from a lens to a sample or an orientation of a sample.

Further, the devices according to the present invention generally are applicable in the technical field of automotive technology and transport technology. Thus, as an example, the devices according to the present invention may be used as distance and surveillance sensors, such as for adaptive cruise control, emergency brake assist, lane departure warning, surround view, blind spot detection, traffic sign detection, traffic sign recognition, lane recognition, rear cross traffic alert, light source recognition for adapting the head light intensity and range depending on approaching traffic or vehicles driving ahead, adaptive frontlighting systems, automatic control of high beam head lights, adaptive cut-off lights in front light systems, glare-free high beam front lighting systems, marking animals, obstacles, or the like by headlight illumination, rear cross traffic alert, and other driver assistance systems such as advanced driver assistance systems, or other automotive and traffic applications. Further, devices according to the present invention may be used in driver assistance systems anticipating maneuvers of the driver beforehand for collision avoidance or the like. Further, the devices according to the present invention can also be used for velocity and/or acceleration measurements, such as by analyzing a first and second time-derivative of position information gained by using the detector according to the present invention. This feature generally may be applicable in automotive technology, transportation technology or general traffic technology. Applications in other fields of technology are feasible. A specific application in an indoor positioning system may be the detection of positioning of passengers in transportation, more specifically to electronically control the use of safety systems such as airbags. The use of an airbag may be prevented in case the passenger is located as such, that the use of an airbag will cause a severe injury. Further, in vehicles such as cars, trains, planes or the like, especially in autonomous vehicles, devices according to the present invention may be used to determine whether a driver pays attention to the traffic or is distracted, or asleep, or tired, or incapable of driving such as due to the consumption of alcohol or the like.

In these or other applications, generally, the devices according to the present invention may be used as stand-alone devices or in combination with other sensor devices, such as in combination with radar and/or ultrasonic devices. Specifically, the devices according to the present invention may be used for autonomous driving and safety issues. Further, in these applications, the devices according to the present invention may be used in combination with infrared sensors, radar sensors, which are sonic sensors, two-dimensional cameras or other types of sensors. In these applications, the generally passive nature of the devices according to the present invention is advantageous. Thus, since the devices according to the present invention generally do not require emitting signals, the risk of interference of active sensor signals with other signal sources may be avoided. The devices according to the present invention specifically may be used in combination with recognition software, such as standard image recognition software.

Thus, signals and data as provided by the devices according to the present invention typically are readily processable and, therefore, generally require lower calculation power than established 3D measurement systems. Given the low space demand, the devices according to the present invention such as cameras may be placed at virtually any place in a vehicle, such as on or behind a window screen, on a front hood, on bumpers, on lights, on mirrors or other places and the like. Various detectors according to the present invention such as one or more detectors based on the effect disclosed within the present invention can be combined, such as in order to allow autonomously driving vehicles or in order to increase the performance of active safety concepts. Thus, various devices according to the present invention may be combined with one or more other devices according to the present invention and/or conventional sensors, such as in the windows like rear window, handgrip, side window or front window, on the bumpers or on the lights.

A combination of at least one device according to the present invention such as at least one detector according to the present invention with one or more rain detection sensors is also possible. This is due to the fact that the devices according to the present invention generally are advantageous over conventional sensor techniques such as radar, specifically during heavy rain. A combination of at least one device according to the present invention with at least one conventional sensing technique such as radar may allow for a software to pick the right combination of signals according to the weather conditions.

Further, the devices according to the present invention generally may be used as break assist and/or parking assist and/or for speed measurements. Speed measurements can be integrated in the vehicle or may be used outside the vehicle, such as in order to measure the speed of other cars in traffic control. Further, the devices according to the present invention may be used for detecting free parking spaces in parking lots. Further, the devices according to the present invention may be used in towing robots such as in automated parking lots.

Further, devices according to the present invention may comprise one or more motion sensors, such as one or more sensors selected from the group consisting of: a position sensor; an inclination sensor; an acceleration sensor; a vibration sensor; a gyroscopic sensor. Other types of motion sensors may be used. As used herein, a motion sensor generally refers to a sensor which is adapted to determine at least one of a position, a velocity, an acceleration, and inclination or an orientation of the sensor and/or of the object to which the sensor may be attached and/or into which the sensor may be integrated. In a linear measurement distance measurement along the optical axis, a combination with motion sensors may allow measurements in directions other than the optical axis. As an example, measuring a first distance of a first object along the optical axis, measuring an angle of rotation of the measurement head by a motion sensor, such as a gyroscope, and measuring a second distance to a second object along the rotated optical axis may allow to determine the distance between the first and the second object by using standard laws of trigonometry.

Further, the devices according to the present invention may be used in the fields of medical systems and sports. Thus, in the field of medical technology, surgery robotics, e.g. for use in endoscopes, may be named, since, as outlined above, the devices according to the present invention may require a low volume only and may be integrated into other devices. Specifically, the devices according to the present invention having one lens, at most, may be used for capturing 3D information in medical devices such as in endoscopes. Use of the devices according to the present invention for medical endoscopy allows avoiding electronics in tips and extra cables. This may allow to separate the electronics and optomechanical parts such as for disinfection, as generally done for example in laparoscopy. In particular, the devices according to the present invention may be used advantageously for lesion size measurements, lumen volume (airway lumen), organ positions, organ sizes, reference positions, or size measurements for diagnosis and follow-up or to allow higher precision in operation procedures such as the localization of lesions, tumors or the like. Further, focus and/or autofocus for endoscopy is possible. Further, the devices according to the present invention may be used advantageously for size calibration in endoscopy images. Further, the devices according to the present invention may be combined with an appropriate monitoring software, in order to enable tracking and analysis of movements. This may allow an instant overlay of the position of a medical device, such as an endoscope or a scalpel, with results from medical imaging, such as obtained from magnetic resonance imaging, x-ray imaging, or ultrasound imaging. These applications are specifically valuable e.g. in medical treatments where precise location information is important such as in brain surgery and long-distance diagnosis and tele-medicine.

Further, the devices according to the present invention may be used in 3D-body scanning. As outlined above, the scanning system may comprise at least one actuator configured for moving a measuring head to scan a region of interest. The movable measuring head may allow 3D scanning of a region of interest. The movable measuring head may allow manufacturing of a compact device. Specifically, the scanning system may be used in minimal invasive medical procedures, in particular endoscopy. Specifically, the scanning system may be used in augmented or virtual reality devices such as augmented or virtual reality glasses for projection, measurement, or both. Body scanning may be applied in a medical context, such as in dental surgery, plastic surgery, bariatric surgery, or cosmetic plastic surgery, or it may be applied in the context of medical diagnosis such as in the diagnosis of myofascial pain syndrome, cancer, body dysmorphic disorder, or further diseases. Body scanning may further be applied in the field of sports to assess ergonomic use or fit of sports equipment. Further, the devices according to the present invention may be used in wearable robots such as in exoskeletons or prosthesis or the like.

Body scanning may further be used in the context of clothing, such as to determine a suitable size and fitting of clothes. This technology may be used in the context of tailor-made clothes or in the context of ordering clothes or shoes from the internet or at a self-service shopping device such as a micro kiosk device or customer concierge device. Body scanning in the context of clothing is especially important for scanning fully dressed customers.

Further, the devices according to the present invention may be used in the context of people counting systems, such as to count the number of people in an elevator, a train, a bus, a car, or a plane, or to count the number of people passing a hallway, a door, an aisle, a retail store, a stadium, an entertainment venue, a museum, a library, a public location, a cinema, a theater, or the like. Further, the 3D-function in the people counting system may be used to obtain or estimate further information about the people that are counted such as height, weight, age, physical fitness, or the like. This information may be used for business intelligence metrics, and/or for further optimizing the locality where people may be counted to make it more attractive or safe. In a retail environment, the devices according to the present invention in the context of people counting may be used to recognize returning customers or cross shoppers, to assess shopping behavior, to assess the percentage of visitors that make purchases, to optimize staff shifts, or to monitor the costs of a shopping mall per visitor. Further, people counting systems may be used for anthropometric surveys. Further, the devices according to the present invention may be used in public transportation systems for automatically charging passengers depending on the length of transport. Further, the devices according to the present invention may be used in playgrounds for children, to recognize injured children or children engaged in dangerous activities, to allow additional interaction with playground toys, to ensure safe use of playground toys or the like.

Further the devices according to the present invention may be used in construction tools, such as a range meter that determines the distance to an object or to a wall, to assess whether a surface is planar, to align objects or place objects in an ordered manner, or in inspection cameras for use in construction environments or the like.

Further, the devices according to the present invention may be applied in the field of sports and exercising, such as for training, remote instructions or competition purposes. Specifically, the devices according to the present invention may be applied in the fields of dancing, aerobic, football, soccer, basketball, baseball, cricket, hockey, track and field, swimming, polo, handball, volleyball, rugby, sumo, judo, fencing, boxing, golf, car racing, laser tag, battlefield simulation etc. The devices according to the present invention can be used to detect the position of a ball, a bat, a sword, motions, etc., both in sports and in games, such as to monitor the game, support the referee or for judgment, specifically automatic judgment, of specific situations in sports, such as for judging whether a point or a goal actually was made.

Further, the devices according to the present invention may be used in the field of auto racing or car driver training or car safety training or the like to determine the position of a car or the track of a car, or the deviation from a previous track or an ideal track or the like.

The devices according to the present invention may further be used to support a practice of musical instruments, in particular remote lessons, for example lessons of string instruments, such as fiddles, violins, violas, celli, basses, harps, guitars, banjos, or ukuleles, keyboard instruments, such as pianos, organs, keyboards, harpsichords, harmoniums, or accordions, and/or percussion instruments, such as drums, timpani, marimbas, xylophones, vibraphones, bongos, congas, timbales, djembes or tablas.

The devices according to the present invention further may be used in rehabilitation and physiotherapy, in order to encourage training and/or in order to survey and correct movements. Therein, the devices according to the present invention may also be applied for distance diagnostics.

Further, the devices according to the present invention may be applied in the field of machine vision. Thus, one or more of the devices according to the present invention may be used e.g. as a passive controlling unit for autonomous driving and or working of robots. In combination with moving robots, the devices according to the present invention may allow for autonomous movement and/or autonomous detection of failures in parts. The devices according to the present invention may also be used for manufacturing and safety surveillance, such as in order to avoid accidents including but not limited to collisions between robots, production parts and living beings. In robotics, the safe and direct interaction of humans and robots is often an issue, as robots may severely injure humans when they are not recognized. Devices according to the present invention may help robots to position objects and humans better and faster and allow a safe interaction. Given the passive nature of the devices according to the present invention, the devices according to the present invention may be advantageous over active devices and/or may be used complementary to existing solutions like radar, ultrasound, 2D cameras, IR detection etc. One particular advantage of the devices according to the present invention is the low likelihood of signal interference. Therefore, multiple sensors can work at the same time in the same environment, without the risk of signal interference. Thus, the devices according to the present invention generally may be useful in highly automated production environments like e.g. but not limited to automotive, mining, steel, etc. The devices according to the present invention can also be used for quality control in production, e.g. in combination with other sensors like 2-D imaging, radar, ultrasound, IR etc., such as for quality control or other purposes. Further, the devices according to the present invention may be used for assessment of surface quality, such as for surveying the surface evenness of a product or the adherence to specified dimensions, from the range of micrometers to the range of meters. Other quality control applications are feasible. In a manufacturing environment, the devices according to the present invention are especially useful for processing natural products such as food or wood, with a complex 3-dimensional structure to avoid large amounts of waste material. Further, devices according to the present invention may be used to monitor the filling level of tanks, silos etc. Further, devices according to the present invention may be used to inspect complex products for missing parts, incomplete parts, loose parts, low quality parts, or the like, such as in automatic optical inspection, such as of printed circuit boards, inspection of assemblies or sub-assemblies, verification of engineered components, engine part inspections, wood quality inspection, label inspections, inspection of medical devices, inspection of product orientations, packaging inspections, food pack inspections, or the like.

Further, the devices according to the present invention may be used in vehicles, trains, airplanes, ships, spacecraft and other traffic applications. Thus, besides the applications mentioned above in the context of traffic applications, passive tracking systems for aircraft, vehicles and the like may be named. The use of at least one device according to the present invention, such as at least one detector according to the present invention, for monitoring the speed and/or the direction of moving objects is feasible. Specifically, the tracking of fast moving objects on land, sea and in the air including space may be named. The at least one device according to the present invention, such as the at least one detector according to the present invention, specifically may be mounted on a still-standing and/or on a moving device. An output signal of the at least one device according to the present invention can be combined e.g. with a guiding mechanism for autonomous or guided movement of another object. Thus, applications for avoiding collisions or for enabling collisions between the tracked and the steered object are feasible. The devices according to the present invention generally are useful and advantageous due to the low calculation power required, the instant response and due to the passive nature of the detection system which generally is more difficult to detect and to disturb as compared to active systems, like e.g. radar. The devices according to the present invention are particularly useful but not limited to e.g. speed control and air traffic control devices. Further, the devices according to the present invention may be used in automated tolling systems for road charges.

The devices according to the present invention generally may be used in passive applications. Passive applications include guidance for ships in harbors or in dangerous areas, and for aircraft when landing or starting. Wherein, fixed, known active targets may be used for precise guidance. The same can be used for vehicles driving on dangerous but well-defined routes, such as mining vehicles. Further, the devices according to the present invention may be used to detect rapidly approaching objects, such as cars, trains, flying objects, animals, or the like. Further, the devices according to the present invention can be used for detecting velocities or accelerations of objects, or to predict the movement of an object by tracking one or more of its position, speed, and/or acceleration depending on time.

Further, as outlined above, the devices according to the present invention may be used in the field of gaming. Thus, the devices according to the present invention can be passive for use with multiple objects of the same or of different size, color, shape, etc., such as for movement detection in combination with software that incorporates the movement into its content. In particular, applications are feasible in implementing movements into graphical output. Further, applications of the devices according to the present invention for giving commands are feasible, such as by using one or more of the devices according to the present invention for gesture or facial recognition. The devices according to the present invention may be combined with an active system in order to work under e.g. low light conditions or in other situations in which enhancement of the surrounding conditions is required. Additionally or alternatively, a combination of one or more devices according to the present invention with one or more IR or VIS light sources is possible. A combination of a detector according to the present invention with special devices is also possible, which can be distinguished easily by the system and its software, e.g. and not limited to, a special color, shape, relative position to other devices, speed of movement, light, frequency used to modulate light sources on the device, surface properties, material used, reflection properties, transparency degree, absorption characteristics, etc. The device can, amongst other possibilities, resemble a stick, a racket, a club, a gun, a knife, a wheel, a ring, a steering wheel, a bottle, a ball, a glass, a vase, a spoon, a fork, a cube, a dice, a figure, a puppet, a teddy, a beaker, a pedal, a switch, a glove, jewelry, a musical instrument or an auxiliary device for playing a musical instrument, such as a plectrum, a drumstick or the like. Other options are feasible.

Further, the devices according to the present invention may be used to detect and or track objects that emit light by themselves, such as due to high temperature or further light emission processes. The light emitting part may be an exhaust stream or the like. Further, the devices according to the present invention may be used to track reflecting objects and analyze the rotation or orientation of these objects.

Further, the devices according to the present invention generally may be used in the field of building, construction and cartography. Thus, generally, one or more devices according to the present invention may be used in order to measure and/or monitor environmental areas, e.g. countryside or buildings. Therein, one or more devices according to the present invention may be combined with other methods and devices or can be used solely in order to monitor progress and accuracy of building projects, changing objects, houses, etc. The devices according to the present invention can be used for generating three-dimensional models of scanned environments, in order to construct maps of rooms, streets, houses, communities or landscapes, both from ground or from air. Potential fields of application may be construction, cartography, real estate management, land surveying or the like. As an example, the devices according to the present invention may be used in drones or multicopters to monitor buildings, production sites, chimneys, agricultural production environments such as fields, production plants, or landscapes, to support rescue operations, to support work in dangerous environments, to support fire brigades in a burning location indoors or outdoors, or to find or monitor one or more persons or animals, or the like, or for entertainment purposes, such as a drone following and recording one or more persons doing sports such as skiing or cycling or the like, which could be realized by following a helmet, a mark, a beacon device, or the like. Devices according to the present invention could be used recognize obstacles, follow a predefined route, follow an edge, a pipe, a building, or the like, or to record a global or local map of the environment. Further, devices according to the present invention could be used for indoor or outdoor localization and positioning of drones, for stabilizing the height of a drone indoors where barometric pressure sensors are not accurate enough, or for the interaction of multiple drones such as concertized movements of several drones or recharging or refueling in the air or the like.

Further, the devices according to the present invention may be used within an interconnecting network of home appliances such as CHAIN (Cedec Home Appliances Interoperating Network) to interconnect, automate, and control basic appliance-related services in a home, e.g. energy or load management, remote diagnostics, pet related appliances, child related appliances, child surveillance, appliances related surveillance, support or service to elderly or ill persons, home security and/or surveillance, remote control of appliance operation, and automatic maintenance support. Further, the devices according to the present invention may be used in heating or cooling systems such as an air-conditioning system, to locate which part of the room should be brought to a certain temperature or humidity, especially depending on the location of one or more persons. Further, the devices according to the present invention may be used in domestic robots, such as service or autonomous robots which may be used for household chores. The devices according to the present invention may be used for a number of different purposes, such as to avoid collisions or to map the environment, but also to identify a user, to personalize the robot's performance for a given user, for security purposes, or for gesture or facial recognition. As an example, the devices according to the present invention may be used in robotic vacuum cleaners, floor-washing robots, dry-sweeping robots, ironing robots for ironing clothes, animal litter robots, such as dog or cat litter robots, charging robot for electrical vehicles, security robots that detect intruders, robotic lawn mowers, automated pool cleaners, rain gutter cleaning robots, robotic shopping carts, luggage carrying robots, line following robots, laundry robots, ironing robots, window washing robots, toy robots, patient monitoring robots, baby monitoring robots, elderly monitoring robots, children monitoring robots, transport robots, telepresence robots, professional service robots, programmable toy robots, pathfinder robots, social robots providing company to less mobile people, following robots, smart card following robots, psychotherapy robots, or robots translating and speech to sign language or sign language to speech. In the context of less mobile people, such as elderly persons, household robots with the devices according to the present invention may be used for picking up objects, transporting objects, and interacting with the objects and the user in a safe way. Further, the devices according to the present invention may be used in humanoid robots, especially in the context of using humanoid hands to pick up or hold or place objects. Further, the devices according to the present invention may be used in combination with audio interfaces especially in combination with household robots which may serve as a digital assistant with interfaces to online or offline computer applications. Further, the devices according to the present invention may be used in robots that can control switches and buttons in industrial and household purposes. Further, the devices according to the present invention may be used in smart home robots such as Mayfield's Kuri. Further, the devices according to the present invention may be used in robots operating with hazardous materials or objects or in dangerous environments. As a non-limiting example, the devices according to the present invention may be used in robots or unmanned remote-controlled vehicles to operate with hazardous materials such as chemicals or radioactive materials especially after disasters, or with other hazardous or potentially hazardous objects such as mines, unexploded arms, or the like, or to operate in or to investigate insecure environments such as near burning objects or post disaster areas or for manned or unmanned rescue operations in the air, in the sea, underground, or the like.

Further, devices according to the present invention may be used for the inspection of adhesive beads, sealing beads, or the like, such as to recognize disruptions, slubs, contractions, asymetries, local defects, or the like. Further, devices according to the present invention may be used to count objects such as dry fruits on a conveyer belt, such as in difficult situations, such as when fruit of similar color and shape may be in direct contact with each other. Further, devices according to the present invention may be used in quality control of die cast or injection molded parts such as to ensure flawless casting or molding, recognize surface damages, worn out toolings or the like. Further, devices according to the present invention may be used for laser-scribing such as for quality control and positioning of the laser. Further, devices according to the present invention may be used for sorting systems, such as to detect position, rotation, and shape of an object, compare it to a database of objects, and classify the object. Further, devices according to the present invention may be used for stamping part inspection, packaging inspection, such as food and pharma packaging inspection, filament inspection, or the like.

Further, devices according to the present invention may be used for navigation purposes, where Global Positioning Systems are not sufficiently reliable. GPS signals commonly use radio waves that are can be blocked or difficult to receive indoors or outdoors in valleys or in forests below the treeline. Further, especially in unmanned autonomous vehicles, the weight of the system may be critical. Especially unmanned autonomous vehicles need high-speed position data for reliable feedback and stability of their control systems. Using devices according to the present invention may allow short time response and positioning without adding weight due to a heavy device.

Further, the devices according to the present invention may be used in household, mobile or entertainment devices, such as a refrigerator, a microwave, a washing machine, a window blind or shutter, a household alarm, an air condition devices, a heating device, a television, an audio device, a smart watch, a mobile phone, a phone, a dishwasher, a stove or the like, to detect the presence of a person, to monitor the contents or function of the device, or to interact with the person and/or share information about the person with further household, mobile or entertainment devices.

Further, the devices according to the present invention may be used to support elderly or disabled persons or persons with limited or no vision, such as in household chores or at work such as in devices for holding, carrying, or picking objects, or in a safety system with optical or acoustical signals signaling obstacles in the environment.

The devices according to the present invention may further be used in agriculture, for example to detect and sort out vermin, weeds, and/or infected crop plants, fully or in parts, wherein crop plants may be infected by fungus or insects. Further, for harvesting crops, the devices according to the present invention may be used to detect animals, such as deer, which may otherwise be harmed by harvesting devices. Further, the devices according to the present invention may be used to monitor the growth of plants in a field or greenhouse, in particular to adjust the amount of water or fertilizer or crop protection products for a given region in the field or greenhouse or even for a given plant. Further, in agricultural biotechnology, the devices according to the present invention may be used to monitor the size and shape of plants.

Further, devices according to the present invention may be used to guide users during a shaving, hair cutting, or cosmetics procedure, or the like. Further, devices according to the present invention may be used to record or monitor what is played on an instrument, such as a violin. Further, devices according to the present invention may be used in smart household appliances such as a smart refrigerator, such as to monitor the contents of the refrigerator and transmit notifications depending on the contents. Further, devices according to the present invention may be used for monitoring or tracking populations of humans, animals, or plants, such as dear or tree populations in forests. Further, devices according to the present invention may be used in harvesting machines, such as for harvesting crops, flowers or fruits, such as grapes, corn, hops, apples, grains, rice, strawberries, asparagus, tulips, roses, soy beans, or the like. Further, devices according to the present invention may be used to monitor the growth of plants, animals, algae, fish, or the like, such as in breeding, food production, agriculture or research applications, to control irrigation, fertilization, humidity, temperature, use of herbicides, insecticides, fungicides, rodenticides, or the like. Further, devices according to the present invention may be used in feeding machines for animals or pets, such as for cows, pigs, cats, dogs, birds, fish, or the like. Further, devices according to the present invention may be used in animal product production processes, such as for collecting milk, eggs, fur, meat, or the like, such as in automated milking or butchering processes. Further, devices according to the present invention may be used for automated seeding machines, or sowing machines, or planting machines such as for planting corn, garlic, trees, salad or the like. Further, devices according to the present invention may be used to assess or monitor weather phenomena, such as clouds, fog, or the like, or to warn from danger of avalanches, tsunamis, gales, earthquakes, thunder storms, or the like. Further, devices according to the present invention may be used to measure motions, shocks, concussions, or the like such as to monitor earthquake risk. Further, devices according to the present invention may be used in traffic technology to monitor dangerous crossings, to control traffic lights depending on traffic, to monitor public spaces, to monitor roads, gyms, stadiums, ski resorts, public events, or the like. Further, devices according to the present invention may be used in medical applications such as to monitor or analyze tissues, medical or biological assays, changes in tissues such as in moles or melanoma or the like, to count bacteria, blood cells, cells, algae, or the like, for retina scans, breath or pulse measurements, gastroscopy, patient surveillance, or the like. Further, devices according to the present invention may be used to monitor the shape, size, or circumference of drops, streams, jets, or the like or to analyze, assess, or monitor profiles or gas or liquid currents such as in a wind channel, or the like. Further, devices according to the present invention may be used to warn drivers such as car or train drivers when they are getting sick or tired or the like. Further, devices according to the present invention may be used in material testing to recognize strains or tensions or fissures, or the like. Further, devices according to the present invention may be used in sailing to monitor and optimize sail positions such as automatically. Further, devices according to the present invention may be used for fuel level gauges.

Further, the devices according to the present invention may be combined with sensors to detect chemicals or pollutants, electronic nose chips, microbe sensor chips to detect bacteria or viruses or the like, Geiger counters, tactile sensors, heat sensors, or the like. This may for example be used in constructing smart robots which are configured for handling dangerous or difficult tasks, such as in treating highly infectious patients, handling or removing highly dangerous substances, cleaning highly polluted areas, such as highly radioactive areas or chemical spills, or for pest control in agriculture.

One or more devices according to the present invention may be used and advantageous for process automation and distance measurement in 3D-printing, for example of a nozzle to surface distance and/or of a nozzle position and/or of a distance between a nozzle and the object in print. Further, devices according to the present invention may be used for quality assurance in 3D printing by comparing the printed object dimensions and/or shape to the input data of the 3D-printer. Further, devices according to the present invention may be used when repositioning a printed structure when continuing to print from a different angle to determine the position to restart the print and/or to determine the position at which a printing process should be restarted after an error, pause, or abortion of the printing process has occurred. One or more devices according to the present invention can further be used for scanning of objects, such as in combination with CAD or similar software, such as for additive manufacturing and/or 3D printing. Therein, use may be made of the high dimensional accuracy of the devices according to the present invention, e.g. in x-, y- or z-direction or in any arbitrary combination of these directions, such as simultaneously. Further, the devices according to the present invention may be used in inspections and maintenance, such as pipeline inspection gauges. Further, in a production environment, the devices according to the present invention may be used to work with objects of a badly defined shape such as naturally grown objects, such as sorting vegetables or other natural products by shape or size or cutting products such as meat or objects that are manufactured with a precision that is lower than the precision needed for a processing step.

Further the devices according to the present invention may be used in local navigation systems to allow autonomously or partially autonomously moving vehicles or multicopters or the like through an indoor or outdoor space. A non-limiting example may comprise vehicles moving through an automated storage for picking up objects and placing them at a different location. Indoor navigation may further be used in shopping malls, retail stores, museums, airports, or train stations, to track the location of mobile goods, mobile devices, baggage, customers or employees, or to supply users with a location specific information, such as the current position on a map, or information on goods sold, or the like.

Further, the devices according to the present invention may be used to ensure safe driving of motorcycles such as driving assistance for motorcycles by monitoring speed, inclination, upcoming obstacles, unevenness of the road, or curves or the like. Further, the devices according to the present invention may be used in trains or trams to avoid collisions.

Further, the devices according to the present invention may be used in handheld devices, such as for scanning packaging or parcels to optimize a logistics process. Further, the devices according to the present invention may be used in further handheld devices such as personal shopping devices, RFID-readers, handheld devices for use in hospitals or health environments such as for medical use or to obtain, exchange or record patient or patient health related information, smart badges for retail or health environments, or the like.

As outlined above, the devices according to the present invention may further be used in manufacturing, quality control or identification applications, such as in product identification or size identification (such as for finding an optimal place or package, for reducing waste etc.). Further, the devices according to the present invention may be used in logistics applications. Thus, the devices according to the present invention may be used for optimized loading or packing containers or vehicles. Further, the devices according to the present invention may be used for monitoring or controlling of surface damages in the field of manufacturing, for monitoring or controlling rental objects such as rental vehicles, and/or for insurance applications, such as for assessment of damages. Further, the devices according to the present invention may be used for identifying a size of material, object or tools, such as for optimal material handling, especially in combination with robots. Further, the devices according to the present invention may be used for process control in production, e.g. for observing filling level of tanks. Further, the devices according to the present invention may be used for maintenance of production assets like, but not limited to, tanks, pipes, reactors, tools etc. Further, the devices according to the present invention may be used for analyzing 3D-quality marks. Further, the devices according to the present invention may be used in manufacturing tailor-made goods such as tooth inlays, dental braces, prosthesis, clothes or the like. The devices according to the present invention may also be combined with one or more 3D-printers for rapid prototyping, 3D-copying or the like. Further, the devices according to the present invention may be used for detecting the shape of one or more articles, such as for anti-product piracy and for anti-counterfeiting purposes.

Thus, specifically, the present application may be applied in the field of photography. Thus, the detector may be part of a photographic device, specifically of a digital camera. Specifically, the detector may be used for 3D photography, specifically for digital 3D photography. Thus, the detector may form a digital 3D camera or may be part of a digital 3D camera. As used herein, the term photography generally refers to the technology of acquiring image information of at least one object. As further used herein, a camera generally is a device adapted for performing photography. As further used herein, the term digital photography generally refers to the technology of acquiring image information of at least one object by using a plurality of light-sensitive elements adapted to generate electrical signals indicating an intensity and/or color of illumination, preferably digital electrical signals. As further used herein, the term 3D photography generally refers to the technology of acquiring image information of at least one object in three spatial dimensions. Accordingly, a 3D camera is a device adapted for performing 3D photography. The camera generally may be adapted for acquiring a single image, such as a single 3D image, or may be adapted for acquiring a plurality of images, such as a sequence of images. Thus, the camera may also be a video camera adapted for video applications, such as for acquiring digital video sequences.

Thus, generally, the present invention further refers to a camera, specifically a digital camera, more specifically a 3D camera or digital 3D camera, for imaging at least one object. As outlined above, the term imaging, as used herein, generally refers to acquiring image information of at least one object. The camera comprises at least one detector according to the present invention. The camera, as outlined above, may be adapted for acquiring a single image or for acquiring a plurality of images, such as image sequence, preferably for acquiring digital video sequences. Thus, as an example, the camera may be or may comprise a video camera. In the latter case, the camera preferably comprises a data memory for storing the image sequence.

As used within the present invention, the expression "position" generally refers to at least one item of information regarding one or more of an absolute position and an orientation of one or more points of the object. Thus, specifically, the position may be determined in a coordinate system of the detector, such as in a Cartesian coordinate system. Additionally or alternatively, however, other types of coordinate systems may be used, such as polar coordinate systems and/or spherical coordinate systems.

As outlined above and as will be outlined in further detail below, the present invention preferably may be applied in the field of human-machine interfaces, in the field of sports and/or in the field of computer games. Thus, preferably, the object may be selected from the group consisting of: an article of sports equipment, preferably an article selected from the group consisting of a racket, a club, a bat, an article of clothing, a hat, a shoe. Other embodiments are feasible.

As used herein, the object generally may be an arbitrary object, chosen from a living object and a non-living object. Thus, as an example, the at least one object may comprise one or more articles and/or one or more parts of an article. Additionally or alternatively, the object may be or may comprise one or more living beings and/or one or more parts thereof, such as one or more body parts of a human being, e.g. a user, and/or an animal.

With regard to the coordinate system for determining the position of the object, which may be a coordinate system of the detector, the detector may constitute a coordinate system in which an optical axis of the detector forms the z-axis and in which, additionally, an x-axis and a y-axis may be provided which are perpendicular to the z-axis and which are perpendicular to each other. As an example, the detector and/or a part of the detector may rest at a specific point in this coordinate system, such as at the origin of this coordinate system. In this coordinate system, a direction parallel or antiparallel to the z-axis may be regarded as a longitudinal direction, and a coordinate along the z-axis may be considered a longitudinal coordinate. An arbitrary direction perpendicular to the longitudinal direction may be considered a transversal direction, and an x- and/or y-coordinate may be considered a transversal coordinate.

Alternatively, other types of coordinate systems may be used. Thus, as an example, a polar coordinate system may be used in which the optical axis forms a z-axis and in which a distance from the z-axis and a polar angle may be used as additional coordinates. Again, a direction parallel or antiparallel to the z-axis may be considered a longitudinal direction, and a coordinate along the z-axis may be considered a longitudinal coordinate. Any direction perpendicular to the z-axis may be considered a transversal direction, and the polar coordinate and/or the polar angle may be considered a transversal coordinate.

The detector may be a device configured for providing at least one item of information on the position of the at least one object and/or a part thereof. Thus, the position may refer to an item of information fully describing the position of the object or a part thereof, preferably in the coordinate system of the detector, or may refer to a partial information, which only partially describes the position. The detector generally may be a device adapted for detecting light beams, such as the light beams propagating from the beacon devices towards the detector.

The evaluation device and the detector may fully or partially be integrated into a single device. Thus, generally, the evaluation device also may form part of the detector. Alternatively, the evaluation device and the detector may fully or partially be embodied as separate devices. The detector may comprise further components.

The detector may be a stationary device or a mobile device. Further, the detector may be a stand-alone device or may form part of another device, such as a computer, a vehicle or any other device. Further, the detector may be a hand-held device. Other embodiments of the detector are feasible.

The detector specifically may be used to record a light-field behind a lens or lens system of the detector, comparable to a plenoptic or light-field camera. Thus, specifically, the detector may be embodied as a light-field camera adapted for acquiring images in multiple focal planes, such as simultaneously. The term light-field, as used herein, generally refers to the spatial light propagation of light inside the detector such as inside camera. The detector according to the present invention, specifically having a stack of optical sensors, may have the capability of directly recording a light-field within the detector or camera, such as behind a lens. The plurality of sensors may record images at different distances from the lens. Using, e.g., convolution-based algorithms such as "depth from focus" or "depth from defocus", the propagation direction, focus points, and spread of the light behind the lens can be modeled. From the modeled propagation of light behind the lens, images at various distances to the lens can be extracted, the depth of field can be optimized, pictures that are in focus at various distances can be extracted, or distances of objects can be calculated. Further information may be extracted.

The use of several optical sensors further allows for correcting lens errors in an image processing step after recording the images. Optical instruments often become expensive and challenging in construction, when lens errors need to be corrected. These are especially problematic in microscopes and telescopes. In microscopes, a typical lens error is that rays of varying distance to the optical axis are distorted differently (spherical aberration). In telescopes, varying the focus may occur from differing temperatures in the atmosphere. Static errors such as spherical aberration or further errors from production may be corrected by determining the errors in a calibration step and then using a fixed image processing such as fixed set of pixels and sensor, or more involved processing techniques using light propagation information. In cases in which lens errors are strongly time-dependent, i.e. dependent on weather conditions in telescopes, the lens errors may be corrected by using the light propagation behind the lens, calculating extended depth of field images, using depth from focus techniques, and others.

The detector according to the present invention may further allow for color detection. For color detection, a plurality of optical sensors having different spectral properties may be used, and sensor signals of these optical sensors may be compared.

Further, the devices according to the present invention may be used in the context of gesture recognition. In this context, gesture recognition in combination with devices according to the present invention may, in particular, be used as a human-machine interface for transmitting information via motion of a body, of body parts or of objects to a machine. Herein, the information may, preferably, be transmitted via a motion of hands or hand parts, such as fingers, in particular, by pointing at objects, applying sign language, such as for deaf people, making signs for numbers, approval, disapproval, or the like, by waving the hand, such as when asking someone to approach, to leave, or to greet a person, to press an object, to take an object, or, in the field of sports or music, in a hand or finger exercise, such as a warm-up exercise. Further, the information may be transmitted by motion of arms or legs, such as rotating, kicking, grabbing, twisting, rotating, scrolling, browsing, pushing, bending, punching, shaking, arms, legs, both arms, or both legs, or a combination of arms and legs, such as for a purpose of sports or music, such as for entertainment, exercise, or training function of a machine. Further, the information may be transmitted by motion of the whole body or major parts thereof, such as jumping, rotating, or making complex signs, such as sign language used at airports or by traffic police in order to transmit information, such as "turn right", "turn left", "proceed", "slow down", "stop", or "stop engines", or by pretending to swim, to dive, to run, to shoot, or the like, or by making complex motions or body positions such as in yoga, pilates, judo, karate, dancing, or ballet. Further, the information may be transmitted by using a real or mock-up device for controlling a virtual device corresponding to the mock-up device, such as using a mock-up guitar for controlling a virtual guitar function in a computer program, using a real guitar for controlling a virtual guitar function in a computer program, using a real or a mock-up book for reading an e-book or moving pages or browsing through in a virtual document, using a real or mock-up pen for drawing in a computer program, or the like. Further, the transmission of the information may be coupled to a feedback to the user, such as a sound, a vibration, or a motion.

In the context of music and/or instruments, devices according to the present invention in combination with gesture recognition may be used for exercising purposes, control of instruments, recording of instruments, playing or recording of music via use of a mock-up instrument or by only pretending to have a instrument present such as playing air guitar, such as to avoid noise or make recordings, or, for conducting of a virtual orchestra, ensemble, band, big band, choir, or the like, for practicing, exercising, recording or entertainment purposes or the like.

Further, in the context of safety and surveillance, devices according to the present invention in combination with gesture recognition may be used to recognize motion profiles of persons, such as recognizing a person by the way of walking or moving the body, or to use hand signs or movements or signs or movements of body parts or the whole body as access or identification control such as a personal identification sign or a personal identification movement.

Further, in the context of smart home applications or internet of things, devices according to the present invention in combination with gesture recognition may be used for central or non-central control of household devices which may be part of an interconnecting network of home appliances and/or household devices, such as refrigerators, central heating, air condition, microwave ovens, ice cube makers, or water boilers, or entertainment devices, such as television sets, smart phones, game consoles, video recorders, DVD players, personal computers, laptops, tablets, or combinations thereof, or a combination of household devices and entertainment devices.

Further, in the context of virtual reality or of augmented reality, devices according to the present invention in combination with gesture recognition may be used to control movements or function of the virtual reality application or of the augmented reality application, such as playing or controlling a game using signs, gestures, body movements or body part movements or the like, moving through a virtual world, manipulating virtual objects, practicing, exercising or playing sports, arts, crafts, music or games using virtual objects such as a ball, chess figures, go stones, instruments, tools, brushes.

Further, in the context of medicine, devices according to the present invention in combination with gesture recognition may be used to support rehabilitation training, remote diagnostics, or to monitor or survey surgery or treatment, to overlay and display medical images with positions of medical devices, or to overlay display prerecorded medical images such as from magnetic resonance tomography or x-ray or the like with images from endoscopes or ultra sound or the like that are recorded during an surgery or treatment.

Further, in the context of manufacturing and process automation, devices according to the present invention in combination with gesture recognition may be used to control, teach, or program robots, drones, unmanned autonomous vehicles, service robots, movable objects, or the like, such as for programming, controlling, manufacturing, manipulating, repairing, or teaching purposes, or for remote manipulating of objects or areas, such as for safety reasons, or for maintenance purposes.

Further, in the context of business intelligence metrics, devices according to the present invention in combination with gesture recognition may be used for people counting, surveying customer movements, areas where customers spend time, objects, customers test, take, probe, or the like.

Further, devices according to the present invention may be used in the context of do-it-yourself or professional tools, especially electric or motor driven tools or power tools, such as drilling machines, saws, chisels, hammers, wrenches, staple guns, disc cutters, metals shears and nibblers, angle grinders, die grinders, drills, hammer drills, heat guns, wrenches, sanders, engraivers, nailers, jig saws, buiscuit joiners, wood routers, planers, polishers, tile cutters, washers, rollers, wall chasers, lathes, impact drivers, jointers, paint rollers, spray guns, morticers, or welders, in particular, to support precision in manufacturing, keeping a minimum or maximum distance, or for safety measures.

Further, the devices according to the present invention may be used to aid visually impaired persons. Further, devices according to the present invention may be used in touch screen such as to avoid direct context such as for hygienic reasons, which may be used in retail environments, in medical applications, in production environments, or the like. Further, devices according to the present invention may be used in agricultural production environments such as in stable cleaning robots, egg collecting machines, milking machines, harvesting machines, farm machinery, harvesters, forwarders, combine harvesters, tractors, cultivators, ploughs, destoners, harrows, strip tills, broadcast seeders, planters such as potato planters, manure spreaders, sprayers, sprinkler systems, swathers, balers, loaders, forklifts, mowers, or the like.

Further, devices according to the present invention may be used for selection and/or adaption of clothing, shoes, glasses, hats, prosthesis, dental braces, for persons or animals with limited communication skills or possibilities, such as children or impaired persons, or the like. Further, devices according to the present invention may be used in the context of warehouses, logistics, distribution, shipping, loading, unloading, smart manufacturing, industry 4.0, or the like. Further, in a manufacturing context, devices according to the present invention may be used in the context of processing, dispensing, bending, material handling, or the like.

The evaluation device may be or may comprise one or more integrated circuits, such as one or more application-specific integrated circuits (ASICs), and/or one or more data processing devices, such as one or more computers, preferably one or more microcomputers and/or microcontrollers, Field Programmable Arrays, or Digital Signal Processors. Additional components may be comprised, such as one or more preprocessing devices and/or data acquisition devices, such as one or more devices for receiving and/or preprocessing of the sensor signals, such as one or more AD-converters and/or one or more filters. Further, the evaluation device may comprise one or more measurement devices, such as one or more measurement devices for measuring electrical currents and/or electrical voltages. Further, the evaluation device may comprise one or more data storage devices. Further, the evaluation device may comprise one or more interfaces, such as one or more wireless interfaces and/or one or more wire-bound interfaces.

The at least one evaluation device may be adapted to perform at least one computer program, such as at least one computer program adapted for performing or supporting one or more or even all of the method steps of the method according to the present invention. As an example, one or more algorithms may be implemented which, by using the sensor signals as input variables, may determine the position of the object.

The evaluation device can be connected to or may comprise at least one further data processing device that may be used for one or more of displaying, visualizing, analyzing, distributing, communicating or further processing of information, such as information obtained by the optical sensor and/or by the evaluation device. The data processing device, as an example, may be connected or incorporate at least one of a display, a projector, a monitor, an LCD, a TFT, a loudspeaker, a multichannel sound system, an LED pattern, or a further visualization device. It may further be connected or incorporate at least one of a communication device or communication interface, a connector or a port, capable of sending encrypted or unencrypted information using one or more of email, text messages, telephone, Bluetooth, Wi-Fi, infrared or internet interfaces, ports or connections. It may further be connected or incorporate at least one of a processor, a graphics processor, a CPU, an Open Multimedia Applications Platform (OMAP™), an integrated circuit, a system on a chip such as products from the Apple A series or the Samsung S3C2 series, a microcontroller or microprocessor, one or more memory blocks such as ROM, RAM, EEPROM, or flash memory, timing sources such as oscillators or phase-locked loops, counter-timers, real-time timers, or power-on reset generators, voltage regulators, power management circuits, or DMA controllers. Individual units may further be connected by buses such as AMBA buses or be integrated in an Internet of Things or Industry 4.0 type network.

The evaluation device and/or the data processing device may be connected by or have further external interfaces or ports such as one or more of serial or parallel interfaces or ports, USB, Centronics Port, FireWire, HDMI, Ethernet, Bluetooth, RFID, Wi-Fi, USART, or SPI, or analogue interfaces or ports such as one or more of ADCs or DACs, or standardized interfaces or ports to further devices such as a 2D-camera device using an RGB-interface such as CameraLink. The evaluation device and/or the data processing device may further be connected by one or more of interprocessor interfaces or ports, FPGA-FPGA-interfaces, or serial or parallel interfaces ports. The evaluation device and the data processing device may further be connected to one or more of an optical disc drive, a CD-RW drive, a DVD+ RW drive, a flash drive, a memory card, a disk drive, a hard disk drive, a solid-state disk or a solid state hard disk.

The evaluation device and/or the data processing device may be connected by or have one or more further external connectors such as one or more of phone connectors, RCA connectors, VGA connectors, hermaphrodite connectors, USB connectors, HDMI connectors, 8P8C connectors, BCN connectors, IEC 60320 C14 connectors, optical fiber connectors, D-subminiature connectors, RF connectors, coaxial connectors, SCART connectors, XLR connectors, and/or may incorporate at least one suitable socket for one or more of these connectors.

Possible embodiments of a single device incorporating one or more of the detectors according to the present invention, the evaluation device or the data processing device, such as incorporating one or more of the optical sensor, optical systems, evaluation device, communication device, data processing device, interfaces, system on a chip, display devices, or further electronic devices, are: mobile phones, personal computers, tablet PCs, televisions, game consoles or further entertainment devices. In a further embodiment, the 3D-camera functionality which will be outlined in further detail below may be integrated in devices that are available with conventional 2D-digital cameras, without a noticeable difference in the housing or appearance of the device, where the noticeable difference for the user may only be the functionality of obtaining and or processing 3D information. Further, devices according to the present invention may be used in 360° digital cameras or surround view cameras.

Specifically, an embodiment incorporating the detector and/or a part thereof such as the evaluation device and/or the data processing device may be: a mobile phone incorporating a display device, a data processing device, the optical sensor, optionally the sensor optics, and the evaluation device, for the functionality of a 3D camera. The detector according to the present invention specifically may be suitable for integration in entertainment devices and/or communication devices such as a mobile phone.

A further embodiment of the present invention may be an incorporation of the detector or a part thereof such as the evaluation device and/or the data processing device in a device for use in automotive, for use in autonomous driving or for use in car safety systems such as Daimler's Intelligent Drive system, wherein, as an example, a device incorporating one or more of the optical sensors, optionally one or more optical systems, the evaluation device, optionally a communication device, optionally a data processing device, optionally one or more interfaces, optionally a system on a chip, optionally one or more display devices, or optionally further electronic devices may be part of a vehicle, a car, a truck, a train, a bicycle, an airplane, a ship, a motorcycle. In automotive applications, the integration of the device into the automotive design may necessitate the integration of the optical sensor, optionally optics, or device at minimal visibility from the exterior or interior. The detector or a part thereof such as the evaluation device and/or the data processing device may be especially suitable for such integration into automotive design.

The detector according to the present invention may further be combined with one or more other types of sensors or detectors. Thus, the detector may further comprise at least one additional detector. The at least one additional detector may be adapted for detecting at least one parameter, such as at least one of: a parameter of a surrounding environment, such as a temperature and/or a brightness of a surrounding environment; a parameter regarding a position and/or orientation of the detector; a parameter specifying a state of the object to be detected, such as a position of the object, e.g. an absolute position of the object and/or an orientation of the object in space. Thus, generally, the principles of the present invention may be combined with other measurement principles in order to gain additional information and/or in order to verify measurement results or reduce measurement errors or noise.

As outlined above, the human-machine interface may comprise a plurality of beacon devices which are adapted to be at least one of directly or indirectly attached to the user and held by the user. Thus, the beacon devices each may independently be attached to the user by any suitable means, such as by an appropriate fixing device. Additionally or alternatively, the user may hold and/or carry the at least one beacon device or one or more of the beacon devices in his or her hands and/or by wearing the at least one beacon device and/or a garment containing the beacon device on a body part.

The beacon device generally may be an arbitrary device which may be detected by the at least one detector and/or which facilitates detection by the at least one detector. Thus, as outlined above or as will be outlined in further detail below, the beacon device may be an active beacon device adapted for generating the at least one light beam to be detected by the detector, such as by having one or more illumination sources for generating the at least one light beam. Additionally or alternatively, the beacon device may fully or partially be designed as a passive beacon device, such as by providing one or more reflective elements adapted to reflect a light beam generated by a separate illumination source. The at least one beacon device may permanently or temporarily be attached to the user in a direct or indirect way and/or may be carried or held by the user. The attachment may take place by using one or more attachment means and/or by the user himself or herself, such as by the user holding the at least one beacon device by hand and/or by the user wearing the beacon device.

Additionally or alternatively, the beacon devices may be at least one of attached to an object and integrated into an object held by the user, which, in the sense of the present invention, shall be included into the meaning of the option of the user holding the beacon devices. Thus, as will be outlined in further detail below, the beacon devices may be attached to or integrated into a control element which may be part of the human-machine interface and which may be held or carried by the user, and of which the orientation may be recognized by the detector device. Thus, generally, the present invention also refers to a detector system comprising at least one detector device according to the present invention and which, further, may comprise at least one object, wherein the beacon devices are one of attached to the object, held by the object and integrated into the object. As an example, the object preferably may form a control element, the orientation of which may be recognized by a user. Thus, the detector system may be part of the human-machine interface as outlined above or as outlined in further detail below. As an example, the user may handle the control element in a specific way in order to transmit one or more items of information to a machine, such as in order to transmit one or more commands to the machine.

Alternatively, the detector system may be used in other ways. Thus, as an example, the object of the detector system may be different from a user or a body part of the user and, as an example, may be an object which moves independently from the user. As an example, the detector system may be used for controlling apparatuses and/or industrial processes, such as manufacturing processes and/or robotics processes. Thus, as an example, the object may be a machine and/or a machine part, such as a robot arm, the orientation of which may be detected by using the detector system.

The human-machine interface may be adapted in such a way that the detector device generates at least one item of information on the position of the user or of at least one body part of the user. Specifically, in case a manner of attachment of the at least one beacon device to the user is known, by evaluating the position of the at least one beacon device, at least one item of information on a position and/or an orientation of the user or of a body part of the user may be gained.

The beacon device preferably is one of a beacon device attachable to a body or a body part of the user and a beacon device which may be held by the user. As outlined above, the beacon device may fully or partially be designed as an active beacon device. Thus, the beacon device may comprise at least one illumination source adapted to generate at least one light beam to be transmitted to the detector, preferably at least one light beam having known beam properties. Additionally or alternatively, the beacon device may comprise at least one reflector adapted to reflect light generated by an illumination source, thereby generating a reflected light beam to be transmitted to the detector.

The object, which may form part of the detector system, may generally have an arbitrary shape. Preferably, the object being part of the detector system, as outlined above, may be a control element which may be handled by a user, such as manually. As an example, the control element may be or may comprise at least one element selected from the group consisting of: a glove, a jacket, a hat, shoes, trousers and a suit, a stick that may be held by hand, a bat, a club, a racket, a cane, a toy, such as a toy gun. Thus, as an example, the detector system may be part of the human-machine interface and/or of the entertainment device.

As used herein, an entertainment device is a device which may serve the purpose of leisure and/or entertainment of one or more users, in the following also referred to as one or more players. As an example, the entertainment device may serve the purpose of gaming, preferably computer gaming. Thus, the entertainment device may be implemented into a computer, a computer network or a computer system or may comprise a computer, a computer network or a computer system which runs one or more gaming software programs.

The entertainment device comprises at least one human-machine interface according to the present invention, such as according to one or more of the embodiments disclosed above and/or according to one or more of the embodiments disclosed below. The entertainment device is designed to enable at least one item of information to be input by a player by means of the human-machine interface. The at least one item of information may be transmitted to and/or may be used by a controller and/or a computer of the entertainment device. The at least one item of information preferably may comprise at least one command adapted for influencing the course of a game. Thus, as an example, the at least one item of information may include at least one item of information on at least one orientation of the player and/or of one or more body parts of the player, thereby allowing for the player to simulate a specific position and/or orientation and/or action required for gaming. As an example, one or more of the following movements may be simulated and communicated to a controller and/or a computer of the entertainment device: dancing; running; jumping; swinging of a racket; swinging of a bat; swinging of a club; pointing of an object towards another object, such as pointing of a toy gun towards a target.

The entertainment device as a part or as a whole, preferably a controller and/or a computer of the entertainment device, is designed to vary the entertainment function in accordance with the information. Thus, as outlined above, a course of a game might be influenced in accordance with the at least one item of information. Thus, the entertainment device might include one or more controllers which might be separate from the evaluation device of the at least one detector and/or which might be fully or partially identical to the at least one evaluation device or which might even include the at least one evaluation device. Preferably, the at least one controller might include one or more data processing devices, such as one or more computers and/or microcontrollers.

As further used herein, a tracking system is a device which is adapted to gather information on a series of past positions of the at least one object and/or at least one part of the object. Additionally, the tracking system may be adapted to provide information on at least one predicted future position and/or orientation of the at least one object or the at least one part of the object. The tracking system may have at least one track controller, which may fully or partially be embodied as an electronic device, preferably as at least one data processing device, more preferably as at least one computer or microcontroller. Again, the at least one track controller may fully or partially comprise the at least one evaluation device and/or may be part of the at least one evaluation device and/or may fully or partially be identical to the at least one evaluation device.

The tracking system comprises at least one detector according to the present invention, such as at least one detector as disclosed in one or more of the embodiments listed above and/or as disclosed in one or more of the embodiments below. The tracking system further comprises at least one track controller. The track controller is adapted to track a series of positions of the object at specific points in time, such as by recording groups of data or data pairs, each group of data or data pair comprising at least one position information and at least one time information.

The tracking system may further comprise the at least one detector system according to the present invention. Thus, besides the at least one detector and the at least one evaluation device and the optional at least one beacon device, the tracking system may further comprise the object itself or a part of the object, such as at least one control element comprising the beacon devices or at least one beacon device, wherein the control element is directly or indirectly attachable to or integratable into the object to be tracked.

The tracking system may be adapted to initiate one or more actions of the tracking system itself and/or of one or more separate devices. For the latter purpose, the tracking system, preferably the track controller, may have one or more wireless and/or wire-bound interfaces and/or other types of control connections for initiating at least one action. Preferably, the at least one track controller may be adapted to initiate at least one action in accordance with at least one actual position of the object. As an example, the action may be selected from the group consisting of: a prediction of a future position of the object; pointing at least one device towards the object; pointing at least one device towards the detector; illuminating the object; illuminating the detector.

As an example of application of a tracking system, the tracking system may be used for continuously pointing at least one first object to at least one second object even though the first object and/or the second object might move. Potential examples, again, may be found in industrial applications, such as in robotics and/or for continuously working on an article even though the article is moving, such as during manufacturing in a manufacturing line or assembly line. Additionally or alternatively, the tracking system might be used for illumination purposes, such as for continuously illuminating the object by continuously pointing an illumination source to the object even though the object might be moving. Further applications might be found in communication systems, such as in order to continuously transmit information to a moving object by pointing a transmitter towards the moving object.

The proposed devices and methods provide a large number of advantages over known detectors of this kind. Thus, the detector generally may avoid the shortcomings of the known prior art systems disclosed above. Specifically, the detector may avoid the use of FiP sensors, thereby allowing for e.g. using simple and cheap and commercially available semiconductor sensors such as silicon photodiodes. These photodiodes generally do not show a luminance dependency, and the method disclosed above is generally independent from the brightness of the scenery and/or the brightness of the light spot on the light beam. Consequently, a range of measurement in terms of luminance or total power of the light beam entering the detector is generally larger in the present invention as compared to many of the devices disclosed above. Further, the measurement by using the detector according to the present invention is generally independent from the target spot size, i.e. from either the size of the object, the size of a light spot projected on to the object or the size of a beacon device being one or more of attached to the object, integrated into the object or held by the object.

The detector according to the present invention may be realized as a simple device combining the functionality of distance measurement or measurement of z-coordinates, with the additional option of measuring one or more transversal coordinates, thereby integrating the functionality of a PSD.

The detector specifically may use two or more linear silicon photodiodes. One photodiodes may be larger than the spot behind a lens of the transfer device, and one may be smaller. The photodiodes may be placed on top of each other or may be located at different positions behind the lens, preferably at different positions along an optical axis of the detector. The use of a beam splitter is optional but is not generally necessary, which allows for using a simple optical setup.

As outlined above, in one embodiment, the second optical sensor may comprise a single photosensitive element or a plurality of photosensitive elements, such as one or more photodiodes. The photosensitive elements may be located at the edges, such as straight edges, e.g. straight rim portions, and/or corners, of the fluorescent waveguiding sheet, such as by placing these photosensitive elements very close to the straight edges, e.g. the straight rim portions, and/or corners. Further, the fluorescent waveguiding sheet generally may be designed in a fully or partially transparent fashion. Thereby, the at least one second optical sensor may be generated as a fully or partially transparent PSD. No further PSD may be required within the detector.

The outcoupling of the fluorescence light out of the fluorescent waveguiding sheet, as outlined above, may take place in a very simple fashion, such as by using a drop of glue, an etching, a scratch, or the like. Outcoupling may take place specifically close to straight edges, e.g. rim portions, and/or corners of the fluorescent waveguiding sheet.

Referring to the one or more photosensitive elements, these photosensitive elements, as an example, may be rendered very small or even spot-like. Generally, in the art of electronics, a small size of the photodiodes renders photodiodes very fast, generally due to the lower electrical capacitance. Additionally or alternatively, however, other types of photosensitive elements may be used, such as strip-shaped photodiodes.

The result of the measurement, i.e. the position determined by the detector such as the at least one longitudinal coordinate, may be rendered widely independent from the brightness of the scenery and/or the brightness of the object, the brightness of the at least one Beacon device, the brightness of the at least one illumination source or the total power of the light beam propagating from the object to the detector. Further, due to this independence and wide range of measurement in terms of brightness, reflective objects or non-reflective objects may be used.

When mentioning a range of measurement, the range of measurement may both refer to a range of brightness which may be used with the detector according to the present invention, such as a range of total powers of the light beam, or may refer to a range of distances between the detector and the object which may be measured. Conventional detectors, such as according to one or more of the documents listed above, are typically limited in both ranges of measurement. The use of the quotient signal, as mentioned above, contrarily, provides a wide range of a continuously and monotonously decreasing or increasing functions which may be used to determine the longitudinal coordinate from the quotient signal. Consequently, a very wide range of measurement in terms of distance between the object and the detector is given. Similarly, due to the general independence of the quotient signal from the total power of the light beam, at least as long as no saturation of one or both of the optical sensors is reached, also provides a very wide range of measurement in terms of brightness, i.e. in terms of total power of the light beam.

The light beam, within the detector, generally may propagate along an optical axis of the detector. The first and second optical sensors may be placed on the optical axis. The light beam, however, may also propagate in other ways than along the optical axis. As an example, an illumination light beam may be generated which propagates along the optical axis or which propagates parallel to the optical axis or at an angle to the optical axis which is different from 0°, such as an angle of 1° to 20°. Other embodiments are feasible.

Overall, in the context of the present invention, the following embodiments are regarded as preferred:

Embodiment 1

A detector for determining a position of at least one object, the detector comprising:
- at least one angle dependent optical element adapted to generate at least one transmission light beam having at least one beam profile depending on an angle of incidence of an incident light beam propagating from the object towards the detector and illuminating the angle dependent optical element, wherein the angle dependent optical element comprises at least one optical element selected from the group consisting of: at least one optical fiber, in particular at least one multifurcated optical fiber, in particular at least one bifurcated optical fiber; at least one diffractive optical element; at least one angle dependent reflective element, at least one diffractive grating element, in particular a blaze grating element; at least one aperture stop; at least one prism; at least one lens; at least one lens array, in particular at least one microlens array; at least one optical filter; at least one polarization filter; at least one bandpass filter; at least one liquid crystal filter, in particular a liquid crystal tunable filter; at least one short-pass filter; at least one long-pass filter; at least one notch filter; at least one interference filter; at least one transmission grating; at least one nonlinear optical element, in particular one birefringent optical element;
- at least two optical sensors, wherein each optical sensor has at least one light sensitive area, wherein each optical sensor is designed to generate at least one sensor signal in response to an illumination of its respective light-sensitive area by the light beam generated by the angle dependent optical element;
- at least one evaluation device being configured for determining at least one longitudinal coordinate z of the object by evaluating a combined signal Q from the sensor signals.

Embodiment 2

The detector according to the preceding embodiment, wherein the detector comprises at least one transfer device, wherein the transfer device has at least one focal length in response to at least one incident light beam propagating from the object to the detector.

Embodiment 3

The detector according to any one of the preceding embodiments, wherein the detector further comprises an illumination source for illuminating the object.

Embodiment 4

The detector according to the preceding embodiment, wherein the illumination source is adapted to illuminate the object through the angle dependent optical element.

Embodiment 5

The detector according to any one of the two preceding embodiments, wherein the illumination source and the angle dependent optical element are arranged in the direction of propagation of the light beam traveling from the object to the detector behind the transfer device.

Embodiment 6

The detector according to any one of the three preceding embodiments, wherein a distance perpendicular to an optical axis of the detector between the illumination source and the optical sensors is small.

Embodiment 7

The detector according to the preceding embodiment, wherein the distance perpendicular to the optical axis of the detector between the illumination source and the optical sensors is less than 0.01 m, preferably less than 0.005 m, more preferably less than 0.0025 m.

Embodiment 8

The detector according to any one of the five preceding embodiments, wherein the angle dependent optical element comprises at least one optical fiber having at least one entrance face, wherein a distance perpendicular to an optical axis of the detector between the illumination source and the entrance face of the optical fiber is small, wherein the distance perpendicular to the optical axis of the detector between the illumination source and the entrance face of the optical fiber is less than 0.01 m, preferably less than 0.005 m, more preferably less than 0.0025 m.

Embodiment 9

The detector according to any one of the seven preceding embodiments, wherein the angle dependent optical element comprises at least two optical fibers each having at least one entrance face, wherein the entrance faces are arranged concentric or on top of each other or parallel to each other or side by side.

Embodiment 10

The detector according to the preceding embodiment, wherein a distance perpendicular to an optical axis of the detector between the illumination source and one or both entrance faces is less than 0.01 m, preferably less than 0.005 m, more preferably less than 0.0025 m.

Embodiment 11

The detector according to any one of the four preceding embodiments, wherein the angle dependent optical element is an optical fiber, wherein the illumination source is guided through the optical fiber, wherein the illumination source is adapted to generate at least one illumination beam, wherein the illumination beam exits the optical fiber behind the transfer device within a baseline that is smaller than a radius of the transfer device, wherein the optical fiber guiding the illumination beam may be attached to the transfer device to reduce reflections at interfaces with larger differences in refractive index.

Embodiment 12

The detector according to the preceding embodiment, wherein the optical fiber is attached to the transfer device by one or more of a polymer, a glue or other means for attachment.

Embodiment 13

The detector according to any one of the six preceding embodiments, wherein the distance perpendicular to the optical axis of the detector between the illumination source and the optical sensors is less than the radius of the transfer device.

Embodiment 14

The detector according to any one of the seven preceding embodiments, wherein the angle dependent optical element comprises at least one optical fiber comprising at least one entrance face, wherein the distance perpendicular to the optical axis of the detector between the illumination source and the entrance face is less than the radius of the transfer device.

Embodiment 15

The detector according to any one of the preceding embodiments, wherein the evaluation device is configured for deriving the combined signal Q by one or more of dividing the sensor signals, dividing multiples of the sensor signals, dividing linear combinations of the sensor signals.

Embodiment 16

The detector according to the preceding embodiment, wherein the evaluation device is configured for using at least one predetermined relationship between the combined signal Q and the longitudinal coordinate for determining the longitudinal coordinate.

Embodiment 17

The detector according to any one of the preceding embodiments, wherein the evaluation device is configured for deriving the combined signal Q by $$Q(z_O) = \frac{\int\int_{A_1} E(x, y; z_O) dx dy}{\int\int_{A_2} E(x, y; z_O) dx dy}$$

wherein x and y are transversal coordinates, A1 and A2 are areas of the beam profile at a sensor position of the optical sensors, and $E(x,y,z_O)$ denotes the beam profile given at the object distance $z_O$.

Embodiment 18

The detector according to any one of the preceding embodiments, wherein the evaluation device comprises at least one divider, wherein the divider is configured for deriving the combined signal.

Embodiment 19

The detector according to any one of the preceding embodiments, wherein the optical sensors are positioned off focus.

Embodiment 20

The detector according to any one of the preceding embodiments, wherein the angle dependent optical element comprises at least one optical fiber having an entrance face, wherein the entrance face is positioned off focus.

Embodiment 21

The detector according to any one of the preceding embodiments, wherein each of the sensor signals comprises at least one information of at least one area of the beam profile of the beam profile of the light beam generated by the angle dependent optical element.

Embodiment 22

The detector according to the preceding embodiment, wherein the beam profile is selected from the group consisting of a trapezoid beam profile; a triangle beam profile; a conical beam profile and a linear combination of Gaussian beam profiles.

Embodiment 23

The detector according to any one of the two preceding embodiments, wherein the light-sensitive areas are arranged such that a first sensor signal comprises information of a first area of the beam profiles and a second sensor signal comprises information of a second area of the beam profile, wherein the first area of the beam profile and the second area of the beam profile are one or both of adjacent or overlapping regions.

Embodiment 24

The detector according to any one of the three preceding embodiments, wherein the angle dependent optical element comprises at least two optical fibers each having an entrance face, wherein the entrance faces are arranged such that a first sensor signal comprises information of a first area of the beam profiles and a second sensor signal comprises information of a second area of the beam profile, wherein the first area of the beam profile and the second area of the beam profile are one or both of adjacent or overlapping regions.

Embodiment 25

The detector according to any one of the two preceding embodiments, wherein the evaluation device is configured to determine the first area of the beam profile and the second area of the beam profile.

Embodiment 26

The detector according to any one of the five preceding embodiments, wherein the first area of the beam profile comprises essentially edge information of the beam profile and the second area of the beam profile comprises essentially center information of the beam profile.

Embodiment 27

The detector according to any one of the preceding embodiments, wherein the edge information comprises information relating to a number of photons in the first area of the beam profile and the center information comprises information relating to a number of photons in the second area of the beam profile.

Embodiment 28

The detector according to any one of the two the preceding embodiments, wherein the evaluation device is configured to derive the combined signal Q by one or more of dividing the edge information and the center information, dividing multiples of the edge information and the center information, dividing linear combinations of the edge information and the center in-formation.

Embodiment 29

The detector according to any one of the preceding embodiments, wherein the detector has at least one sensor element having a matrix of optical sensors, the optical sensors each having a light-sensitive area, wherein each optical sensor is configured to generate at least one sensor signal in response to an illumination of the light-sensitive area by the light beam generated by the angle dependent optical element.

Embodiment 30

The detector according to the preceding embodiment, wherein the evaluation device is configured for evaluating the sensor signals, by
a) determining at least one optical sensor having the highest sensor signal and forming at least one center signal;
b) evaluating the sensor signals of the optical sensors of the matrix and forming at least one sum signal;
c) determining at least one combined signal by combining the center signal and the sum signal; and
d) determining at least one longitudinal coordinate z of the object by evaluating the combined signal.

Embodiment 31

The detector according to the preceding embodiment, wherein the center signal is selected from the group consisting of: the highest sensor signal; an average of a group of sensor signals being within a predetermined range of tolerance from the highest sensor signal; an average of sensor signals from a group of optical sensors containing the optical sensor having the highest sensor signal and a predetermined group of neighboring optical sensors; a sum of sensor signals from a group of optical sensors containing the optical sensor having the highest sensor signal and a predetermined group of neighboring optical sensors; a sum of a group of sensor signals being within a predetermined range of tolerance from the highest sensor signal; an average of a group of sensor signals being above a predetermined threshold; a sum of a group of sensor signals being above a predetermined thresh-old; an integral of sensor signals from a group of optical sensors containing the optical sensor having the highest sensor signal and a predetermined group of neighboring optical sensors; an integral of a group of sensor signals being within a predetermined range of tolerance from the highest sensor signal; an integral of a group of sensor signals being above a predetermined threshold.

Embodiment 32

The detector according to any one of the two preceding embodiments, wherein the sum signal is selected from the group consisting of: an average over all sensor signals of the matrix; a sum of all sensor signals of the matrix; an integral of all sensor signals of the matrix; an average over all sensor signals of the matrix except for sensor signals from those optical sensors contributing to the center signal; a sum of all sensor signals of the matrix except for sensor signals from those optical sensors contributing to the center signal; an integral of all sensor signals of the matrix except for sensor signals from those optical sensors contributing to the center signal; a sum of sensor signals of optical sensors within a predetermined range from the optical sensor having the highest sensor signal; an integral of sensor signals of optical sensors within a predetermined range from the optical sensor having the highest sensor signal; a sum of sensor signals above a certain threshold of optical sensors being located within a predetermined range from the optical sensor having the highest sensor signal; an integral of sensor signals above a certain threshold of optical sensors being located within a predetermined range from the optical sensor having the highest sensor signal.

Embodiment 33

The detector according to any one of the three preceding embodiments, wherein the combined signal is the combined signal Q, derived by one or more of: forming a quotient of the center signal and the sum signal or vice versa; forming a quotient of a multiple of the center signal and a multiple of the sum signal or vice versa; forming a quotient of a linear combination of the center signal and a linear combination of the sum signal or vice versa.

Embodiment 34

The detector according to any one of the preceding embodiments, wherein each light-sensitive area has a geometrical center, wherein the geometrical centers of the optical sensors are spaced apart from an optical axis of the detector by different spatial offsets, wherein each optical sensor is configured to generate a sensor signal in response to an illumination of its respective light-sensitive area by the light beam generated by the angle dependent optical element.

Embodiment 35

The detector according to the preceding embodiment, wherein the optical sensors are part of a sensor array, wherein a geometrical center of the sensor array is offset from the optical axis.

Embodiment 363

The detector according to the preceding embodiment, wherein the sensor array is movable relative to the optical axis.

Embodiment 37

The detector according to the preceding embodiment, wherein the evaluation device is configured for, firstly, determining the transversal position of a light spot generated by the light beam on the sensor array by using the sensor signals and for, secondly, moving the sensor array relative to the optical axis until the light spot is off-centered.

Embodiment 38

The detector according to any one of the four preceding embodiments, wherein the optical sensors are partial diodes of a bi-cell or quadrant diode, with a geometrical center of the quadrant diode being off-centered from the optical axis of the detector.

Embodiment 39

The detector according to any one of the preceding embodiments, wherein the detector comprises:
- at least one measuring head comprising one optical measurement fiber and the at least one transfer device;
- the at least two optical sensors, wherein each optical sensor has the at least one light sensitive area, wherein each optical sensor is designed to generate the at least one sensor signal in response to illumination of its respective light-sensitive area by at least one light beam originating from the optical measurement fiber;
- the at least one evaluation device being configured for determining the at least one longitudinal coordinate z of the object by evaluating the combined signal Q from the sensor signals.

Embodiment 40

The detector according to the preceding embodiment, wherein a numerical aperture of the transfer device is smaller than a numerical aperture of the optical measurement fiber.

Embodiment 41

The detector according to any one of the two preceding embodiments, wherein the transfer device comprises at least one collimating lens.

Embodiment 42

The detector according to any one of the three preceding embodiments, wherein the detector comprises at least one optical illumination fiber, wherein the illumination source is adapted to illuminate the object through the optical illumination fiber.

Embodiment 43

The detector according to any one of the preceding embodiments, wherein the detector comprises a small baseline.

Embodiment 44

The detector according to the preceding embodiment, wherein the baseline is a fixed baseline or a variable baseline.

Embodiment 45

The detector according to any one of the two preceding embodiments, wherein a dividing line of the partial diodes of the bi-cell or of the quadrant diode are arranged essential parallel or essential orthogonal to the baseline.

Embodiment 46

The detector according to any one of the three preceding embodiments, wherein the baseline is less than 0.01 m, preferably less than 0.005 m, more preferably less than 0.0025 m.

Embodiment 47

The detector according to any one of the eight preceding embodiments, wherein the optical sensors comprise a CMOS sensor, wherein the evaluation device is adapted to divide the sensor region of the CMOS sensor into at least two sub-regions, wherein the evaluation device is configured for determining the at least one longitudinal coordinate z of the object by evaluating the combined signal Q from the sensor signals of the at least two sub-regions.

Embodiment 48

The detector according to the preceding embodiment, wherein the evaluation device is adapted to divide the sensor region of the CMOS sensor into at least one left part and at least one right part and/or at least one upper part and at least one lower part and/or at least one inner and at least one outer part.

Embodiment 49

A detector system for determining a position of at least one object, the detector system comprising at least one detector according to any one of the preceding embodiments, the detector system further comprising at least one beacon device adapted to direct at least one light beam towards the detector, wherein the beacon device is at least one of attachable to the object, holdable by the object and integratable into the object.

Embodiment 50

A human-machine interface for exchanging at least one item of information between a user and a machine, wherein the human-machine interface comprises at least one detector system according to the preceding embodiment, wherein the at least one beacon device is adapted to be at least one of directly or indirectly attached to the user and held by the user, wherein the human-machine interface is designed to determine at least one position of the user by means of the detector system, wherein the human-machine interface is designed to assign to the position at least one item of information.

Embodiment 51

An entertainment device for carrying out at least one entertainment function, wherein the entertainment device comprises at least one human-machine interface according to the preceding embodiment, wherein the entertainment device is designed to enable at least one item of information to be input by a player by means of the human-machine interface, wherein the entertainment device is designed to vary the entertainment function in accordance with the information.

Embodiment 52

A tracking system for tracking a position of at least one movable object, the tracking system comprising at least one detector system according to any one of the preceding embodiments referring to a detector system, the tracking system further comprising at least one track controller, wherein the track controller is adapted to track a series of positions of the object at specific points in time.

Embodiment 53

A scanning system for determining a depth profile of a scenery, the scanning system comprising at least one detector according to any of the preceding embodiments referring to a detector, the scanning system further comprising at least one illumination source adapted to scan the scenery with at least one light beam.

Embodiment 54

A scanning system for determining a depth profile of a scenery, the scanning system comprising at least one detector according to any of the preceding embodiments referring to a detector, the scanning system further comprising at least one illumination source adapted to scan the scenery with at least one light beam, wherein the detector comprises at least one measuring head comprising at least one first optical measurement fiber adapted to provide at least one light beam originating from the object to a first optical sensor and at least one second optical measurement fiber adapted to provide the light beam originating from the object to a second optical sensor.

Embodiment 55

The scanning system according to the preceding embodiment, wherein the detector comprises at least one optical illumination fiber, wherein the illumination source is adapted to illuminate the object through the optical illumination fiber, wherein the optical illumination fiber comprises at least one first end adapted to receive the at least one light beam, wherein the optical illumination fiber comprises at least one second end from where the at least one light beam leaves the optical illumination fiber for illumination of the object, wherein at least the second end of the optical illumination fiber is arranged within and/or is attached to the measuring head.

Embodiment 56

The scanning system according to any one of the preceding embodiments referring to a scanning system, wherein the scanning system comprises at least one actuator configured to move the measuring head to scan a region of interest.

Embodiment 57

The scanning system according to the preceding embodiment, wherein the actuator comprises at least one electromechanical actuator and/or at least one piezo actuator, wherein the piezo actuator comprises at least one actuator selected from the group consisting of: at least one piezoceramic actuator; at least one piezoelectric actuator.

Embodiment 58

The scanning system according to any one of the two preceding embodiments, wherein the actuator is configured to move the optical illumination fiber and/or the measurement head.

Embodiment 59

The scanning system according to any one of the three preceding embodiments, wherein the actuator is adapted to move one or both of the optical illumination fiber and/or the measuring head in a linear scan and/or a radial scan and/or a spiral scan.

Embodiment 60

A camera for imaging at least one object, the camera comprising at least one detector according to any one of the preceding embodiments referring to a detector.

Embodiment 61

A readout device for optical storage media, the readout device comprising at least one detector according to any one of the preceding embodiments referring to a detector.

Embodiment 62

A method for determining a position of at least one object by using at least one detector, the method comprising the following steps:
  providing at least one angle dependent optical element and generating at least one light beam having at least one beam profile depending on an angle of incidence;
  providing at least two optical sensors, wherein each optical sensor has at least one light sensitive area, wherein each optical sensor is designed to generate at least one sensor signal in response to an illumination of its respective light-sensitive area by the light beam generated by the angle dependent optical element;
  illuminating each of the light-sensitive areas of the at least two optical sensors of the detector with the light beam generated by the angle dependent optical element, wherein, thereby, each of the light-sensitive areas generates at least one sensor signal; and
  evaluating the sensor signals, thereby, determining at least one longitudinal coordinate z of the object, wherein the evaluating comprises deriving a combined signal Q of the sensor signals.

Embodiment 63

The method according to the preceding embodiment, wherein the deriving of the combined signal Q comprises one or more of dividing the sensor signals, dividing multiples of the sensor signals, dividing linear combinations of the sensor signals.

Embodiment 64

The method according to any one of the two preceding embodiments, the method further comprising the following steps:
  providing at least one measuring head comprising one optical measurement fiber and at least one transfer device;
  generating at least one light beam originating from the optical measurement fiber;
  providing the at least two optical sensors, wherein each optical sensor is designed to generate the at least one sensor signal in response to illumination of its respective light-sensitive area by the at least one light beam originating from the optical measurement fiber;
  illuminating each of the light-sensitive areas of the at least two optical sensors with the light beam, wherein, thereby, each of the light-sensitive areas generates at least one sensor signal; and
  evaluating the sensor signals, thereby, determining the at least one longitudinal coordinate z of the object, wherein the evaluating comprises deriving a combined signal Q of the sensor signals.

Embodiment 65

A use of the detector according to any one of the preceding embodiments relating to a detector, for a purpose of use, selected from the group consisting of: a position measurement in traffic technology; an entertainment application; an optical data storage application; a security application; a surveillance application; a safety application; a human-machine interface application; a logistics application; an endoscopy application; a medical application; a tracking application; a photography application; a machine vision application; a robotics application; a quality control application; a 3D printing application; an augmented reality application; a manufacturing application; a use in combination with optical data storage and readout.

BRIEF DESCRIPTION OF THE FIGURES

Further optional details and features of the invention are evident from the description of preferred exemplary embodiments which follows in conjunction with the dependent claims. In this context, the particular features may be implemented in an isolated fashion or in combination with other features. The invention is not restricted to the exemplary embodiments. The exemplary embodiments are shown schematically in the figures. Identical reference numerals in the individual figures refer to identical elements or elements with identical function, or elements which correspond to one another with regard to their functions.

Specifically, in the figures.

DETAILED DESCRIPTION OF THE EMBODIMENTS

Figure 1:
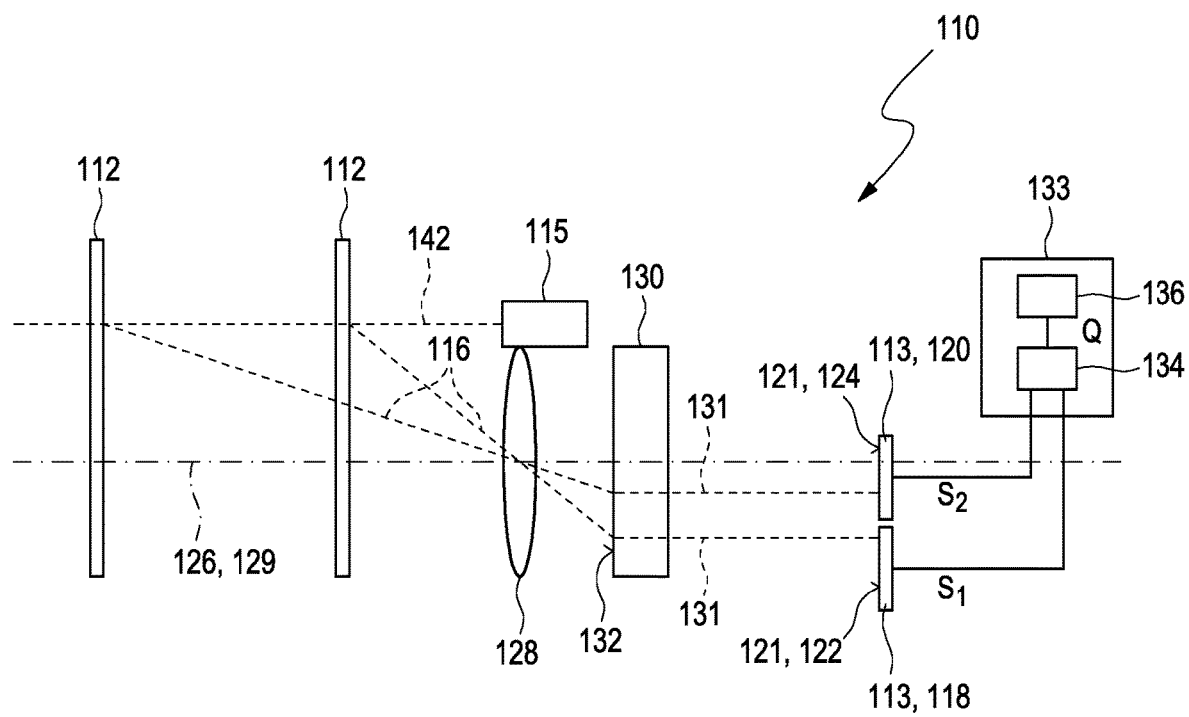
FIG. 1 shows an exemplary embodiment of a detector according to the present invention.

In FIG. 1, a schematic view of an exemplary embodiment of a detector 110 for determining a position of at least one object 112 is depicted. In FIG. 1, the object 112 is depicted for two different object distances. The detector 110 comprises at least two optical sensors 113, for example a first optical sensor 118 and a second optical sensor 120, each having at least one light-sensitive area 121. The object 112 may comprise at least one beacon device 114, from which a light beam 116, also denoted as incident light beam, propagates towards the detector 110. Additionally or alternatively, the detector may comprise at least one illumination source 115 for illuminating the object 112. As an example, the illumination source 115 may be configured for generating an illuminating light beam for illuminating the object 112. Specifically, the illumination source 115 may comprise at least one laser and/or laser source. Various types of lasers may be employed, such as semiconductor lasers. Additionally or alternatively, non-laser light sources may be used, such as LEDs and/or light bulbs. The illumination source 115 may comprise an artificial illumination source, in particular at least one laser source and/or at least one incandescent lamp and/or at least one semiconductor light source, for example, at least one light-emitting diode, in particular an organic and/or inorganic light-emitting diode. As an example, the light emitted by the illumination source 115 may have a wavelength of 300 to 1000 nm, especially 500 to 1000 nm. Additionally or alternatively, light in the infrared spectral range may be used, such as in the range of 780 nm to 3.0 µm. Specifically, the light in the part of the near infrared region where silicon photodiodes are applicable specifically in the range of 700 nm to 1000 nm may be used. Further, the illumination source 115 may be configured for emitting modulated or non-modulated light. In case a plurality of illumination sources 115 is used, the different illumination sources may have different modulation frequencies which, as outlined in further detail below, later on may be used for distinguishing the light beams.

The first optical sensor 118 may comprise a first light-sensitive area 122, and the second optical sensor 120 may comprise a second light-sensitive area 124. The light beam 116, as an example, may propagate along an optical axis 126 of the detector 110. Other embodiments, however, are feasible. The first light-sensitive area 122 and the second light-sensitive area may be oriented towards the object 112. The optical detector 110, further, may comprise at least one transfer device 128, such as at least one lens or a lens system, specifically for beam shaping. The transfer device 128 may have at least one focal length in response to the incident light beam 116 propagating from the object 112 to the detector 110. The transfer device 128 may have an optical axis 129, wherein the transfer device 128 and the optical detector preferably may have a common optical axis. The transfer device 128 may constitute a coordinate system. A direction parallel or anti-parallel to the optical axis 126, 129 may be defined as a longitudinal direction, whereas directions perpendicular to the optical axis 126, 129 may be defined as transversal directions, wherein a longitudinal coordinate z is a coordinate along the optical axis 126, 129 and wherein d is a spatial offset from the optical axis 126, 129. Consequently, the light beam 116 is focused, such as in one or more focal points, and a beam width of the light beam 116 may depend on a longitudinal coordinate z of the object 112, such as on a distance between the detector 110 and the beacon device 114 and/or the object 112. The optical sensors 118, 120 may be positioned off focus. For details of this beam width dependency on the longitudinal coordinate, reference may be made to one or more of the above-mentioned prior art documents, such as to one or more of WO 2012/110924 A1 and/or WO 2014/097181 A1.

The detector comprises at least one angle dependent optical element 130 adapted to generate at least one light beam 131 having at least one beam profile depending on an angle of incidence of an incident light beam propagating from the object 112 towards the detector 110 and illuminating the angle dependent optical element 130. The angle dependent optical element 130 may have angle dependent transmission properties such that an electromagnetic wave impinging on a first side 132, for example a surface and/or an entrance, of the angle dependent optical element 130 may be partly, depending on the properties of the angle dependent optical element, absorbed and/or reflected and/or transmitted. A degree of transmission may be defined as quotient of transmitted power of the electromagnetic wave, i.e. the power behind the angle dependent optical element 130, and the incident power of the electromagnetic wave, i.e. the power before impinging on the angle dependent optical element 130. The angle dependent optical element 130 may be designed such that the degree of transmission depends on an angle of incidence at which the incident light beam propagating from the object towards the detector 110 impinges on the angle dependent optical element 130. The angle of incident may be measured with respect to an optical axis of the angle dependent optical element 130. The angle dependent optical element 130 may be arranged in the direction of propagation behind the transfer device 128. The transfer device may, for example, comprise at least one collimating lens. The angle dependent optical element 130 may be designed to weaken rays impinging with larger angles compared to rays impinging with a smaller angle. For example, the degree of transmission may be highest for light rays parallel to the optical axis, i.e. at 0°, and may decrease for higher angles. In particular, at at least one cut-off angle the degree of transmission may steeply fall to zero. Thus, light rays having a large angle of incidence may be cut-off.

The angle dependent optical element 130 comprises at least one optical element selected from the group consisting of: at least one optical fiber, in particular at least one multifurcated optical fiber, in particular at least one bifurcated optical fiber; at least one diffractive optical element; at least one angle dependent reflective element, at least one diffractive grating element, in particular a blaze grating element; at least one aperture stop; at least one prism; at least one lens; at least one lens array, in particular at least one microlens array; at least one optical filter; at least one polarization filter; at least one bandpass filter; at least one liquid crystal filter, in particular a liquid crystal tunable filter; at least one short-pass filter; at least one long-pass filter; at least one notch filter; at least one interference filter; at least one transmission grating; at least one nonlinear optical element, in particular one birefringent optical element.

The first optical sensor 118, in response to the illumination by the light beam 131, may generate a first sensor signal $s_1$, whereas the second optical sensor 120 may generate a second sensor signal $s_2$. Preferably, the optical sensors 118, 120 are linear optical sensors, i.e. the sensor signals $s_1$ and $s_2$ each are solely dependent on the total power of the light beam 131 or of the portion of the light beam 131 illuminating their respective light-sensitive areas 122, 124, whereas these sensor signals $s_1$ and $s_2$ are independent from the actual size of the light spot of illumination.

The sensor signals $s_1$ and $s_2$ are provided to an evaluation device 133 of the detector 110. The evaluation device 133 is embodied to derive a combined signal Q, as explained above. From the combined signal Q, derived by dividing the sensor signals $s_1$ and $s_2$ or multiples or linear combinations thereof, may be used for deriving at least one item of information on a longitudinal coordinate z of the object 112 and/or the beacon device 114, from which the light beam 116 propagates towards the detector 110. The evaluation device 133 may have at least one divider 134 for forming the combined signal Q, and, as an example, at least one position evaluation device 136, for deriving the at least one longitudinal coordinate z from the combined signal Q. It shall be noted that the evaluation device 133 may fully or partially be embodied in hardware and/or software. Thus, as an example, one or more of components 134, 136 may be embodied by appropriate software components.

As shown in FIG. 1, the detector 110 may comprise a small baseline. In the embodiment of FIG. 1, the baseline may be a distance between the illumination source 115 and the transfer device 128. Specifically, the baseline may be zero and/or may be defined by dimensions of the illumination source 115, such as dimensions of a housing, and the dimensions of the transfer device 128, such as a diameter.

In FIGS. 2A and 2B, a modification of the embodiment of FIG. 1 are shown, which forms an alternative detector 110. The alternative embodiment of the detector 110 widely corresponds to the embodiment shown in FIG. 1. In FIG. 2A, the angle dependent optical element 130 may comprise at least one optical fiber 138. The optical fiber 138 may be adapted to transmit at least parts of incident light beam 116 which are not absorbed and/or reflected, between two ends of the optical fiber 138. The optical fiber 138 may have a length and may be adapted to permit transmission over a distance. The optical fiber 138 may comprise at least one fiber core which is surrounded by at least one fiber cladding having a lower index of refraction as the fiber core. Below the angle of acceptance, the optical fiber 138 may be adapted to guide the incoming light beam by total internal reflection.

The optical fiber 138 may be designed such that the degree of transmission may be highest for incoming light rays parallel, i.e. at an angle of 0°, to the optical fiber, neglecting reflection effects. The optical fiber 138 may be designed such that for higher angles, for example angles from 1° to 10°, the degree of transmission may decrease smoothly to around 80% of the degree of transmission for parallel light rays and may remain at this level constantly up to an acceptance angle of the optical fiber 138. The optical fiber 138 may be designed such that above the acceptance angle total reflection within the optical fiber 138 is not possible such that the light rays are reflected out of the optical fiber 138. The optical fiber 138 may be designed that at the acceptance angle, the degree of transmission may steeply fall to zero. Light rays having a large angle of incidence may be cut-off.

As shown in FIG. 2A, the illumination source 115 may be adapted to illuminate the object 112 through the angle dependent optical element 130. The optical fiber 138 may comprise at least one illumination fiber 140 adapted to transmit the light beam 142 generated by the illumination source 115 such that it illuminates the object 112. The illumination source 115 may be adapted to couple the at least one light beam 142 generated by the illumination source 115 into the illumination fiber 140. The light beam 142 may leave the optical illumination fiber 140 at an exit face of the optical illumination fiber 140.

The optical fiber 138 may comprise at least two or more fibers. The optical fiber 138 may be at least one multifurcated optical fiber, in particular at least one bifurcated optical fiber. In the embodiment of FIG. 2A, and as shown in the cut through in FIG. 3, the optical fiber 138 may comprise four fibers. In particular the optical fiber may comprise the illumination fiber 138 and at least two fibers each for generating at least one light beam 131, denoted as first fiber 144 and second fiber 146. As shown in FIG. 3, the first fiber 144 and the second fiber 146 may be arranged close to each other at an entrance end 148 of the optical fiber 138 and may split into legs separated by a distance at an exit end 150 of the optical fiber 138. The first fiber 144 and second fiber 146 may be designed as fibers having identical properties or may be fibers of different type. The first fiber 144 may be adapted to generate at least one first light beam 152 and the second fiber 146 may be adapted to generate at least one second light beam 154. The optical fiber 138 may be arranged such that the incident light beam 116 may impinge at a first angle of incidence into the first fiber 144 and at a second angle of incidence, different from the first angle, into the second fiber 146, such that the degree of transmission is different for the first light beam 152 and the second light beam 154. The incident light beam 116 may impinge at an entrance face on the optical fiber 138. One of the optical sensors 113 may be arranged at an exit end of the first fiber 144 and the other optical sensor 113 may be arranged at an exit end of the second fiber 146. The optical fiber may comprise more than three fibers, for example four fibers as depicted in FIG. 3, wherein the fourth fiber can be a further first fiber 144 or a further second fiber 146 such that this fiber is denoted in FIG. 3 generally with reference numbers 130, 138.

As shown in FIG. 2A, the detector 110 may comprise a small baseline. In the embodiment of FIG. 2A, the baseline may be a distance between an exit face of the optical illumination fiber 140 to the entrance face of the optical fiber 138. Specifically, the baseline may be zero.

In FIG. 2B a similar embodiment as in FIG. 2A is shown. FIG. 2B visualizes the impact of the transfer device 128 on the light beam 116 propagating from the object 112 to the detector 110. As in FIG. 2A, the object 112 is depicted in different object distances, a first object distance 206 and a second object distance 208. The light beam 116 generated at the first object distance 206 may propagate under a different angle to the transfer device 128 than the light beam 116 generated at the second object distance 208. In particular, the light beam 116 generated at the first object distance 206 on the optical axis 129, may propagate under a different angle to the edge of the transfer device 128, than the light beam 116 generated at the second object distance 208 on the optical axis 129. The transfer device 128 may be adapted to influence, for example to divert, the light beam 116 propagating from the object 112 to the detector 110. In particular, the transfer device 128 may be adapted to adjust the direction of propagation of the light beam 116, in particular dependent on an angle of incidence under which the light beam 116 impinges on the transfer device 128. The transfer device 128 may be adapted to adjust and/or to generate an angle of propagation with respect to the optical axis 129. The angle of propagation may be an angle between the optical axis 129 and the direction of propagation of the light beam 116 propagating from the object 112 to the detector 110. Without using a transfer device the angle of propagation of the light beam may depend primarily on properties of the object, such as surface properties and/or material properties and/or the orientation of the surface and or the shape of the surface, from which the light beam was generated. Therefore, without using a transfer device, the distance dependence of the combined signal that depends on the angle of propagation may be mixed or even suppressed by the surface dependence of the combined signal. The transfer device 128 may be adapted to adjust and/or to generate the angle of propagation such that it is independent from surface properties of the object 112. In particular, the transfer device may enhance the dependency on the angle of propagation in such a way, that two differing angles of propagation of light beams impinging on the angle dependent optical element differ more in the case the light beams have passed the transfer device before impinging on the angle dependent optical element, than in the case the light beams have not passed a transfer device before impinging on the angle dependent optical element. The enhancement of the angle dependency may be as such, that effects of surface properties may be less pronounced or even suppressed by the strong distance dependent angle dependency. The transfer device 128 may be adapted to strengthen and/or to amplify angle dependency of the direction of propagation of the light beam 116.

Figure 2:
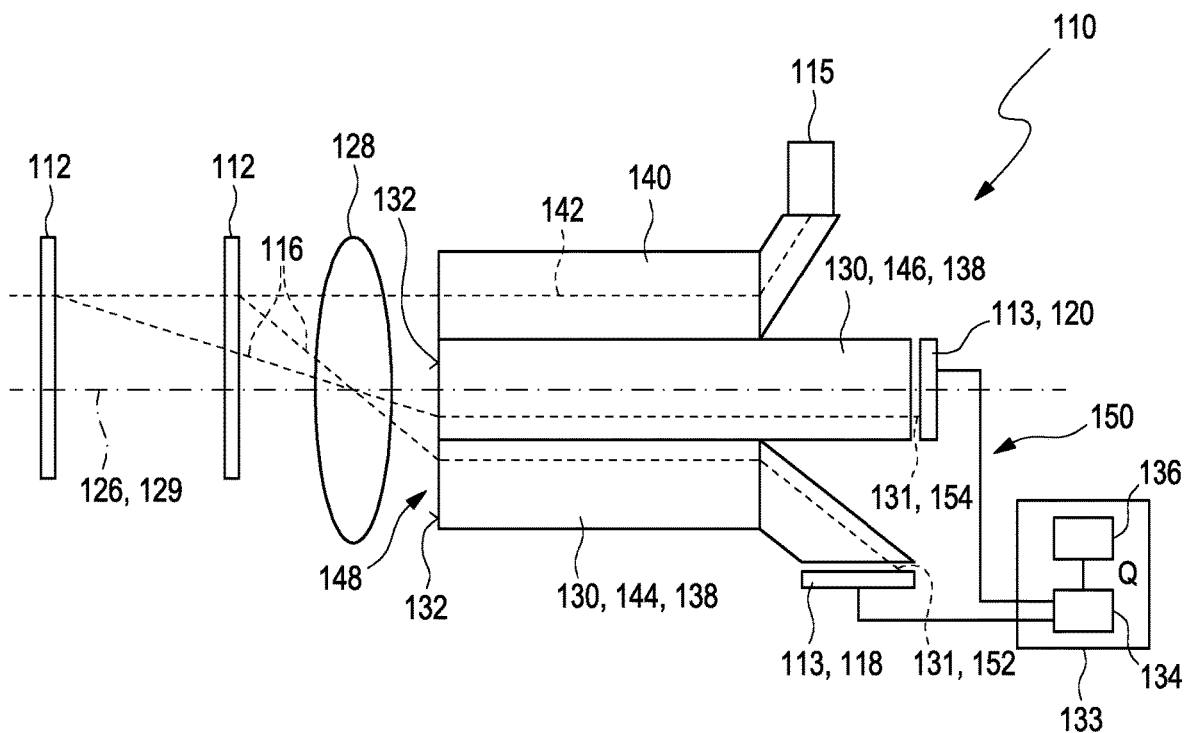
FIGS. 2A and 2B show embodiments with a multifurcated optical fiber.
Figure 2:
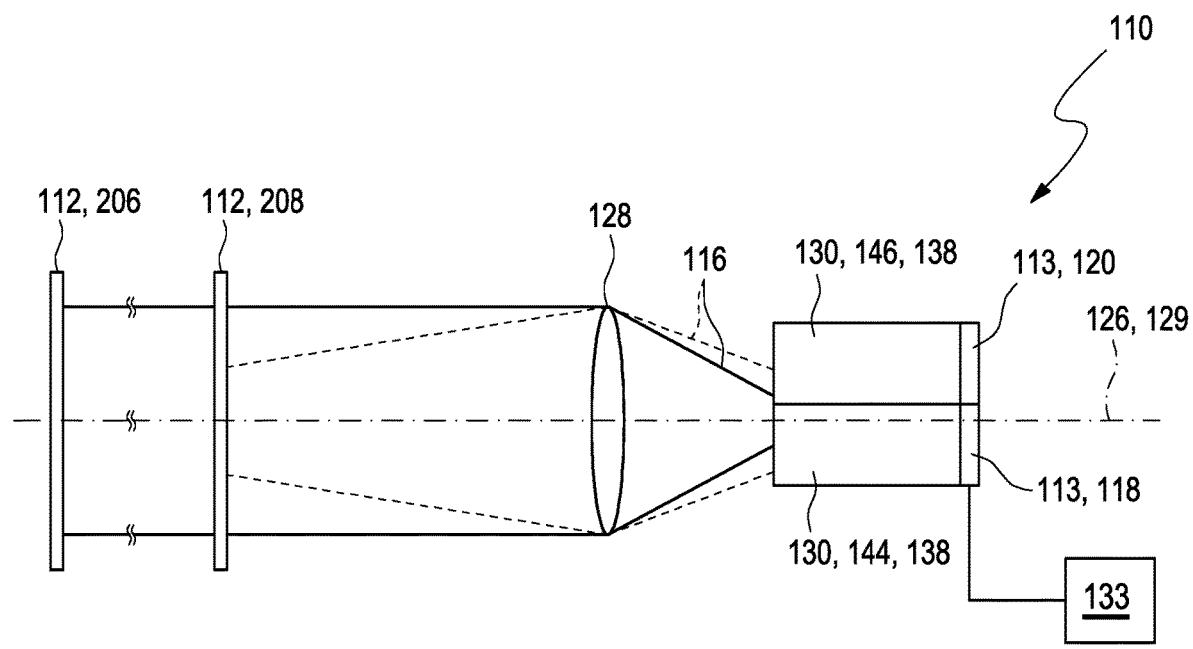
Figure 3:
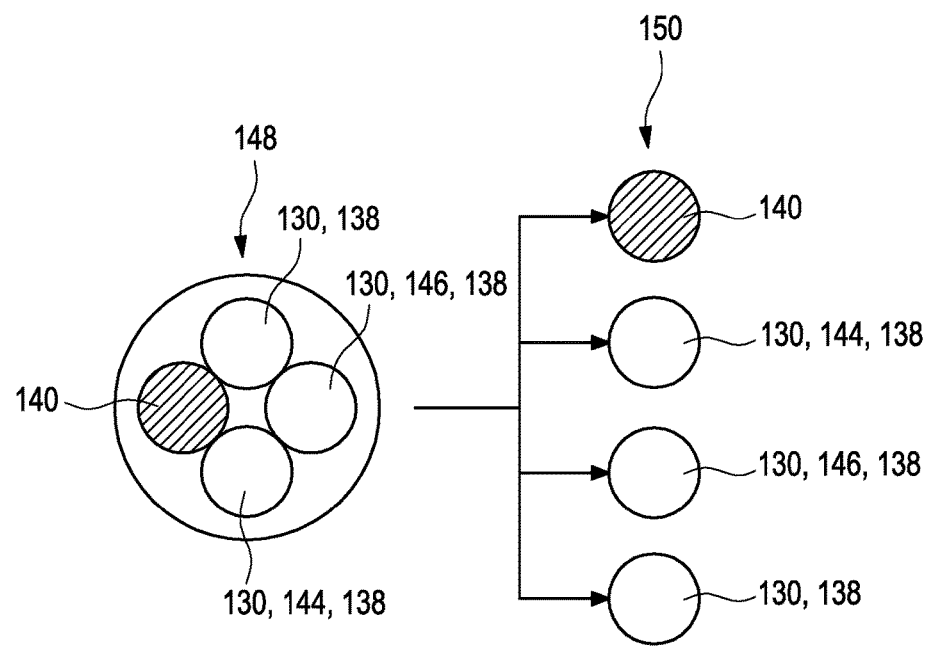
FIG. 3 shows a cut through the optical fiber of FIG. 2A.

It shall further be noted that the embodiments shown in FIGS. 1 and 2 simply provide embodiments for determining the longitudinal coordinate z of the object 112. It is also feasible, however, to modify the setups of FIGS. 1 and 2 to provide additional information on a transversal coordinate of the object 112 and/or of parts thereof. As an example, e.g. in between the transfer device 128 and the optical sensors 118, 120, one or more parts of the light beam 116 may be branched off, and may be guided to a position-sensitive device such as one or more CCD and/or CMOS pixelated sensors and/or quadrant detectors and/or other position sensitive devices, which, from a transversal position of a light spot generated thereon, may derive a transversal coordinate of the object 112 and/or of parts thereof. The transversal coordinate may be used to verify and/or enhance the quality of the distance information. For further details, as an example, reference may be made to one or more of the above-mentioned prior art documents which provide for potential solutions of transversal sensors.

Figure 4:
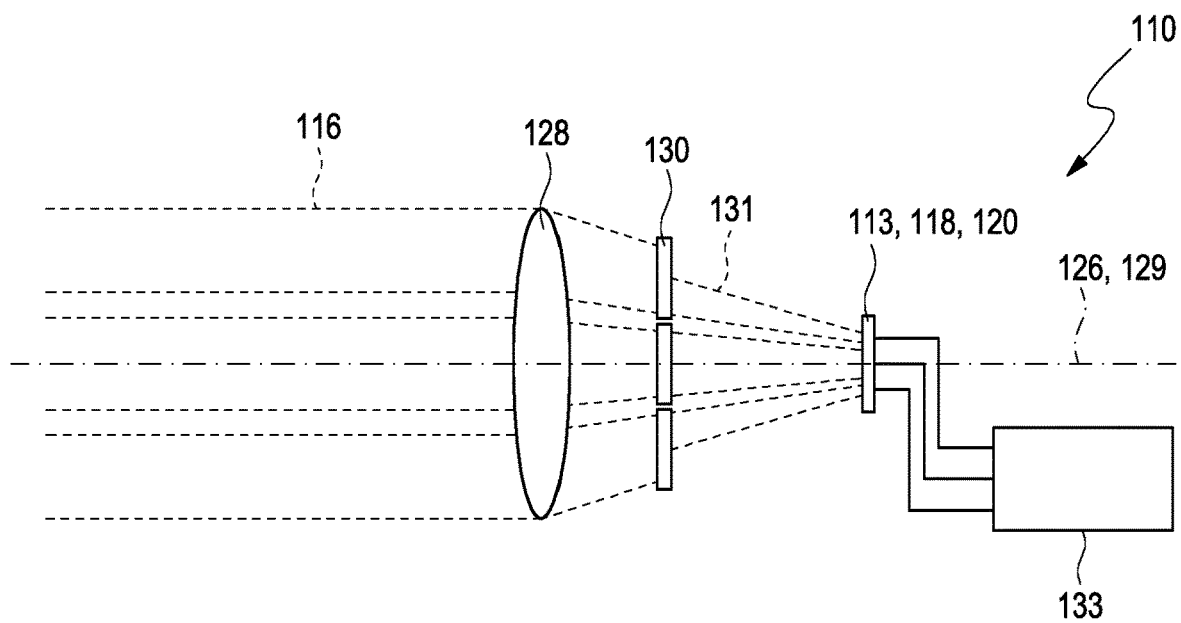
FIG. 4 visualizes angle dependent transmission of an angle dependent optical element.

FIG. 4 visualizes angle dependent transmission of an angle dependent optical element 130. The angle dependent optical element 130 may be designed such that the degree of transmission depends on an angle of incidence at which the incident light beam propagating from the object towards the detector 110 impinges on the angle dependent optical element 130. The angle dependent optical element 130 may be designed to weaken rays impinging with larger angles compared to rays impinging with a smaller angle. In particular, at the cutoff angle the degree of transmission may steeply fall to zero and the light rays having a large angle of incidence may be cut-off. As shown in FIG. 4 regions of the incident light beam 116 are cut-off by the angle dependent optical element 130 in the generated light beam 131.

Figure 5:
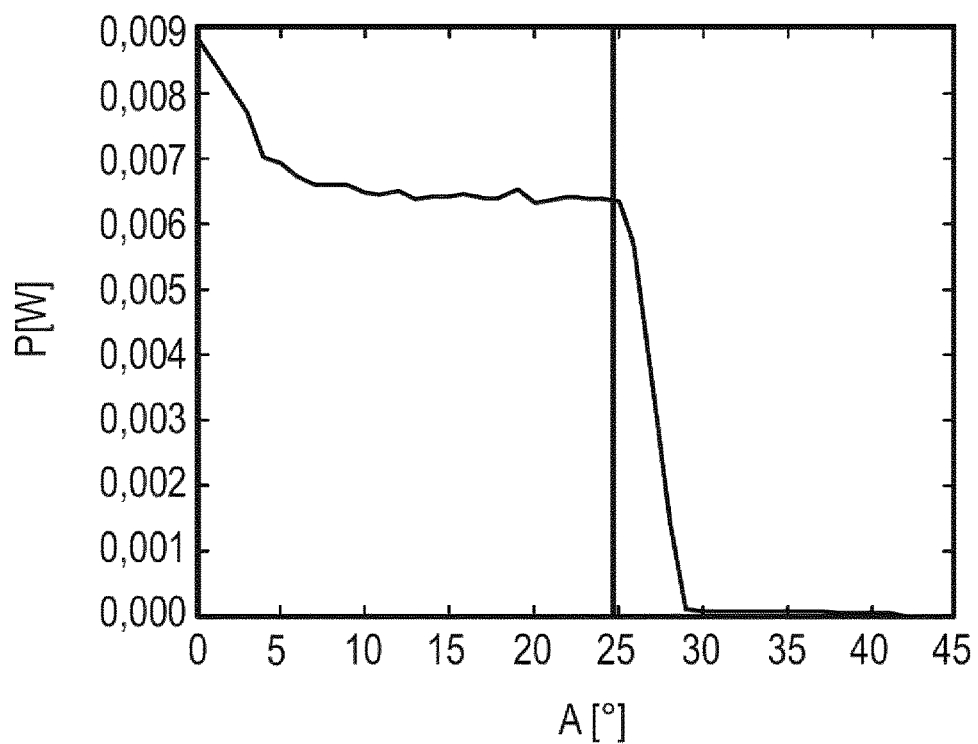
FIG. 5 shows angle dependent transmission power of the optical fiber at constant irradiated power.

FIG. 5 shows a dependency of the transmission power P in W of the optical fiber at constant irradiated power as a function of angle of incidence A in degree. The acceptance angle is shown as vertical line. The degree of transmission may be highest for incoming light rays parallel, i.e. at an angle of 0°, to the optical fiber, neglecting reflection effects. For higher angles, for example angles from 1° to 10°, the degree of transmission may decrease smoothly to around 80% of the degree of transmission for parallel light rays and may remain at this level constantly up to an acceptance angle of the optical fiber 138. At the acceptance angle, the degree of transmission may steeply fall to zero. Light rays having a large angle of incidence may be cutoff.

Figure 6:
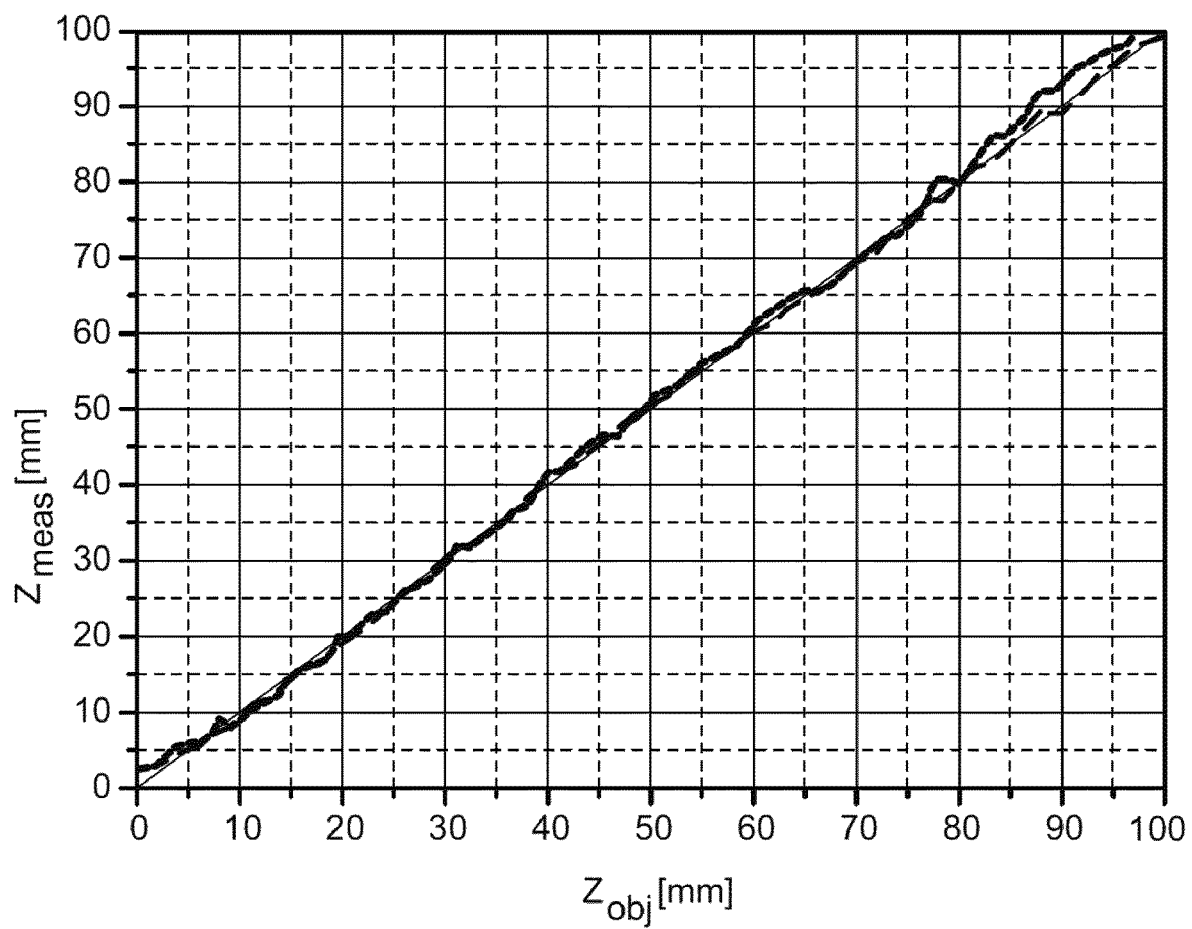
FIGS. 6A and B show experimental results of distance measurement.
Figure 6:
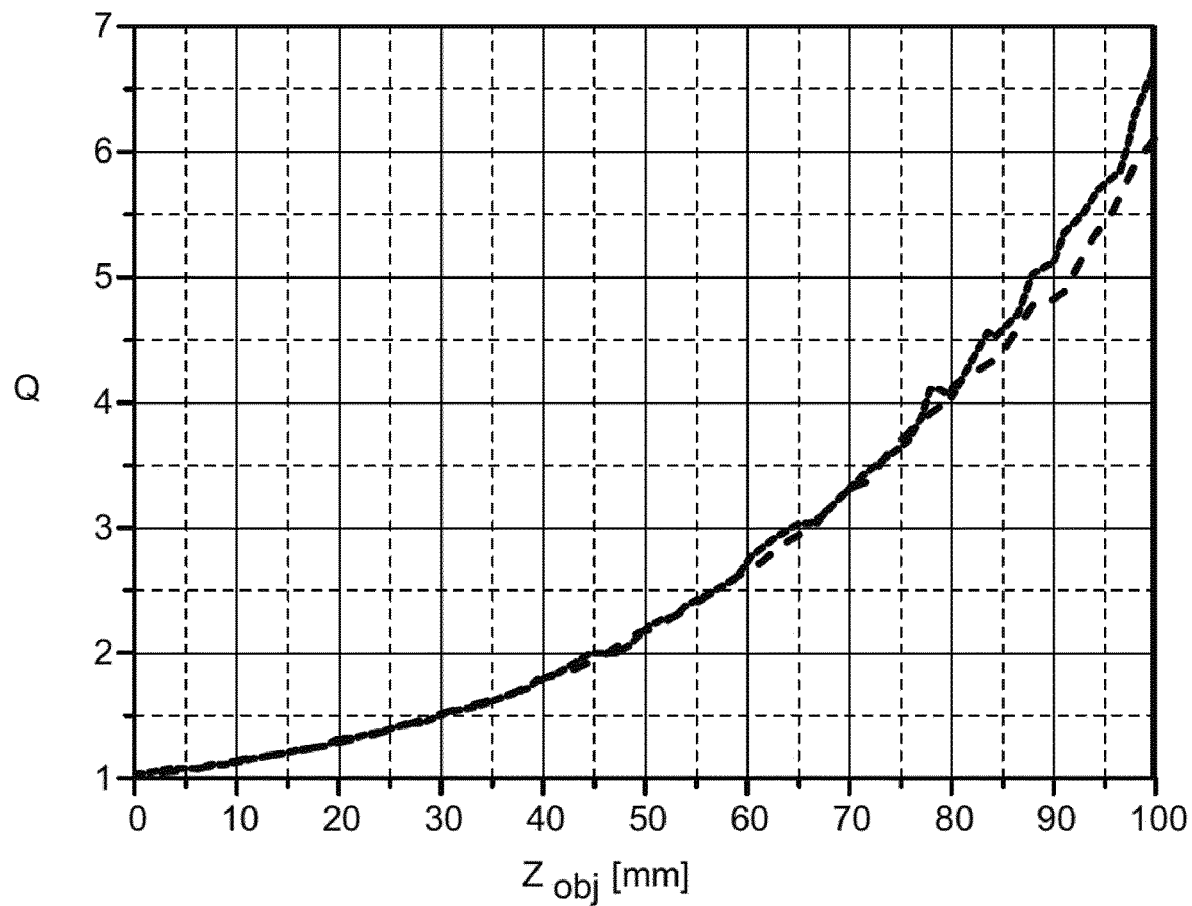

FIGS. 6A and 6B show experimental results of distance measurements. In The determined distance $z_{meas}$ in mm is shown as a function of the object distance $z_{obj}$ in mm. As illumination source 115 a Laser was used having a wavelength of 980 nm and average power of 2.4 mW available under Flexpoint® Laser components module. Two Si-photodetectors were used as optical sensors 113. As optical fiber 138 and transfer device 128 available under Thorlabs Fixed Focus Collimation package F220SMA-980 was used. In FIG. 6A, the solid line indicates where $z_{meas}=z_{obj}$. For the measurement the object distance was varied and two different types of object were used, in particular a black paper object, curve 156 (dotted line), and a white paper object, curve 158 (dashed line). The determined object distance is in agreement with the real distance within 2% for small and medium distances and within 10% for large distances. In FIG. 6B, the combined signal Q determined by dividing the signals of the two-photodetectors as a function of the distance $z_{obj}$ in mm is shown for the black paper object (dotted line) and the white paper object (dashed line). The determined quotient for both object types is in agreement within 2% for small and medium distances and within 10% for large distances.

Figure 7:
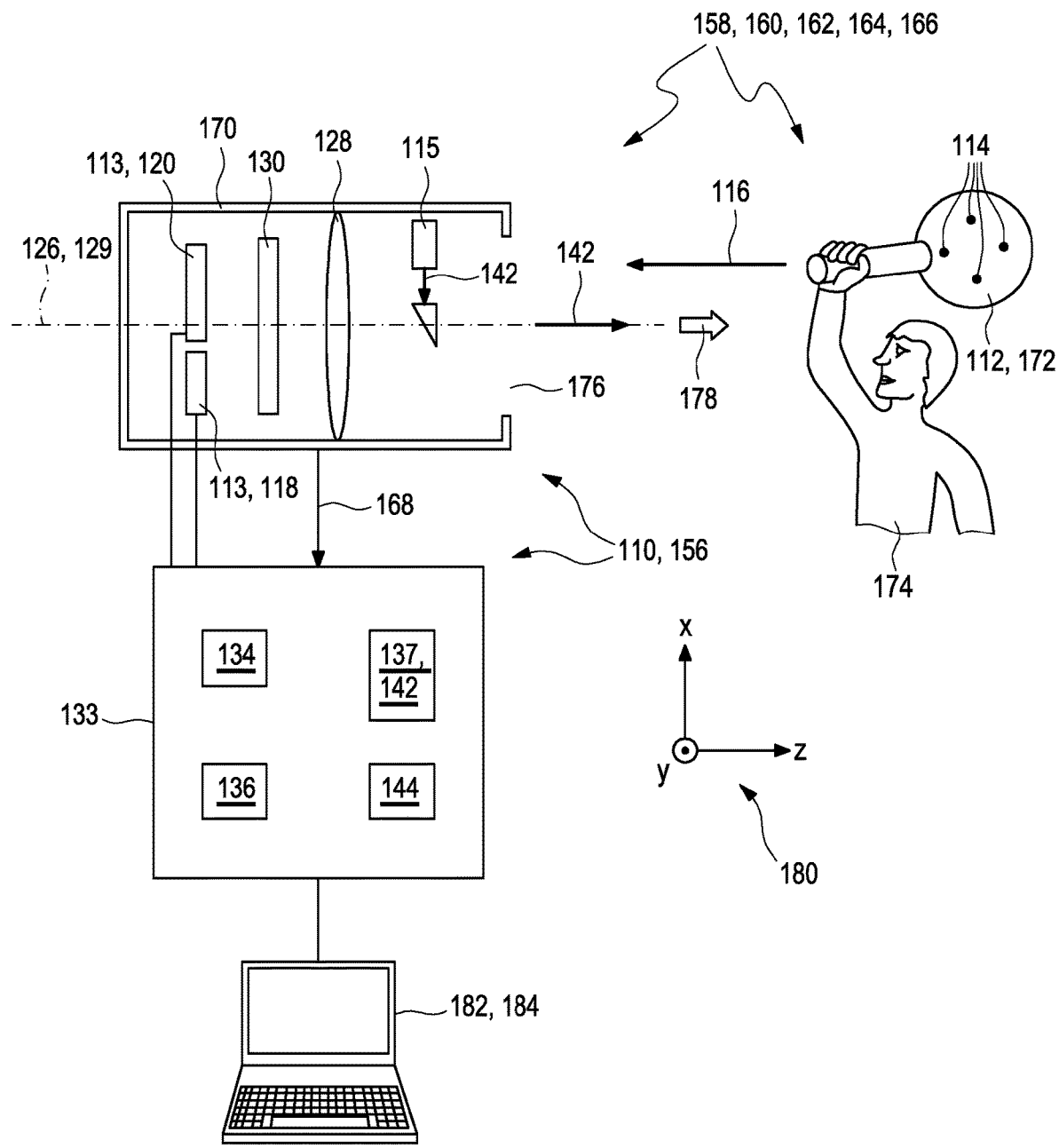
FIG. 7 shows an exemplary embodiment of a detector according to the present invention, a detector system, a human-machine interface, an entertainment device, a tracking system, a scanning system and a camera.

FIG. 7 shows, in a highly schematic illustration, an exemplary embodiment of a detector 110, for example according to the embodiments shown in FIG. 1 or 2. The detector 110 specifically may be embodied as a camera 156 and/or may be part of a camera 156. The camera 156 may be made for imaging, specifically for 3D imaging, and may be made for acquiring standstill images and/or image sequences such as digital video clips. Other embodiments are feasible.

FIG. 7 further shows an embodiment of a detector system 158, which, besides the at least one detector 110, comprises one or more beacon devices 114, which, in this example, may be attached and/or integrated into an object 112, the position of which shall be detected by using the detector 110. FIG. 7 further shows an exemplary embodiment of a human-machine interface 160, which comprises the at least one detector system 158 and, further, an entertainment device 162, which comprises the human-machine interface 160. The figure further shows an embodiment of a tracking system 164 for tracking a position of the object 112, which comprises the detector system 158. The components of the devices and systems shall be explained in further detail below.

FIG. 7 further shows an exemplary embodiment of a scanning system 166 for scanning a scenery comprising the object 112, such as for scanning the object 112 and/or for determining at least one position of the at least one object 112. The scanning system 166 comprises the at least one detector 110, and, further, optionally, the at least one illumination source 115 as well as, optionally, at least one further illumination source 115. The illumination source 115, generally, is configured to emit at least one illumination light beam 142, such as for illumination of at least one dot, e.g. a dot located on one or more of the positions of the beacon devices 114 and/or on a surface of the object 112. The scanning system 166 may be designed to generate a profile of the scenery including the object 112 and/or a profile of the object 112, and/or may be designed to generate at least one item of information about the distance between the at least one dot and the scanning system 166, specifically the detector 110, by using the at least one detector 110.

As outlined above, an exemplary embodiment of the detector 110 which may be used in the setup of FIG. 7 is shown in FIGS. 1 and 2. Thus, the detector 110, besides the optical sensors 118, 120, comprises at least one evaluation device 133, having e.g. the at least one divider 134 and/or the at least one position evaluation device 136, as symbolically depicted in FIG. 7. The components of the evaluation device 133 may fully or partially be integrated into a distinct device and/or may fully or partially be integrated into other components of the detector 110. Besides the possibility of fully or partially combining two or more components, one or more of the optical sensors 118, 120 and one or more of the components of the evaluation device 133 may be interconnected by one or more connectors 168 and/or by one or more interfaces, as symbolically depicted in FIG. 7. Further, the one or more connectors 168 may comprise one or more drivers and/or one or more devices for modifying or pre-processing sensor signals. Further, instead of using the at least one optional connector 168, the evaluation device 133 may fully or partially be integrated into one or both of the optical sensors 118, 120 and/or into a housing 170 of the detector 110. Additionally or alternatively, the evaluation device 133 may fully or partially be designed as a separate device.

In this exemplary embodiment, the object 112, the position of which may be detected, may be designed as an article of sports equipment and/or may form a control element or a control device 172, the position of which may be manipulated by a user 174. As an example, the object 112 may be or may comprise a bat, a racket, a club or any other article of sports equipment and/or fake sports equipment. Other types of objects 112 are possible. Further, the user 174 himself or herself may be considered as the object 112, the position of which shall be detected.

As outlined above, the detector 110 comprises at least the optical sensors 118, 120. The optical sensors 118, 120 may be located inside the housing 170 of the detector 110. Further, the at least one transfer device 128 is comprised, such as one or more optical systems, preferably comprising one or more lenses.

An opening 176 inside the housing 170, which, preferably, is located concentrically with regard to the optical axis 126 of the detector 110, preferably defines a direction of view 178 of the detector 110. A coordinate system 180 may be defined, in which a direction parallel or anti-parallel to the optical axis 126 may be defined as a longitudinal direction, whereas directions perpendicular to the optical axis 126 may be defined as transversal directions. In the coordinate system 180, symbolically depicted in FIG. 7, a longitudinal direction is denoted by z, and transversal directions are denoted by x and y, respectively. Other types of coordinate systems 180 are feasible, such as non-Cartesian coordinate systems.

The detector 110 may comprise the optical sensors 118, 120 as well as, optionally, further optical sensors. The optical sensors 118, 120 may be located in one and the same beam path, for example one behind the other, such that the first optical sensor 118 covers a portion of the second optical sensor 120. Alternatively, however, a branched beam path may be possible, for example using a multifurcated optical fiber. The branched beam path may comprise additional optical sensors in one or more additional beam paths, such as by branching off a beam path for at least one transversal detector or transversal sensor for determining transversal coordinates of the object 112 and/or of parts thereof. Alternatively, however, the optical sensors 118, 120 may be located at the same longitudinal coordinate.

One or more light beams 116 are propagating from the object 112 and/or from one or more of the beacon devices 114, towards the detector 110. The detector 110 is configured for determining a position of the at least one object 112. For this purpose, as explained above in the context of FIGS. 1 to 6, the evaluation device 133 is configured to evaluate sensor signals provided by the optical sensors 118, 120. The detector 110 is adapted to determine a position of the object 112, and the optical sensors 118, 120 are adapted to detect the light beam 131. In case no illumination source 115 is used, the beacon devices 114 and/or at least one of these beacon devices 114 may be or may comprise active beacon devices with an integrated illumination source such as a light-emitting diode. In case the illumination source 115 is used, the beacon devices 114 do not necessarily have to be active beacon devices. Contrarily, a reflective surface of the object 112 may be used, such as integrated reflected beacon devices 114 having at least one reflective surface such as a mirror, retro reflector, reflective film, or the like. The light beam 116, directly and/or after being modified by the transfer device 128, such as being focused by one or more lenses, impinges on the angle dependent element 130 which generates the at least one light beam which illuminates the light-sensitive areas 122, 124 of the optical sensors 118, 120. For details of the evaluation, reference may be made to FIGS. 1 to 6 above.

As outlined above, the determination of the position of the object 112 and/or a part thereof by using the detector 110 may be used for providing a human-machine interface 160, in order to provide at least one item of information to a machine 182. In the embodiments schematically depicted in FIG. 7, the machine 182 may be a computer and/or may comprise a computer. Other embodiments are feasible. The evaluation device 133 may even be fully or partially integrated into the machine 182, such as into the computer.

As outlined above, FIG. 7 also depicts an example of a tracking system 164, configured for tracking the position of the at least one object 112 and/or of parts thereof. The tracking system 164 comprises the detector 110 and at least one track controller 184. The track controller 184 may be adapted to track a series of positions of the object 112 at specific points in time. The track controller 184 may be an independent device and/or may be fully or partially integrated into the machine 182, specifically the computer, as indicated in FIG. 7 and/or into the evaluation device 133.

Similarly, as outlined above, the human-machine interface 160 may form part of an entertainment device 162. The machine 182, specifically the computer, may also form part of the entertainment device 162. Thus, by means of the user 174 functioning as the object 112 and/or by means of the user 174 handling a control device 172 functioning as the object 112, the user 174 may input at least one item of information, such as at least one control command, into the computer, thereby varying the entertainment functions, such as controlling the course of a computer game.

Figure 8:
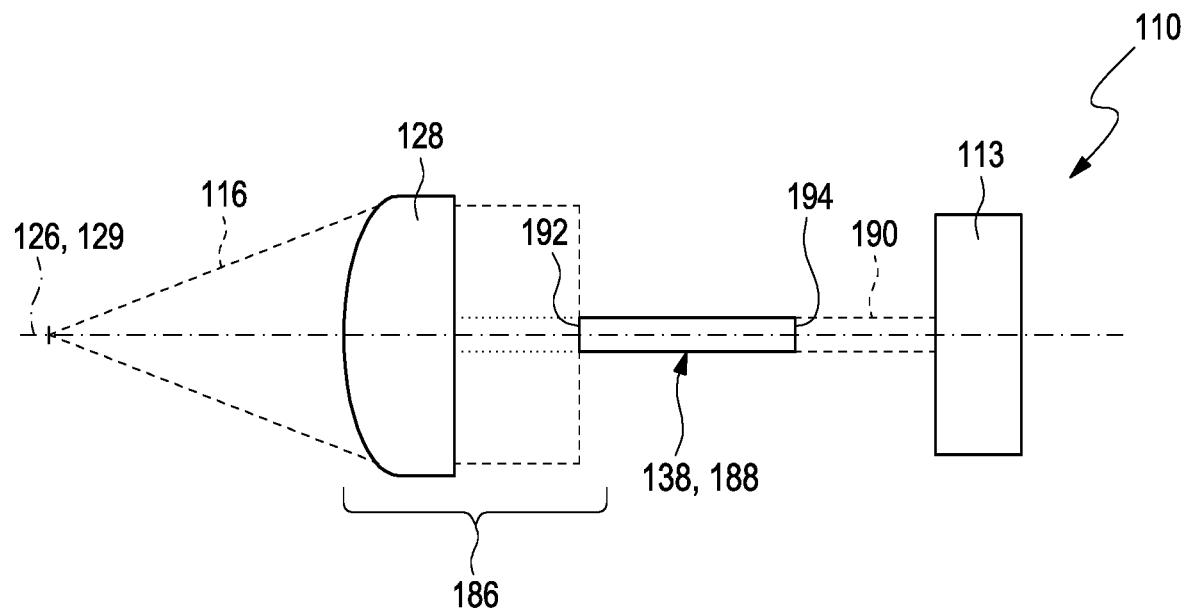
FIGS. 8A and B show a further exemplary embodiment of the detector.
Figure 8:
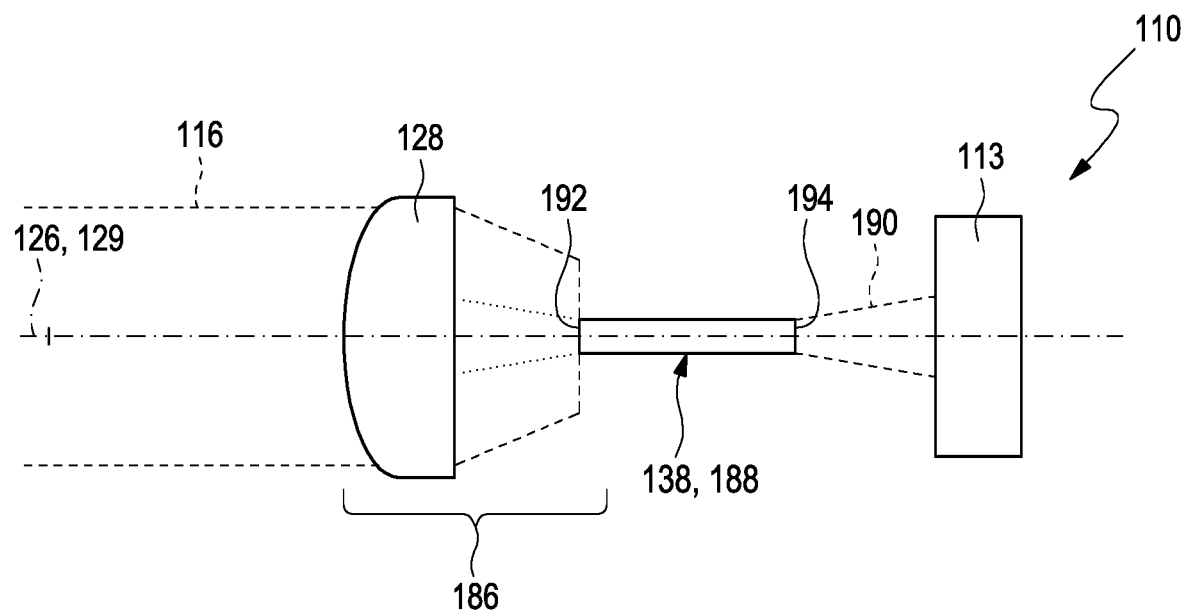

FIGS. 8A and B show a further exemplary embodiment, in a highly schematic illustration, of the detector 110. In this embodiment the detector 110 may comprise at least one measuring head 186 comprising one optical measurement fiber 188 and the at least one transfer device 128. Furthermore, the detector 110 may comprise the at least two optical sensors 113. Each optical sensor 113 may be designed to generate the at least one sensor signal in response to illumination of its respective light-sensitive area 121 by at least one light beam 190 originating from the optical measurement fiber 188. The at least one evaluation device 133 may be configured for determining the at least one longitudinal coordinate z of the object 112 by evaluating the combined signal Q from the sensor signals. The measuring head 186 may comprise exactly one optical measurement fiber 188. In order to allow using one optical measurement fiber 188 only, the combined signal Q is determined from the at least two sensor signal from the at least two optical sensors 113 arranged at an end of the optical measurement fiber. The optical measurement fiber 188 may comprise two ends. The optical measurement fiber 188 may comprise at least one receiving end 192 adapted to receive at least one light beam originating from the object 112. The optical measurement fiber 188 may comprise at least one exit-end 194 from which the light beam 116 originating from the object 112 leaves the optical measurement fiber 188. The optical sensors 113 may be arranged at the exit-end 194 of the optical measurement fiber 188. Without wishing to be bound by this theory, it is believed that the angle of incidence of a light beam received by the optical measurement fiber 188 is preserved such that the angle of incidence is equal to the exit-angle, assuming that the angle of incidence is equal or smaller than the acceptance angle of the optical fiber. Thus, distance information encoded in the light beam 116 can be essentially preserved and can be evaluated using the combined signal Q. FIGS. 8A and 8B show angle preservation in two embodiments with different angle of incidence of the light beam 116 originating from the object.

In FIGS. 8A and 8B, the optical sensors 113 may comprise a CMOS sensor. The evaluation device 133 may be adapted to divide the sensor region of the CMOS sensor into at least two sub-regions. Specifically, the evaluation device may be adapted to divide the sensor region of the CMOS sensor into at least one left part and at least one right part and/or at least one upper part and at least one lower part. The evaluation device 133 may be configured for determining the at least one longitudinal coordinate z of the object 112 by evaluating the combined signal Q from the sensor signals of the at least two sub-regions. Using at least one CMOS sensor may allow movement of the illumination source 115 for illuminating the object 112. In particular independent movement of at least one optical illumination fiber 196 and the optical measurement fiber 188 may be possible.

The measuring head 186 may comprise the at least one transfer device 128 comprising at least one collimating lens. A numerical aperture of the transfer device 128 may be smaller than a numerical aperture of the optical measurement fiber 188.

The illumination source 115 and the optical sensors 113 may be separated by a baseline. The baseline may be less than 0.01 m, preferably less than 0.005 m, more preferably less than 0.0025 m. A dividing line of the partial diodes of the bi-cell or of the quadrant diode may be arranged essentially parallel or essentially orthogonal to the baseline.

Several measuring heads 186 may be used within one detector. As an example, more than one illumination source 115 may be used for illuminating the at least one object 112 through multiple optical illumination fibers 196. The multiple illumination sources 115 may be modulated at different modulation frequencies. Multiple optical measurement fibers 188 may be used to guide the light beam towards the optical sensors 113. In case multiple optical measurement fibers 188 are combined on at least one of the at least two optical sensors 113, the contributions of the multiple illumination sources 115 may be separated in a demodulation procedure that yields the contributions of the different modulation frequencies. In a further example, the multiple optical measurement fibers 188 may be combined on at least one CMOS sensor. The contributions of the multiple measurement fibers may then be separated using the location of the light spot on the CMOS. In case the location of the light spot on the CMOS may be used to distinguish the contribution of the multiple measurement fibers, a single illumination source 115 may be used to illuminate the at least one object 112 through the at least one optical illumination fiber 196.

Figure 9:
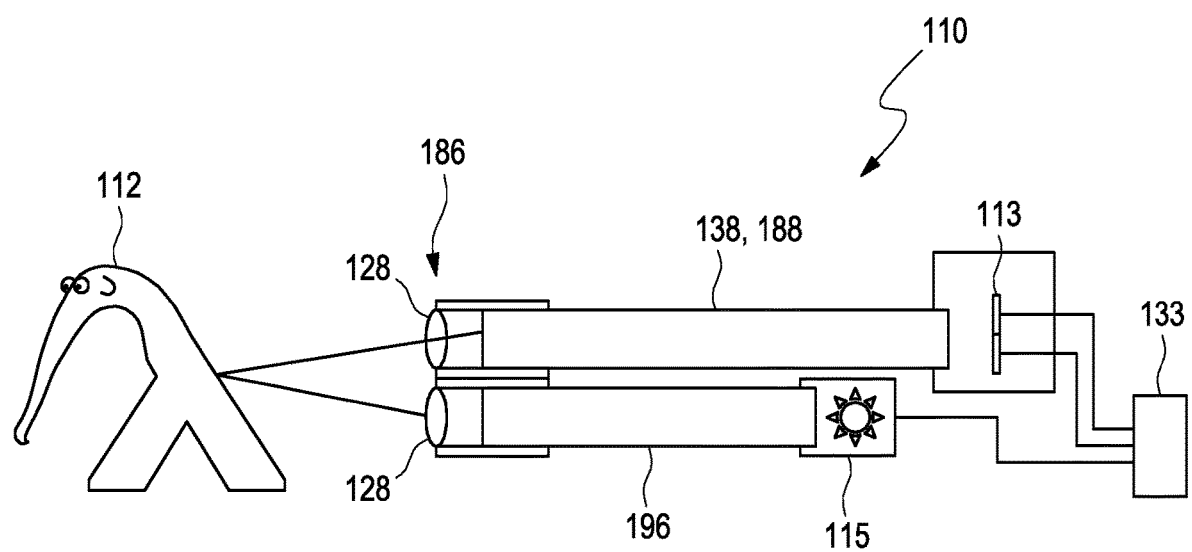
FIG. 9 shows a further exemplary embodiment of the detector.

FIG. 9 shows a further exemplary embodiment, in a highly schematic illustration, of the detector 110. The detector 110 in this embodiment may be designed as in the embodiment of the detector 110 shown in FIGS. 8A and 8B. In the embodiment of FIG. 9, the detector 110 may comprise at least one optical illumination fiber 196. The illumination source 115 may be adapted to illuminate the object 112 through the optical illumination fiber 196. The optical illumination fiber 196 may be or may comprise at least one light guiding element. The optical illumination fiber 196 may comprise at least one first end which is adapted to receive at least one illumination light beam, e.g. generated by the illumination source 115. Additionally or alternatively, the illumination source 115 may be guided through an optical fiber. The optical illumination fiber 196 may comprise at least one second end from where the illumination light beam leaves the optical illumination fiber 196 for illumination of the object. At least one lens, specifically at least one collimating lens, may be placed at the second end. In the embodiment shown in FIG. 9, the optical sensors 113 may be arranged as partial diodes of a bi-cell. The optical measurement fiber 188 and the optical illumination fiber 196 may be interconnected, in particular fixedly.

Figure 10:
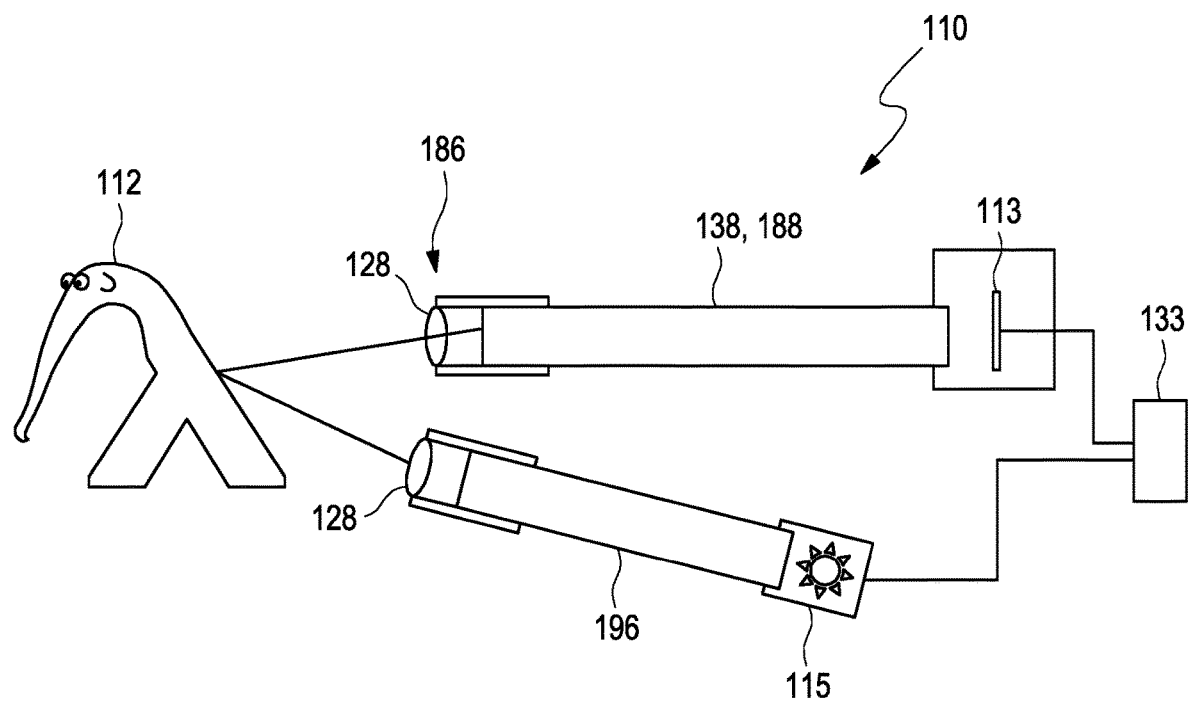
FIG. 10 shows a further exemplary embodiment of the detector.

Additionally or alternatively to an illumination using the optical illumination fiber 196, the object 112 may illuminated by a light beam generated from an arbitrary illumination source 115. In particular, the illumination of the object 112 may be performed independently from the optical fiber. FIG. 10 shows a further embodiment, in a highly schematic illustration, of the detector 110. With respect to description of the detector 110 reference is made to the description of FIG. 8A to 9. In this embodiment, the optical sensors 113 are embodied as a CMOS sensor. Using at least one CMOS sensor may allow movement of the illumination source 115 for illuminating the object 112. In particular independent movement of the at least one optical illumination fiber 196 and the optical measurement fiber 188 may be possible. The optical illumination fiber 196, and the optical sensors 113 may be separated by a baseline. The baseline may be less than 0.01 m, preferably less than 0.005 m, more preferably less than 0.0025 m.

Figure 11:
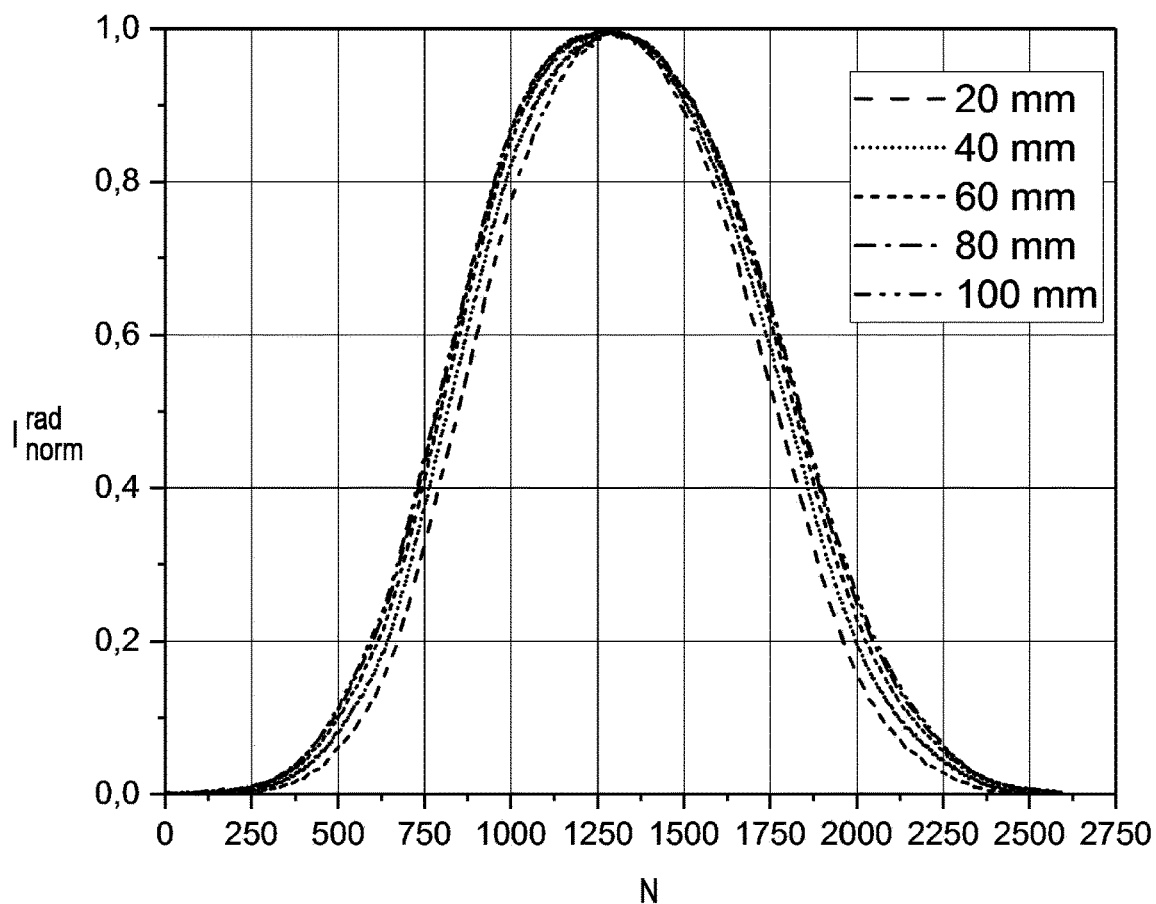
FIG. 11 shows normalized radial intensity profile of a light spot as a function of CMOS pixel number.
Figure 12:
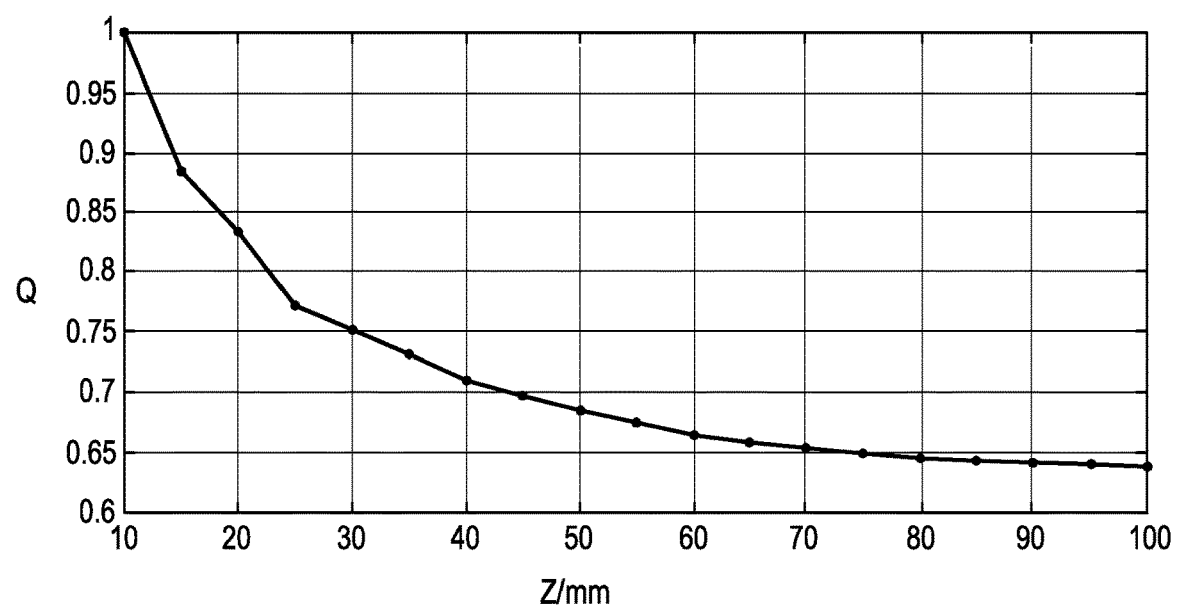
FIG. 12 shows the normalized combined sensor signal Q as a function of object distance z in mm.

FIGS. 11 and 12 show measurement results of a measurement setup using as a 625 nm-LED available from OSRAM, a CMOS-Chip available under Basler daA2500-14 µm, 2592 px×1944 px, an optical fiber available under DB01 from the SICK LL3 series, a lens available under C340TMD-A from Thorlabs having a numerical aperture of 0.64 and a focus length of 4.03 mm. In FIG. 11 normalized radial intensity profiles $I_{norm}^{rad}$ of light spots with different object distances from 10 to 100 mm as a function of the CMOS pixel number N are shown. In particular, the dashed line denotes an object distance of 20 mm, the dotted line an object distance of 40 mm, the densely dashed line an object distance of 60 mm, the dashed dotted line an object distance of 80 mm and the line with dash-dot-dot an object distance of 100 mm. The spot profiles show differences dependent on the object distance. As outlined above, the evaluation device 133 may be adapted to divide the sensor region of the CMOS sensor, for example into at least one left part and at least one right part and/or at least one upper part and at least one lower part and/or at least one inner and at least one outer part. The evaluation device 133 may be configured for determining the at least one longitudinal coordinate z of the object 112 by evaluating the combined signal Q from the sensor signals of the at least two sub-regions. FIG. 12 shows the normalized combined sensor signal Q determined from dividing sensor signals of the inner and outer parts of the CMOS sensor as a function of object distance z in mm. In FIG. 12 a distance dependency of the combined sensor signal is observed.

Figure 13:
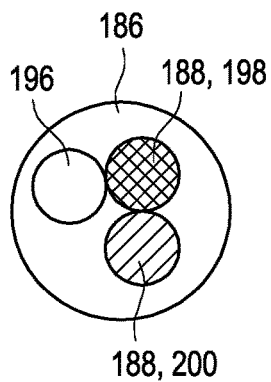
FIGS. 13A to MM show in top view embodiments of measuring heads.
Figure 13:
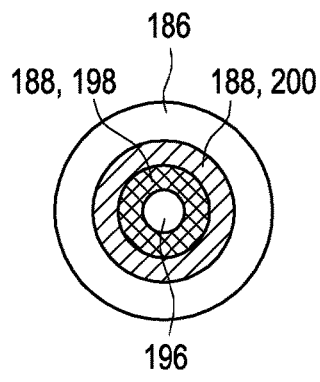
Figure 13:
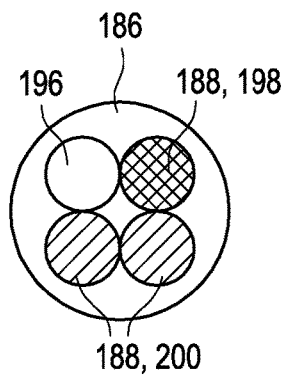
Figure 13:
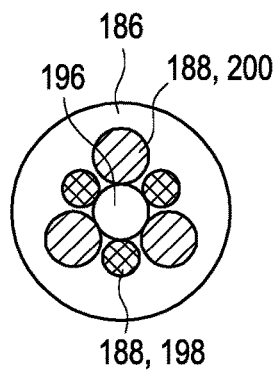
Figure 13:
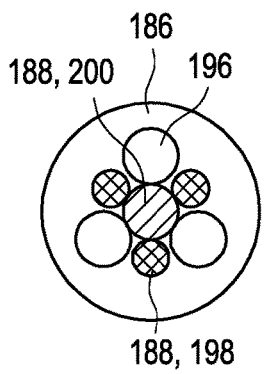
Figure 13:
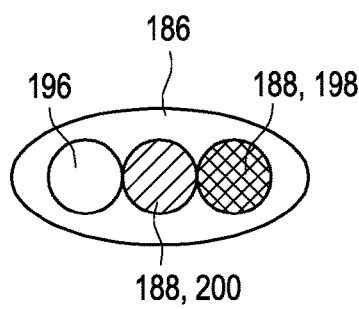
Figure 13:
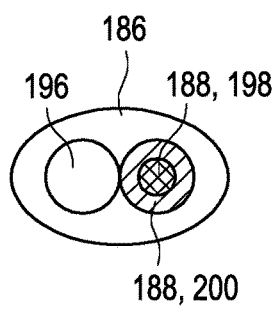
Figure 13:
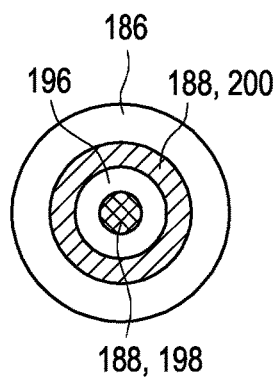
Figure 13:
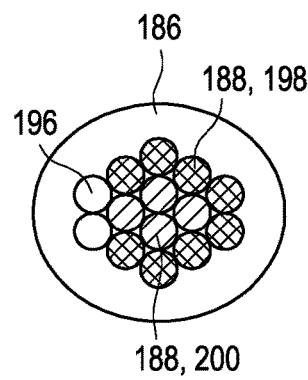
Figure 13:
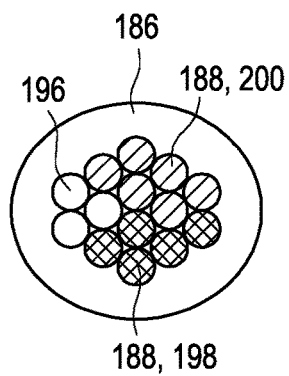
Figure 13:
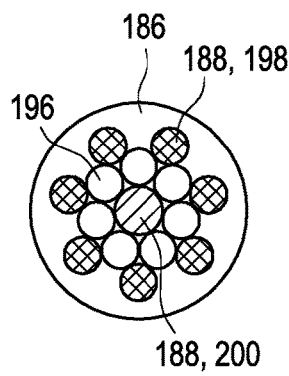
Figure 13:
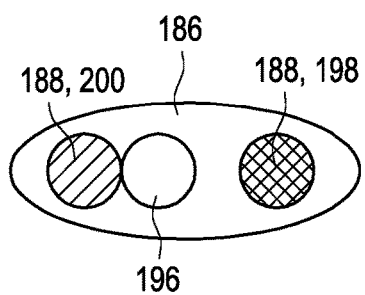
Figure 13:
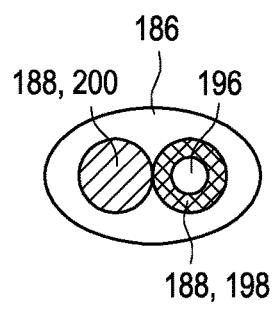
Figure 13:
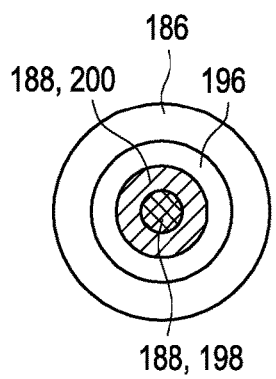
Figure 13:
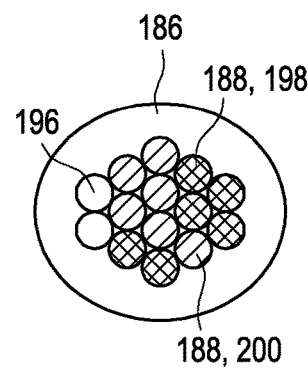
Figure 13:
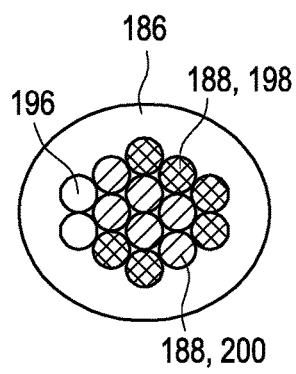
Figure 13:
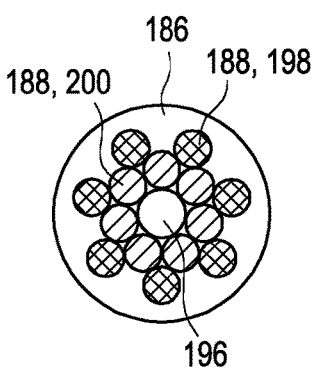
Figure 13:
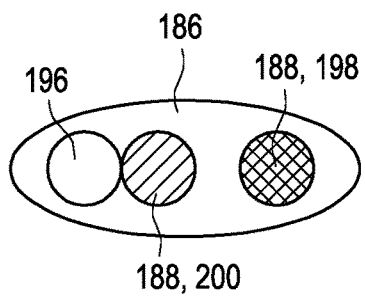
Figure 13:
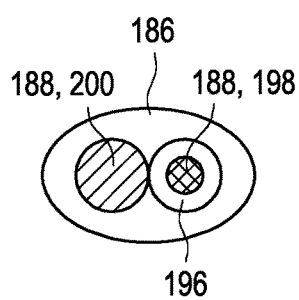
Figure 13:
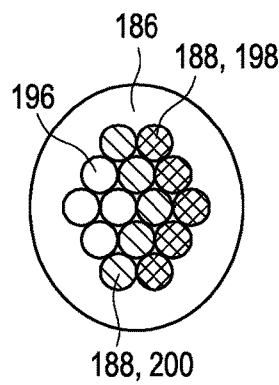
Figure 13:
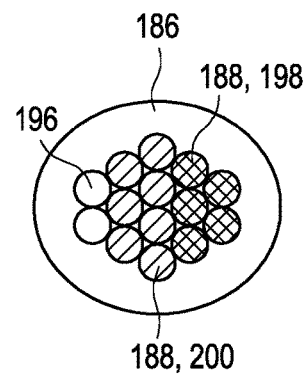
Figure 13:
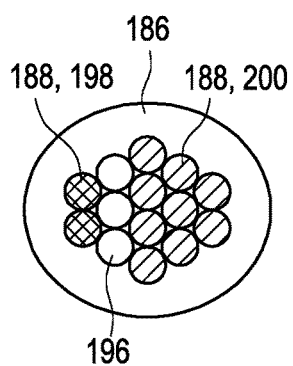
Figure 13:
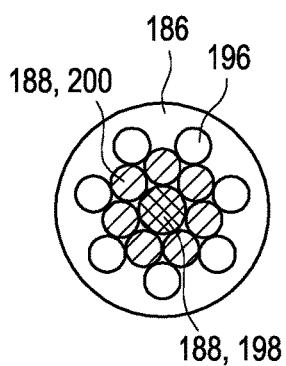
Figure 13:
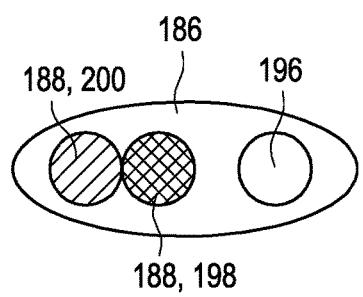
Figure 13:
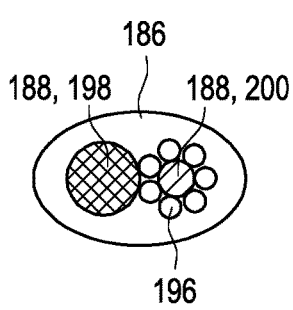
Figure 13:
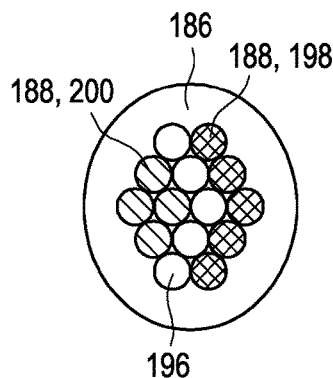
Figure 13:
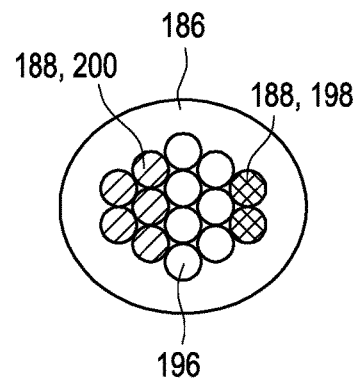
Figure 13:
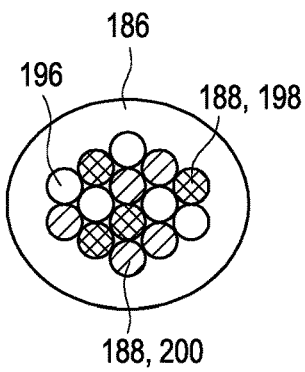
Figure 13:
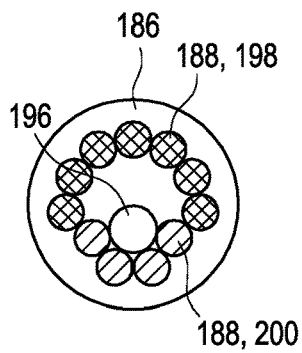
Figure 13:
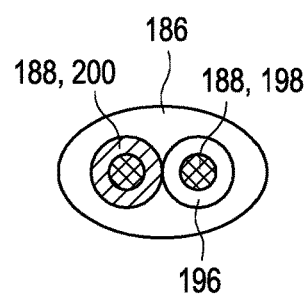
Figure 13:
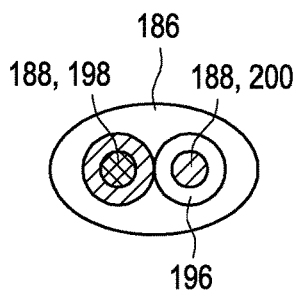
Figure 13:
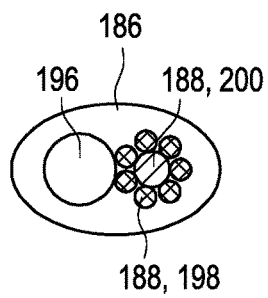
Figure 13:
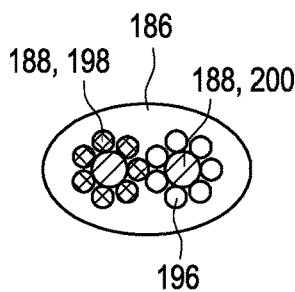
Figure 13:
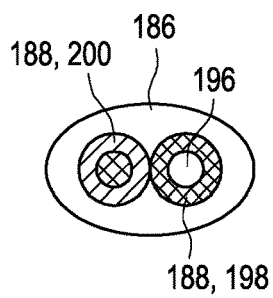
Figure 13:
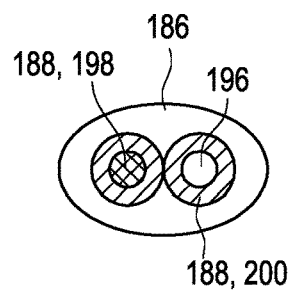
Figure 13:
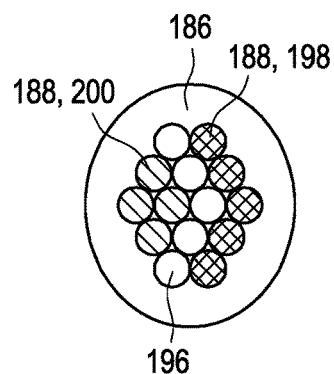
Figure 13:
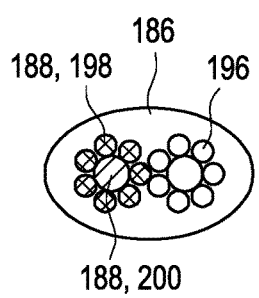
Figure 13:
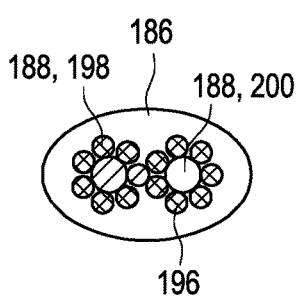
Figure 13:
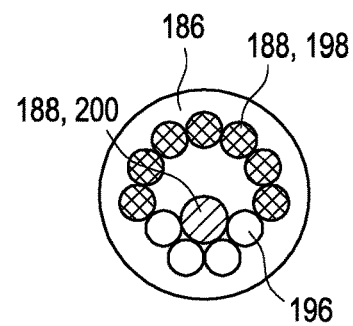

FIGS. 13A to MM show in top view embodiments of measuring heads 186. The measuring head 186 may comprise at least one housing, for example at least one metal housing and/or plastic housing. Each of the measuring heads 186 may comprise a plurality of fibers, specifically a plurality of the at least one optical illumination fiber 196 and/or the at least one optical measurement fiber 188. In particular, FIG. 13 A, B, F, G, H, L, R, M, N, R, S, X show embodiments of measuring heads 186 having one optical illumination fiber 196 and two optical measurement fibers 188, specifically a first optical measurement fiber 198 adapted to provide the light beam originating from the object 112 to a first optical sensor 113 and a second optical measurement fiber 200 adapted to provide the light beam originating from the object 112 to a second optical sensor 113. The measuring head 186 may comprise at least one radially arranged or radially symmetric design. For example, at least two elements selected from the group consisting of: the first optical measurement fiber 198; the second optical measurement fiber 200; or the optical illumination fiber 196 may be arranged concentric and having and/or sharing a common central axis. For example as shown in FIGS. 13 B, H and N, the first optical measurement fiber 198, the second optical measurement fiber 200 and the optical illumination fiber 196 may be arranged concentric and having and/or sharing a common central axis. Other embodiments of a radially arranged or radially symmetric design are possible. For example, as shown in FIG. 13 GG, KK and LL a plurality of at least one element selected from the group consisting of: the first optical measurement fiber 198; the second optical measurement fiber 200; or the optical illumination fiber 196 may be arranged radially around at least one other element selected from the group consisting of: the first optical measurement fiber 198; the second optical measurement fiber 200; or the optical illumination fiber 196. The radially arranged or radially symmetric design may allow enhancing robustness of measurement values, in particular at strong black-and-white contrast in a measured point of the object or for measurements of concave or convex surfaces. FIGS. 13 C, D, E, I, J, K, O, P, Q, T, U, V, W, Y, Z and AA to MM show further possible arrangements of different numbers of optical illumination fibers 196, first optical measurement fibers 198 and second optical measurement fibers 200 within the measuring head 186. Other arrangements of the fibers within the measuring head 186 are thinkable.

Figure 14:
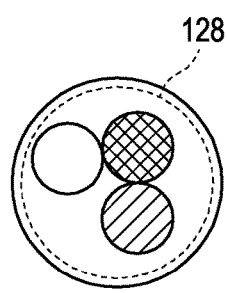
FIGS. 14A to MM show in top view embodiments of lens arrangements in measuring heads.
Figure 14:
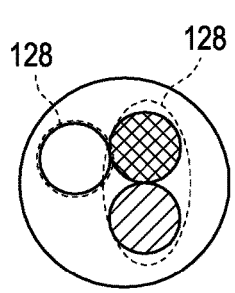
Figure 14:
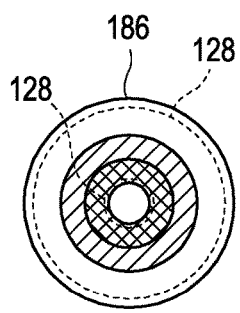
Figure 14:
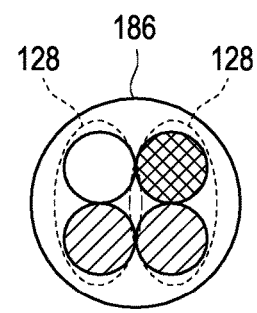
Figure 14:
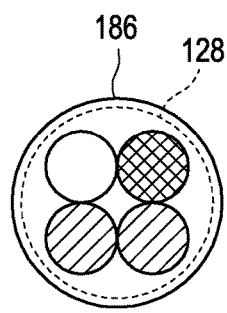
Figure 14:
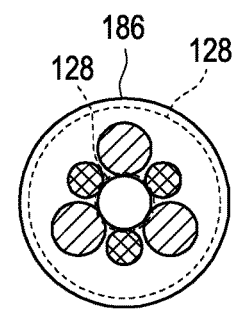
Figure 14:
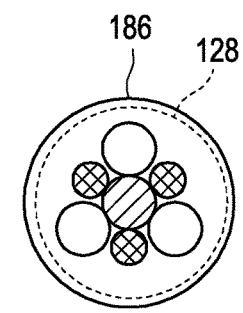
Figure 14:
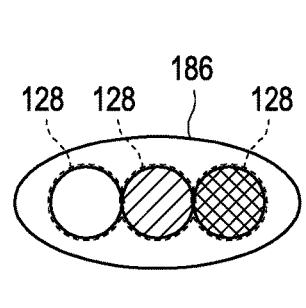
Figure 14:
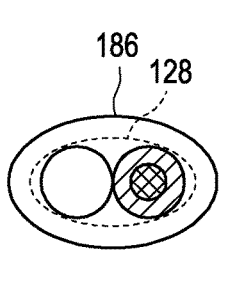
Figure 14:
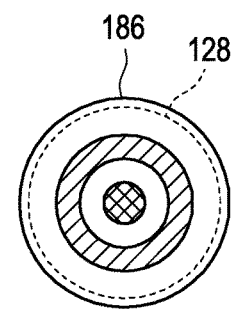
Figure 14:
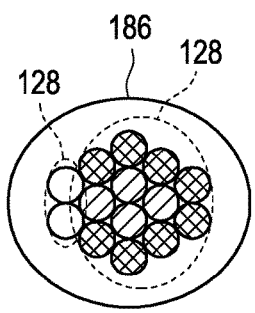
Figure 14:
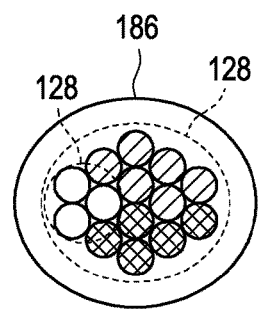
Figure 14:
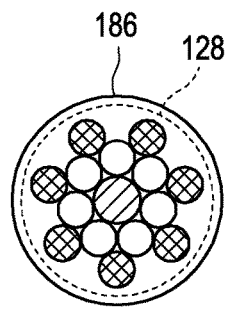
Figure 14:
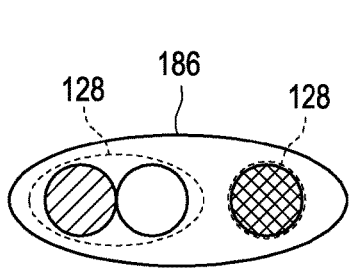
Figure 14:
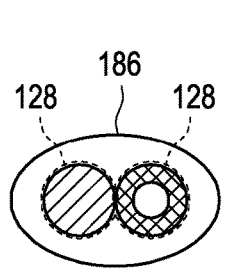
Figure 14:
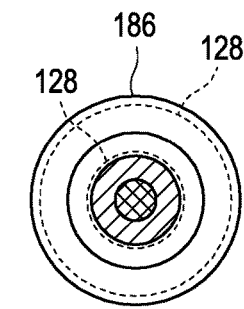
Figure 14:
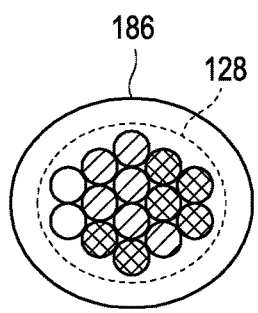
Figure 14:
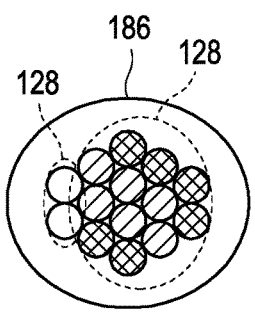
Figure 14Q:
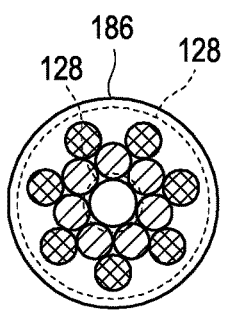
Figure 14:
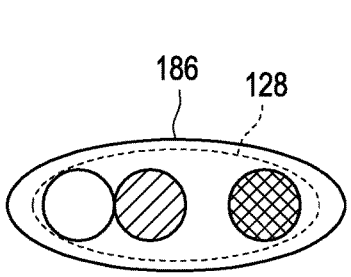
Figure 14:
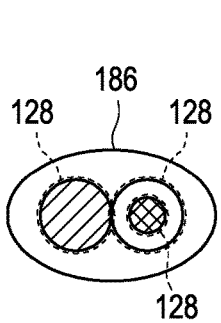
Figure 14:
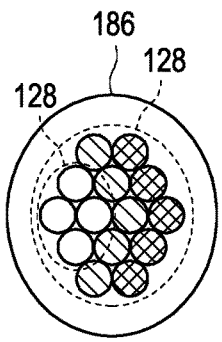
Figure 14:
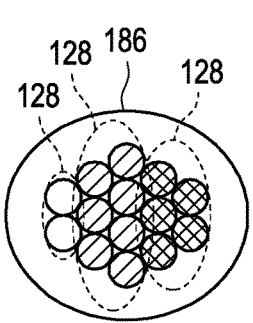
Figure 14:
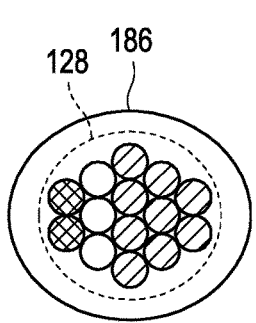
Figure 14:
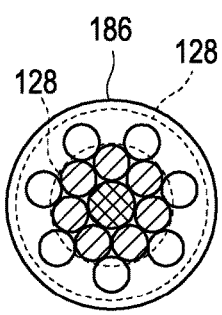
Figure 14:
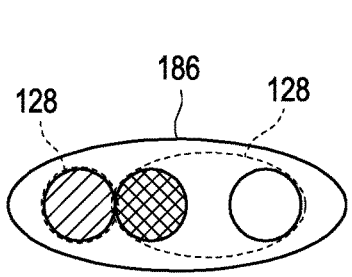
Figure 14:
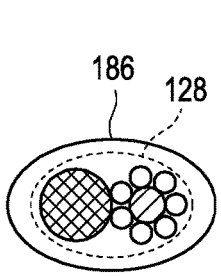
Figure 14:
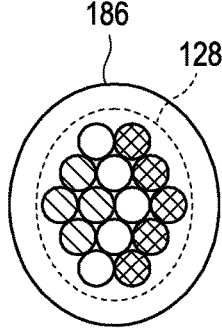
Figure 14:
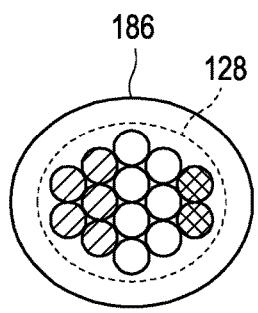
Figure 14:
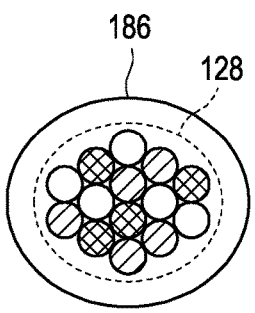
Figure 14:
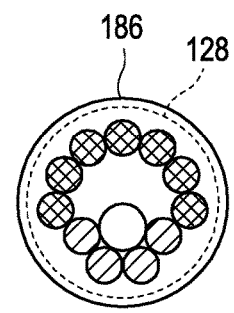
Figure 14:
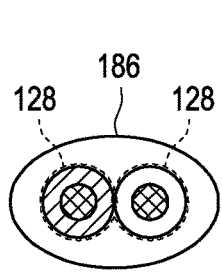
Figure 14:
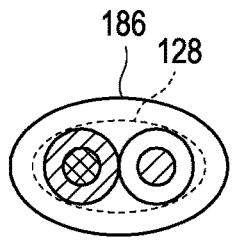
Figure 14:
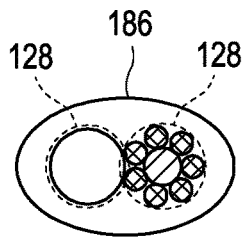
Figure 14:
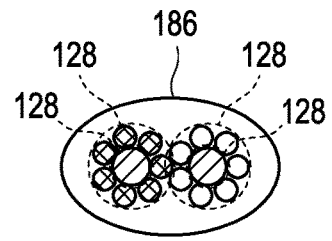
Figure 14:
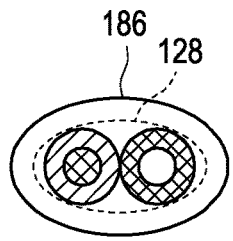
Figure 14:
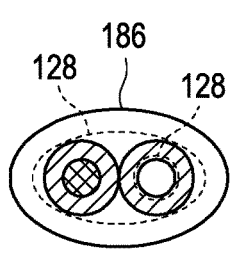
Figure 14:
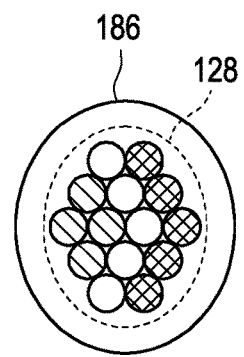
Figure 14:
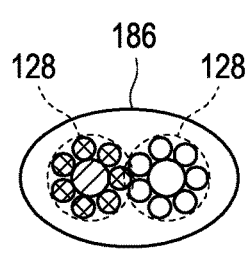
Figure 14:
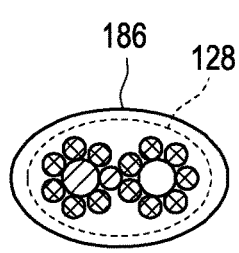
Figure 14:
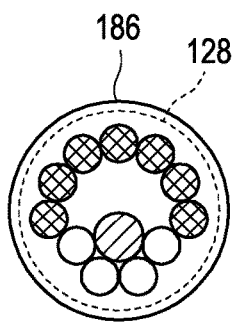

The measuring head 186 may comprise one or more transfer devices 128, in particular collimating lenses. FIG. 14 A to MM show in top view embodiments of lens arrangements in measuring heads 186. The arrangement of fibers in the measuring heads 186 of Figures A to MM correspond to the arrangement shown in FIGS. 13 A to MM, wherein in FIG. 14 A and A1, C1 and C2 two embodiments for the fiber arrangement of FIGS. 13 A and C, respectively, are shown. For clarity reference numbers of respective fibers were omitted such that reference is made to FIGS. 13 A to MM. The measuring heads 186 shown in FIGS. 14 A, AA, BB, C2, E, EE, H, HH, JJ, K, M, MM, O, R, V, Y, Z comprise one transfer device 128 arranged in front of all fibers. FIGS. 14 A1, C1, DD, F, FF, G, I, KK, L, P, U, X show measuring heads 186 comprising two or more transfer device 128 in front of the fibers. FIGS. 14 B, D, CC, GG, II, J, N, LL, S, T, W, Q show measuring heads 186 comprising at least one separate lens 128 for fibers having the same function. For example, in FIGS. 14 B, CC, D, II, J, LL, T and Q, the measuring head 186 comprises transfer device 128 covering all fibers and a separated lens 128 covering optical illumination fibers 196 only in addition. For example, in FIG. 14 GG, the measuring head 186 comprises two transfer devices 128. A first transfer device 128 may cover a first optical illumination fiber 196 and a plurality of first optical measurement fibers 198, which are arranged radially around the first optical illumination fiber 196, and a second transfer device 128 may cover a second optical illumination fiber 196 and a plurality of second optical measurement fibers 200, which are arranged radially around one second optical illumination fiber 196. Furthermore, in FIG. 14 GG two separated transfer devices 128 are shown which cover the first and second illumination fibers 196 only and in addition. For example, FIG. 14 N shows an embodiment, wherein a first transfer device 128 may cover all optical fibers, a second separate transfer device 128 may cover the first optical measurement fiber 198 and the second optical measurement fiber 200 and a third separate transfer device 128 may cover the first optical measurement fiber 198 only. For example, FIG. 14 S shows an embodiment having three transfer devices 128: a first transfer device 128 covering only the second optical measurement fiber 200, a second transfer device 128 covering both of the first optical measurement fiber 198 and the optical illumination fiber 196 and a third transfer device 128 covering the first optical measurement fiber 198 only. For example, FIG. 14 W shows a measuring head 186 comprising two transfer devices; a first transfer device 128 covering all fibers and at least one separate lens 128 covering the first optical measurement fiber 198 and the second optical measurement fiber 200. The optical paths of the first measurement fiber and/or the second measurement fiber and/or the illumination fiber and/or the optical pathways of two or more transfer devices may be fully or partially optically separated by mechanical means such as a fully or partially intransparent mechanical wall or cladding or the like to avoid internal reflections.

Figure 15:
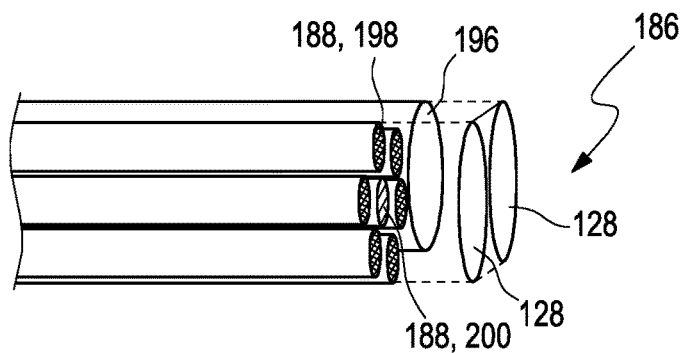
FIGS. 15A to D show a side view of embodiments of fiber and lens arrangement in the measuring head.
Figure 15:
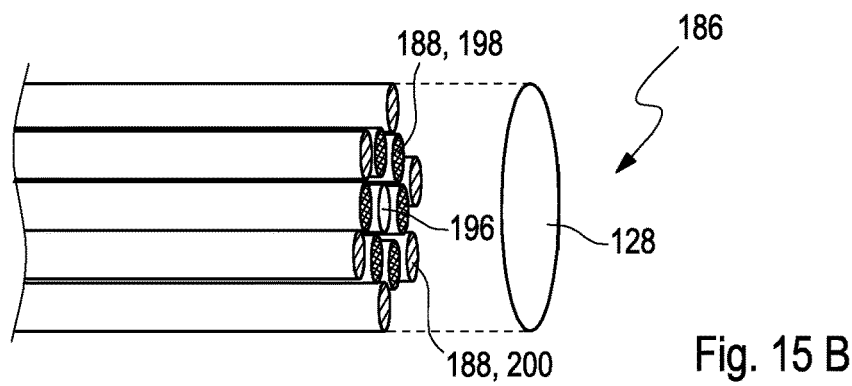
Figure 15:
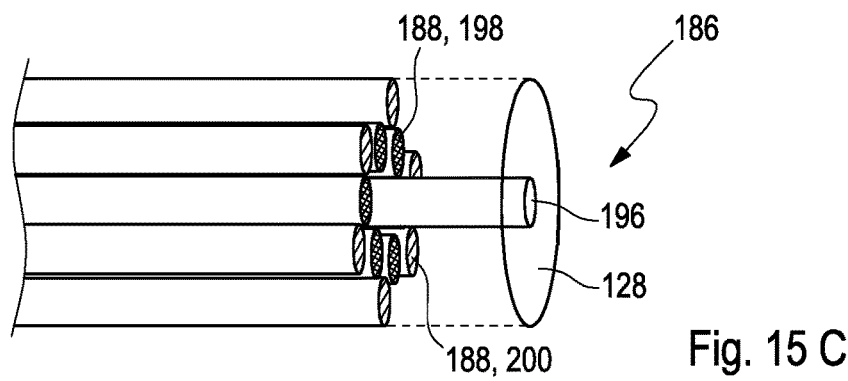
Figure 15:
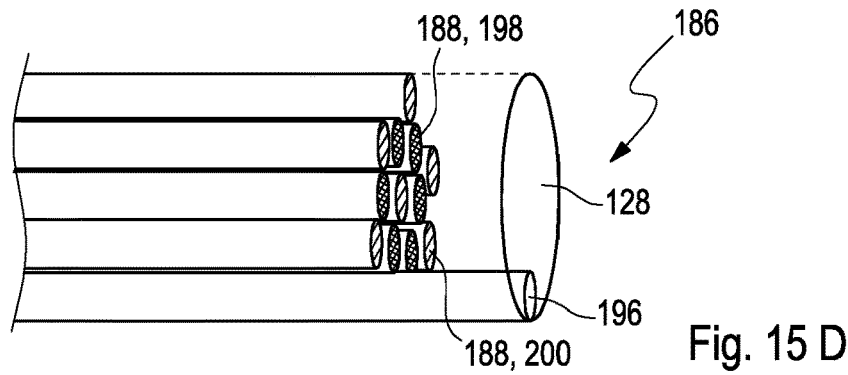

FIGS. 15 *a* to D show a side view of embodiments of fiber and lens arrangement in the measuring head 186. FIG. 15 A corresponds to the fiber and lens arrangement depicted in FIGS. 13 FF and 14 FF. The measuring head 186 may comprise separate transfer devices for optical illumination fiber 196 and receiving optical fibers, i.e. the at least one first optical measurement fiber 198 and the at least one second optical measurement fiber 200. The measuring head 186 may comprise one optical illumination fiber 196. The measuring head 186 may comprise, in particular displaced from the optical illumination fiber 196, one second optical measurement fiber 200 which is surrounded by six first optical measurement fibers 198 which are arranged radial around the second optical measurement fiber 200. The measuring head 186 may comprise a first transfer device 128, which may be arranged in front of the optical illumination fiber 196, and a second transfer device 128 which may cover the first optical measurement fiber 198 and the second optical measurement fiber 200.

FIG. 15 B to D show embodiments of the measuring head 186 comprising one optical illumination fiber 198, six first optical measurement fiber 198 and six second optical measurement fibers 200. In FIG. 15 B an arrangement is shown wherein the optical illumination fiber 196 is arranged in a center which is radially surrounded by the six first optical measurement fibers 198. The first optical measurement fibers 198 may be surrounded radially by the six second optical measurement fibers 200. The measuring head 186 may comprise one transfer device 128 for the optical illumination fiber 196 and the receiving fibers. Internal reflections may be generated at the transfer device which may generate a signal offset to the receiving fibers. FIG. 15 B shows an embodiment of a radial arrangement without a baseline. In FIG. 15 C, a similar fiber arrangement is shown, but the measuring head 186 may comprise separate transfer devices 128 for the optical illumination fiber 196 and the receiving fibers. In this embodiment, the optical illumination fiber 196 may be guided up to the transfer device 128 such that internal reflections can be prevented. This embodiment shows a radial arrangement without a baseline. FIG. 15 D shows a fiber arrangement wherein the optical illumination fiber 196 is arranged displaced from the center of the arrangement. In this embodiment, the optical illumination fiber 196 may be guided up to the transfer device 128 such that internal reflections can be prevented.

Figure 16:
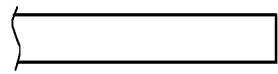
FIGS. 16 A to F show lens arrangement at fiber ends.
Figure 16:
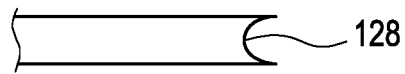
Figure 16:
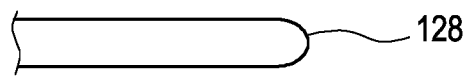
Figure 16:
Figure 16:
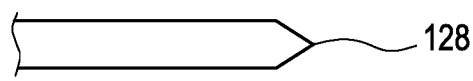
Figure 16:
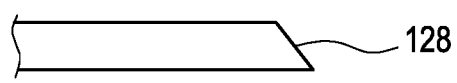
Figure 17:
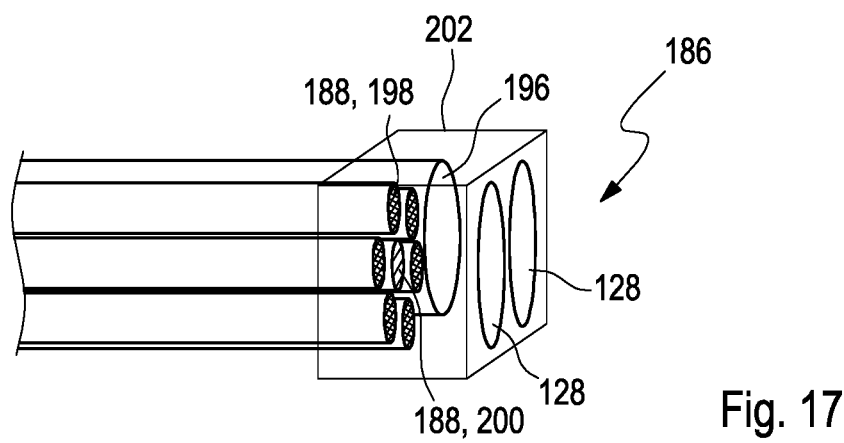
FIG. 17 shows a further embodiment of a measuring head.

FIGS. 16 A to F show different lens arrangements at the fiber ends. As described above, at least one transfer device 128 may be arranged at an end of the optical fibers. The transfer device 128 may be attached directly to one optical fiber or may be attached to a bundle of optical fibers. Alternatively, the transfer device 128 may be attached to the optical fiber or bundle of optical fibers using at least one spacer element 202. FIG. 16 A shows an optical fiber or a bundle of optical fibers. FIG. 16 B shows the optical fiber or bundle of optical fibers having attached at least one concave lens. FIG. 16 C shows the optical fiber or bundle of optical fibers having attached at least one convex lens. FIG. 16 D shows the optical fiber or bundle of optical fibers having attached at least one spherical lens. FIG. 16 E shows the optical fiber or bundle of optical fibers having attached at least one conical lens or at least one tip-shaped lens. FIG. 16 F shows the optical fiber or bundle of optical fibers having attached at least one prism shaped lens, in particular a non-rotationally symmetric lens. FIG. 17 shows a further embodiment of the measuring head 186. The lens and fiber arrangement in FIG. 17 corresponds to the lens and fiber arrangement as shown in FIG. 15 A. In FIG. 17, in addition the measuring head 186 comprises spacer element 202 which is adapted to attach the transfer devices 128 to the optical fibers. The optical paths of the first measurement fiber and/or the second measurement fiber and/or the illumination fiber and/or the optical pathways of two or more transfer devices may be fully or partially optically separated by mechanical means such as a fully or partially intransparent mechanical wall or cladding or the like to avoid internal reflections. This optical separation by mechanical means may be part of the spacer element 202.

Figure 18:
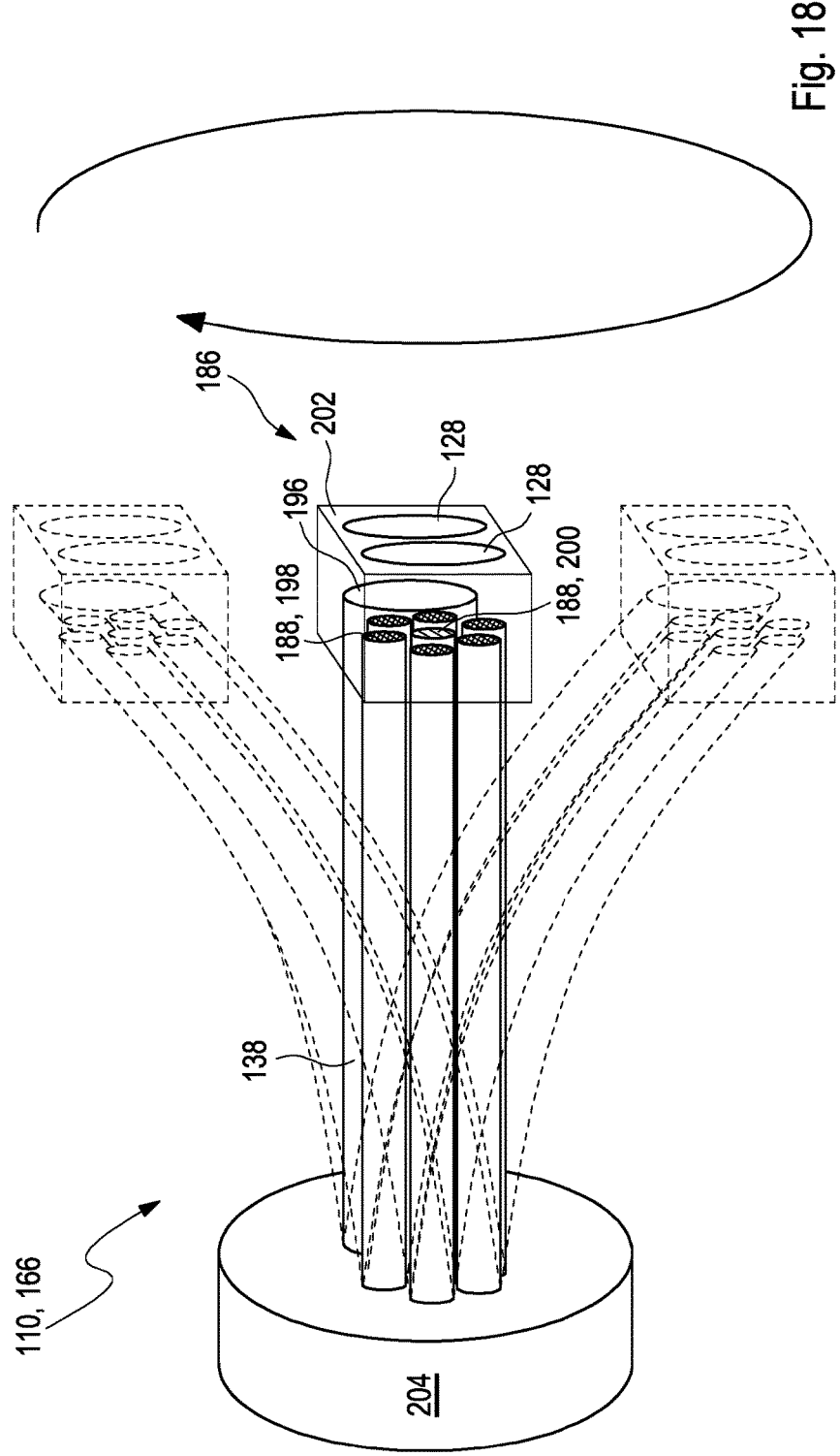
FIG. 18 shows a further embodiment of the scanning system.

FIG. 18 shows a further embodiment of the scanning system 166 for determining a depth profile of a scenery. The scanning system 166 comprises the at least one detector 110. The scanning system further comprises at least one illumination source 115, which is not shown here, adapted to scan the scenery with at least one light beam, which may also be referred to as an illumination light beam or scanning light beam. The scanning system may be adapted to scan a two-dimensional or three-dimensional range, in particular a region of interest, which is visible by the detector 110, such that at least one geometric or spatial property of the two-dimensional or three-dimensional range may be evaluated with the detector 110.

The detector 110 comprises the at least one measuring head 186 comprising at least one first optical measurement fiber 198 adapted to provide at least one light beam originating from the object 112 to the first optical sensor 113, not shown, and the at least one second optical measurement fiber 100 adapted to provide the light beam originating from the object 112 to the second optical sensor 113, not shown. In FIG. 18 an embodiment is shown, wherein the detector comprises one second optical measurement fiber 200 and six first optical measurement fibers 198 which are arranged around the second optical measurement fiber 200. Specifically, each of the optical measurement fibers 188 may have at least two ends, a distal end, also denoted as exit-end, and at least one proximal end, also denoted as receiving end. The proximal end may be arranged within and/or attached to the measuring head. The respective proximal end may be adapted to couple the light beam originating from the object 112 into the respective optical measurement fiber 188. The distal end may be arranged closer to the optical sensors 113 and may be arranged such that the light beam travelling from the proximal end to the distal end through the optical measurement fiber 188 leaves the optical measurement fiber 188 at the distal end and illuminates the respective optical sensor 113.

The measuring head 186 further may comprise at least one transfer device 128. The transfer device 128 may be arranged in front of the optical measurement fibers 188. The transfer device 128 may be adapted to focus the light beam originating from the object 112 on the proximal end. For example, the transfer device 128 may comprise at least one transfer element selected from the group consisting of: at least one concave lens; at least one convex lens; at least one spherical lens; at least one tip-shaped lens; at least one prism shaped lens, in particular a non-rotationally symmetric lens. In addition the measuring head may comprise at least one spacer element 202 which is adapted to attach the transfer devices 128 to the optical measurement fibers 188. Optical paths of the first measurement fiber 198 and the second measurement fiber 200 may be fully or partially optically separated by mechanical means such as a fully or partially intransparent mechanical wall or cladding or the like to avoid internal reflections. This optical separation by mechanical means may be part of the spacer element 202.

The detector 110 may comprise at least one optical illumination fiber 196. The illumination source 115 may be adapted to illuminate the object 112 through the optical illumination fiber 196. The optical illumination fiber may comprise at least one first end adapted to receive the at least one light beam and at least one second end from where the at least one light beam leaves the optical illumination fiber 196 for illumination of the object 112. At least the second end of the optical illumination fiber 196 may be arranged within and/or may be attached to the measuring head 186. The optical illumination fiber 196 may be arranged parallel to the direction of expansion of the optical measurement fibers 188, for example, in a bundle with the optical measurement fibers 188. The detector may comprise the at least one further transfer device 128 which may be arranged in front of the optical illumination fibers 196.

The scanning system 166 may comprise at least one actuator 204 configured to move the measuring head 186 to scan a region of interest. Specifically, the actuator may be attached and/or coupled and/or connected to the optical measurement fibers 188 and/or the optical illumination fiber 196 and may be adapted to generate a force causing the optical measurement fibers 188 and/or the optical illumination fibers 196 to move, in particular to oscillate. Thus, by driving the optical measurement fiber 188 and/or the optical illumination fiber 196 the measuring head 186 moves. The actuator 204 may be adapted to generate a force corresponding to a harmonic of a natural resonant frequency of the optical measurement fibers 188 and/or the optical illumination fiber 196. The actuator 204 may comprise at least one electromechanical actuator and/or at least one piezo actuator. The piezo actuator may comprise at least one actuator selected from the group consisting of: at least one piezoceramic actuator; at least one piezoelectric actuator. The actuator 204 may be configured to cause the measuring head 186, specifically the optical illumination fiber 196 and/or the optical measurement fibers 188 to oscillate. The actuator 204 may be adapted to move the measuring head 186 in a linear scan and/or a radial scan and/or a spiral scan. In FIG. 18, an exemplary movement of the measuring head 186 is shown. For example, the actuator 204 may be adapted to generate a force on the optical fibers 188, 196 such that the measuring head 186 moves upwards and downwards. For example, the actuator 204 may be configured to generate a force on the optical fibers 188, 196 such that the measuring head 186 moves in an orbit with a predefined radius. The radius may be adjustable. For example, the actuator 204 may be adapted to generate a force such that the measuring head 186 moves in a spiral such as with a radius which alternately decreases or increases.

Figure 19:
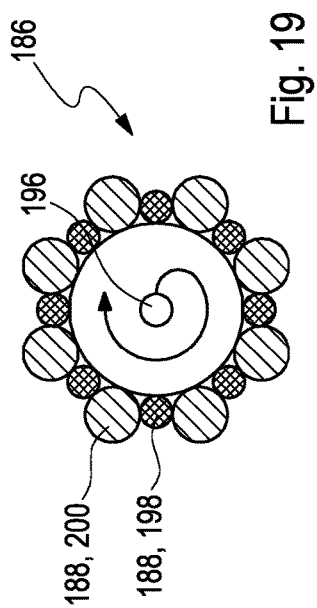
FIG. 19 shows a further embodiment of the scanning system.

FIG. 19 shows a further embodiment of the scanning system 166. FIG. 19 shows a front view of the measuring head 186. In this embodiment, the measuring head 186 may comprise a plurality of first measurement fibers 198 and a plurality of second measurement fibers 200 radially arranged around the optical illumination fiber 196. The optical illumination fiber 198 may be movable by the actuator 204. The optical illumination fiber 198 may be adapted to perform a spiral movement and/or a circular movement relative to the first measurement fibers 198 and the second measurement fibers 200 and thus, allow for a spiral or circular scan. The evaluation device 133 may be adapted to calibrate the position of the optical illumination fiber 196 and to evaluate a distance from the combined signal Q depending on the position of the optical illumination fiber 196. The detector 110 may comprise the at least one further transfer device 128 which may be arranged in front of the optical fibers 138.

LIST OF REFERENCE NUMBERS

110 Detector
112 Object
113 optical sensor
114 beacon device
115 Illumination source
116 light beam
118 first optical sensor
120 second optical sensor
121 light-sensitive area
122 first light-sensitive area
124 second light-sensitive area
126 optical axis of the detector
128 transfer device
129 optical axis of the transfer device
130 angle dependent optical element
131 light beam
132 first side
133 evaluation device 134 Divider
136 position evaluation device
138 Optical fiber
140 Illumination fiber
142 Light beam
144 First fiber
146 Second fiber
148 entrance end
150 exit end
152 first light beam
154 Second light beam
156 Camera
158 Detector system
160 Human-machine interface
162 Entertainment device
164 Tracking system
166 Scanning system
168 connector
170 Housing
172 Control device
174 User
176 opening
178 Direction of view
180 Coordinate system
182 machine
184 Track controller
186 measuring head
188 Optical measurement fiber
190 Light beam
192 Receiving end
194 Exit-end
196 Optical Illumination fiber
198 First optical measurement fiber
200 Second optical measurement fiber
202 Spacer element
204 actuator
206 First object distance
208 Second object distance
210 Second light beam

The invention claimed is:

1. A detector for determining a position of at least one object, the detector comprising:
    at least one angle dependent optical element adapted to generate at least one light beam having at least one beam profile depending on an angle of incidence of an incident light beam propagating from the object towards the detector and illuminating the angle dependent optical element, wherein the angle dependent optical element comprises at least one optical element selected from the group consisting of: at least one optical fiber, in particular at least one multifurcated optical fiber, in particular at least one bifurcated optical fiber; at least one lens array arranged in at least one plane perpendicular to an optical axis of the detector, in particular at least one microlens array; at least one optical interference filter; at least one nonlinear optical element, in particular one birefringent optical element;
    at least one transfer device, wherein the transfer device has at least one focal length in response to the at least one incident light beam propagating from the object to the detector;
    at least two optical sensors, wherein each optical sensor has at least one light sensitive area, wherein each optical sensor is designed to generate at least one sensor signal in response to an illumination of its respective light-sensitive area by the light beam generated by the angle dependent optical element;
    at least one evaluation device being configured for determining at least one longitudinal coordinate z of the object by evaluating a combined signal Q from the sensor signals;
    wherein the evaluation device is configured for deriving the combined signal Q by one or more of dividing the sensor signals, dividing multiples of the sensor signals, dividing linear combinations of the sensor signals;
    wherein the evaluation device is configured for using at least one predetermined relationship between the combined signal Q and the longitudinal coordinate for determining the longitudinal coordinate.

2. The detector according to claim 1, wherein the detector further comprises an illumination source for illuminating the object.

3. The detector according to claim 2, wherein the illumination source is adapted to illuminate the object through the angle dependent optical element.

4. The detector according to claim 2, wherein a distance perpendicular to an optical axis of the detector between the illumination source and the optical sensors is small, wherein the distance perpendicular to the optical axis of the detector between the illumination source and the optical sensors is less than 0.01 m, preferably less than 0.005 m, more preferably less than 0.0025 m.

5. The detector according to claim 2, wherein the angle dependent optical element comprises at least one optical fiber having at least one entrance face, wherein a distance perpendicular to an optical axis of the detector between the illumination source and the entrance face of the optical fiber is small, wherein the distance perpendicular to the optical axis of the detector between the illumination source and the entrance face of the optical fiber is less than 0.01 m, preferably less than 0.005 m, more preferably less than 0.0025 m.

6. The detector according to claim 2, wherein the angle dependent optical element comprises at least two optical fibers each having at least one entrance face, wherein the entrance faces are arranged concentric or on top of each other or parallel to each other or side by side, wherein a distance perpendicular to an optical axis of the detector between one or both entrance faces and the illumination source is less than 0.01 m, preferably less than 0.005 m, more preferably less than 0.0025 m.

7. The detector according to claim 1, wherein the evaluation device is configured for deriving the combined signal Q by $$Q(z_O) = \frac{\int\int_{A_1} E(x, y; z_O) dx dy}{\int\int_{A_2} E(x, y; z_O) dx dy}$$

wherein x and y are transversal coordinates, A1 and A2 are areas of the beam profile at a sensor position of the optical sensors, and $E(x,y,z_o)$ denotes the beam profile given at the object distance $z_o$.

8. The detector according to claim 1, wherein the optical sensors are positioned off focus.

9. The detector according to claim 1, wherein the angle dependent optical element comprises at least one optical fiber having at least one entrance face, wherein the entrance face is positioned off focus.

10. The detector according to claim 1, wherein each of the sensor signals comprises at least one information of at least one area of the beam profile of the light beam generated by the angle dependent optical element, wherein the beam profile is selected from the group consisting of a trapezoid beam profile; a triangle beam profile; a conical beam profile and a linear combination of Gaussian beam profiles.

11. The detector according to claim 10, wherein the light-sensitive areas are arranged such that a first sensor signal comprises information of a first area of the beam profiles and a second sensor signal comprises information of a second area of the beam profile, wherein the first area of the beam profile and the second area of the beam profile are one or both of adjacent or overlapping regions, wherein the evaluation device is configured to determine the first area of the beam profile and the second area of the beam profile, wherein the first area of the beam profile comprises essentially edge information of the beam profile and the second area of the beam profile comprises essentially center information of the beam profile, wherein the edge information comprises information relating to a number of photons in the first area of the beam profile and the center information comprises information relating to a number of photons in the second area of the beam profile, wherein the evaluation device is configured to derive the combined signal Q by one or more of dividing the edge information and the center information, dividing multiples of the edge information and the center information, dividing linear combinations of the edge information and the center information.

12. The detector according to claim 10, wherein the angle dependent optical element comprises two optical fibers each having an entrance face, wherein the entrance faces are arranged such that a first sensor signal comprises information of a first area of the beam profiles and a second sensor signal comprises information of a second area of the beam profile, wherein the first area of the beam profile and the second area of the beam profile are one or both of adjacent or overlapping regions, wherein the evaluation device is configured to determine the first area of the beam profile and the second area of the beam profile, wherein the first area of the beam profile comprises essentially edge information of the beam profile and the second area of the beam profile comprises essentially center information of the beam profile, wherein the edge information comprises information relating to a number of photons in the first area of the beam profile and the center information comprises information relating to a number of photons in the second area of the beam profile, wherein the evaluation device is configured to derive the combined signal Q by one or more of dividing the edge information and the center information, dividing multiples of the edge information and the center information, dividing linear combinations of the edge information and the center information.

13. The detector according to claim 1, wherein the optical sensors are partial diodes of a bi-cell or quadrant diode and/or comprise at least one CMOS sensor.

14. The detector according to claim 1, wherein the detector comprises:
at least one measuring head comprising at least one optical measurement fiber and the at least one transfer device;
the at least two optical sensors, wherein each optical sensor has the at least one light sensitive area, wherein each optical sensor is designed to generate the at least one sensor signal in response to illumination of its respective light-sensitive area by at least one light beam originating from the optical measurement fiber;
the at least one evaluation device being configured for determining the at least one longitudinal coordinate z of the object by evaluating the combined signal Q from the sensor signals.

15. The detector according to claim 14, wherein a numerical aperture of the transfer device is smaller than a numerical aperture of the optical measurement fiber.

16. The detector according to claim 14, wherein the transfer device comprises at least one collimating lens.

17. The detector according to claim 14, wherein the detector comprises at least one optical illumination fiber and an illumination source for illuminating the object, wherein the illumination source is adapted to illuminate the object through the optical illumination fiber.

18. The detector according to claim 1, wherein the detector comprises a small baseline.

19. The detector according to claim 18, wherein the optical sensors are partial diodes of a bi-cell or quadrant diode and/or comprise at least one CMOS sensor, and wherein a dividing line of the partial diodes of the bi-cell or of the quadrant diode are arranged essential parallel or essential orthogonal to the baseline.

20. The detector according to claim 18, wherein the baseline is less than 0.01 m, preferably less than 0.005 m, more preferably less than 0.0025 m.

21. The detector according to claim 14, wherein the optical sensors comprise a CMOS sensor, wherein the evaluation device is adapted to divide the sensor region of the CMOS sensor into at least two sub-regions, wherein the evaluation device is configured for determining the at least one longitudinal coordinate z of the object by evaluating the combined signal Q from the sensor signals of the at least two sub-regions.

22. The detector according to claim 21, wherein the evaluation device is adapted to divide the sensor region of the CMOS sensor into at least one left part and at least one right part and/or at least one upper part and at least one lower part and/or at least one inner and at least one outer part.

23. A method for determining a position of at least one object by using at least one detector, the method comprising the following steps:
providing at least one angle dependent optical element and generating at least one light beam having at least one beam profile depending on an angle of incidence;
providing at least two optical sensors, wherein each optical sensor has at least one light sensitive area, wherein each optical sensor is designed to generate at least one sensor signal in response to an illumination of its respective light-sensitive area by the light beam generated by the angle dependent optical element;
illuminating each of the light-sensitive areas of the at least two optical sensors of the detector with the light beam generated by the angle dependent optical element, wherein, thereby, each of the light-sensitive areas generates at least one sensor signal; and
evaluating the sensor signals, thereby, determining at least one longitudinal coordinate z of the object, wherein the evaluating comprises deriving a combined signal Q of the sensor signals by one or more of dividing the sensor signals, dividing multiples of the sensor signals, dividing linear combinations of the sensor signals;
wherein at least one predetermined relationship between the combined signal Q and the longitudinal coordinate is used for determining the longitudinal coordinate.

24. The method according to claim 23, the method further comprising the following steps:

providing at least one measuring head comprising one optical measurement fiber and at least one transfer device;

generating at least one light beam originating from the optical measurement fiber;

providing the at least two optical sensors, wherein each optical sensor is designed to generate the at least one sensor signal in response to illumination of its respective light-sensitive area by the at least one light beam originating from the optical measurement fiber;

illuminating each of the light-sensitive areas of the at least two optical sensors with the light beam, wherein, thereby, each of the light-sensitive areas generates at least one sensor signal; and evaluating the sensor signals, thereby, determining the at least one longitudinal coordinate z of the object, wherein the evaluating comprises deriving a combined signal Q of the sensor signals.

25. A use of the detector according to claim 1, for a purpose of use, selected from the group consisting of: a position measurement in traffic technology; an entertainment application; an optical data storage application; a security application; a surveillance application; a safety application; a human-machine interface application; a logistics application; an endoscopy application; a medical application; a tracking application; a photography application; a machine vision application; a robotics application; a quality control application; a 3D printing application; an augmented reality application; a manufacturing application; a use in combination with optical data storage and readout.

* * * * *

UNITED STATES PATENT AND TRADEMARK OFFICE
CERTIFICATE OF CORRECTION

| | | |
|---|---|---|
| PATENT NO. | : 11,719,818 B2 | Page 1 of 1 |
| APPLICATION NO. | : 16/483231 | |
| DATED | : August 8, 2023 | |
| INVENTOR(S) | : Send et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 803 days.

Signed and Sealed this
Twentieth Day of May, 2025

Coke Morgan Stewart
*Acting Director of the United States Patent and Trademark Office*